US012774620B2

(12) United States Patent
Weinerman et al.

(10) Patent No.: US 12,774,620 B2
(45) **Date of Patent: *Oct. 27, 2026**

(54) LATCH APPARATUS

(71) Applicant: The Eastern Company, Strongsville, OH (US)

(72) Inventors: Lee S. Weinerman, Medina, OH (US); Scott Arthurs, Brunswick, OH (US); Robert Pliml, Wheeling, IL (US); James C. Fournier, Gurnee, IL (US); Keith Braun, Strongsville, OH (US); James Paxitzis, Strongsville, OH (US)

(73) Assignee: THE EASTERN COMPANY, Strongsville, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 19/016,897

(22) Filed: Jan. 10, 2025

(65) Prior Publication Data

US 2025/0146334 A1 May 8, 2025

Related U.S. Application Data

(63) Continuation-in-part of application No. 17/729,655, filed on Apr. 26, 2022, now Pat. No. 12,196,002, (Continued)

(51) Int. Cl.
*E05B 81/56* (2014.01)
*E05B 81/06* (2014.01)
(Continued)

(52) U.S. Cl.
CPC .............. *E05B 81/56* (2013.01); *E05B 81/06* (2013.01); *E05B 81/14* (2013.01); *E05B 81/28* (2013.01);
(Continued)

(58) Field of Classification Search
CPC .......... E05B 81/56; E05B 81/06; E05B 81/14; E05B 81/28; E05B 81/34; E05B 81/90;
(Continued)

(56) References Cited

U.S. PATENT DOCUMENTS 4,927,196 A * 5/1990 Girard ................. E05B 15/0046 292/216
5,613,716 A * 3/1997 Cafferty .................. E05B 77/36 292/201
(Continued)

FOREIGN PATENT DOCUMENTS

CN 109441253 A * 3/2019 ......... E05B 47/0607
CN 114645640 A * 6/2022 ............. E05B 15/04
(Continued)

OTHER PUBLICATIONS

CN109441253 Espacenet machine translation of claims and description (Year: 2026).*

*Primary Examiner* — Steven A Tullia
(74) *Attorney, Agent, or Firm* — Ralph E. Jocke; Walker & Jocke

(57) ABSTRACT

A latch (10,120,200) includes a rotatable jaw (18, 124, 204) that engages and holds a striker (32,128,210) in a latched position. A rotatable pawl (28, 132, 214) in an engaged position is operative to hold the jaw in the latched position. Movement of the pawl to a disengaged position enables the jaw to move to an unlatched position and to disengage the striker. The pawl is movable from the engaged position to the disengaged position through operation of either an electrical actuator (84, 152, 236) or through movement of an actuating end (26, 142, 224) of the pawl by a cable or similar mechanical connector (36, 246).

27 Claims, 38 Drawing Sheets

Related U.S. Application Data which is a continuation of application No. PCT/US2022/019135, filed on Mar. 7, 2022, and a continuation-in-part of application No. 16/677,856, filed on Nov. 8, 2019, now Pat. No. 11,346,129.

(60) Provisional application No. 62/768,194, filed on Nov. 16, 2018.

(51) Int. Cl.

*E05B 81/14* (2014.01)
*E05B 81/28* (2014.01)
*E05B 81/34* (2014.01)
*E05B 83/42* (2014.01)
*H04B 5/48* (2024.01)

(52) U.S. Cl.

CPC ............... *E05B 81/34* (2013.01); *E05B 83/42* (2013.01); *H04B 5/48* (2024.01)

(58) Field of Classification Search

CPC .......... E05B 81/15; E05B 81/64; E05B 81/68; E05B 81/54; E05B 83/42; E05B 2047/002; E05B 2047/0069; E05B 2047/0014; E05B 2047/0084; E05B 2047/0085; E05B 2047/0086; E05B 2047/0048; E05B 2047/0054; E05B 2047/0017; E05B 2047/0024; E05B 47/0607; E05B 47/0012; E05B 47/0001; E05B 47/06; E05B 17/22; H04B 5/48; E05C 3/24; Y10T 292/1043; Y10T 292/1082; Y10T 292/1047; Y10T 292/699; Y10T 70/7102; Y10T 70/7107; Y10S 292/62

USPC ............................................. 70/264.263, 274

See application file for complete search history.

(56) References Cited

U.S. PATENT DOCUMENTS 5,729,198 A * 3/1998 Gorman ............. G07C 9/00182 70/279.1
5,938,252 A * 8/1999 Uemura .................. E05B 81/14 292/216
6,050,117 A * 4/2000 Weyerstall ............. E05B 77/12 292/201
6,523,376 B2 * 2/2003 Baukholt ................ E05B 77/28 292/201
6,886,869 B2 * 5/2005 Martinez ............... E05B 47/023 292/201
7,075,416 B2 * 7/2006 Johnson .................. E05B 81/54 340/426.28
7,221,255 B2 * 5/2007 Johnson ............... G07C 5/0808 340/10.2
7,552,952 B2 * 6/2009 Roesslinger ............ E05B 81/64 292/201
8,222,993 B2 * 7/2012 Bliding .............. G07C 9/00174 340/10.33
8,516,864 B2 * 8/2013 Greiner ............... E05B 47/0607 292/201
8,742,889 B2 * 6/2014 Kaczmarz .......... G07C 9/00571 235/382
9,809,999 B2 * 11/2017 Weinerman ............. E05B 81/14
9,915,082 B2 * 3/2018 Garneau ................. E05B 65/46
10,169,962 B1 * 1/2019 Walker ..................... G08B 5/36
10,294,695 B2 * 5/2019 Garneau ................. E05B 65/46
10,378,241 B2 * 8/2019 Al-Kahwati ........ E05B 47/0012
10,448,738 B2 * 10/2019 Hashemi .............. A47B 88/477
10,458,152 B2 * 10/2019 Schort ........................ E06B 9/00
10,494,856 B2 * 12/2019 Bernkrant ............. F41C 33/029
10,526,814 B2 * 1/2020 Al-Kahwati ........ E05B 47/0004
10,629,038 B2 * 4/2020 Horgan .................. G08B 29/22
10,697,203 B1 * 6/2020 Gokcebay .......... G07C 9/00309
10,914,098 B2 * 2/2021 Zhang ................ G07C 9/00944
11,250,654 B2 * 2/2022 Kanteti ............. H04W 52/0254
11,346,129 B1 * 5/2022 Weinerman ............. E05B 59/00
11,935,343 B2 * 3/2024 Kanteti ............. H04W 52/0254
11,982,108 B2 * 5/2024 Tan ..................... E05B 47/0607
12,196,002 B2 * 1/2025 Weinerman ............... E05C 3/24
12,241,284 B2 * 3/2025 Zhang ........................ E05B 9/02
2003/0182863 A1 * 10/2003 Mejean ................... E05B 81/66 49/26
2004/0155477 A1 * 8/2004 Lanigan ............. B62D 33/0222 296/50
2005/0218663 A1 * 10/2005 Schupp ................... E05B 81/14 292/216
2008/0252083 A1 * 10/2008 Carabalona ............. E05B 81/20 292/49
2009/0235767 A1 * 9/2009 Garneau ............. E05B 47/0012 292/201
2010/0139338 A1 * 6/2010 Wintersteiger ..... E05B 47/0004 70/264
2011/0260475 A1 * 10/2011 Spurr ...................... E05B 81/14 292/195
2016/0032629 A1 * 2/2016 Rahilly ..................... E05C 3/12 292/197
2023/0146139 A1 * 5/2023 Chibli ................... E05B 65/108 70/277
2025/0146334 A1 * 5/2025 Weinerman ............. E05B 81/14

FOREIGN PATENT DOCUMENTS

CN 112814498 B * 10/2025 ......... E05B 47/0012
DE 4228234 A1 * 3/1994 ............. E05B 81/82
EP 1048807 A1 * 11/2000 ............. E05B 81/78
FR 2778939 B1 * 12/2002 ............. E05B 41/00
KR 970001810 A * 1/1997 ............. E05B 83/16
WO WO-2019018899 A1 * 1/2019 ......... E05B 63/0065
WO WO-2023172238 A1 * 9/2023 ........... E05B 15/004

* cited by examiner

LATCH APPARATUS

TECHNICAL FIELD

Exemplary arrangements relate to latches which are operative to selectively hold and release a closure member. Exemplary arrangements further relate to latches that can be selectively released in response to either electrical or mechanical actuation and a control system usable with such latches.

BACKGROUND ART

Latches are often used to hold a closure member in engagement with another structure, and to then selectively release the closure member so that an interior area of the structure may be accessed. For example, latches may be used to hold a door in engagement with a cabinet or other container. The latch may be operative to hold the closure member in covering relation with an opening to the container to prevent unauthorized access to the interior of the container. The latch can be selectively released when access to the interior of the container is to be provided to an authorized person. Of course it should be understood that latches may be used in many different types of applications and situations.

Latch apparatus may benefit from improvements.

SUMMARY OF DESCRIPTION

Exemplary arrangements relate to a latch that is operative to hold a striker that is in fixed connection with a closure member. The latch includes a jaw which in a latched position is operative to hold the striker in engagement with the latch. The latch is selectively operative to enable the jaw to move from the latched position to an unlatched position in which the striker may disengage from the latch. When the striker disengages from the latch the closure member may be moved from a first position in which the striker is engaged with the jaw, to a second position in which the striker is disposed away from the latch. This may correspond to an open position of the closure member, which enables an interior area of the container associated with the latch to be accessed. In exemplary arrangements the latch may be reengaged with the striker by moving the striker into engagement with the jaw so as to return the jaw to the latched position.

In exemplary arrangements the jaw is selectively held in the latched position by a pawl. In an engaged position of the pawl, the pawl is operative to engage the jaw and hold it in the latched position. The pawl is selectively movable from the engaged position to a disengaged position in which the jaw is enabled to move from the latched position to the unlatched position.

In the exemplary arrangement the pawl is in operative connection with an electric actuator within the housing of the latch. The actuator is operative responsive to electrical signals to move the pawl from the engaged position to the disengaged position. The exemplary pawl further includes an actuating end that extends outside the housing of the latch. Movement of the actuating end such as by a cable, rod or other movable member, is alternatively operative to cause the pawl to move from the engaged position to the disengaged position. In the exemplary arrangement the pawl may be selectively moved from the engaged position to the disengaged position by either the electric actuator or the actuating end.

Exemplary arrangements include further useful features and capabilities and a latch control system as described in greater detail hereafter.

DETAILED DESCRIPTION

Figure 1:
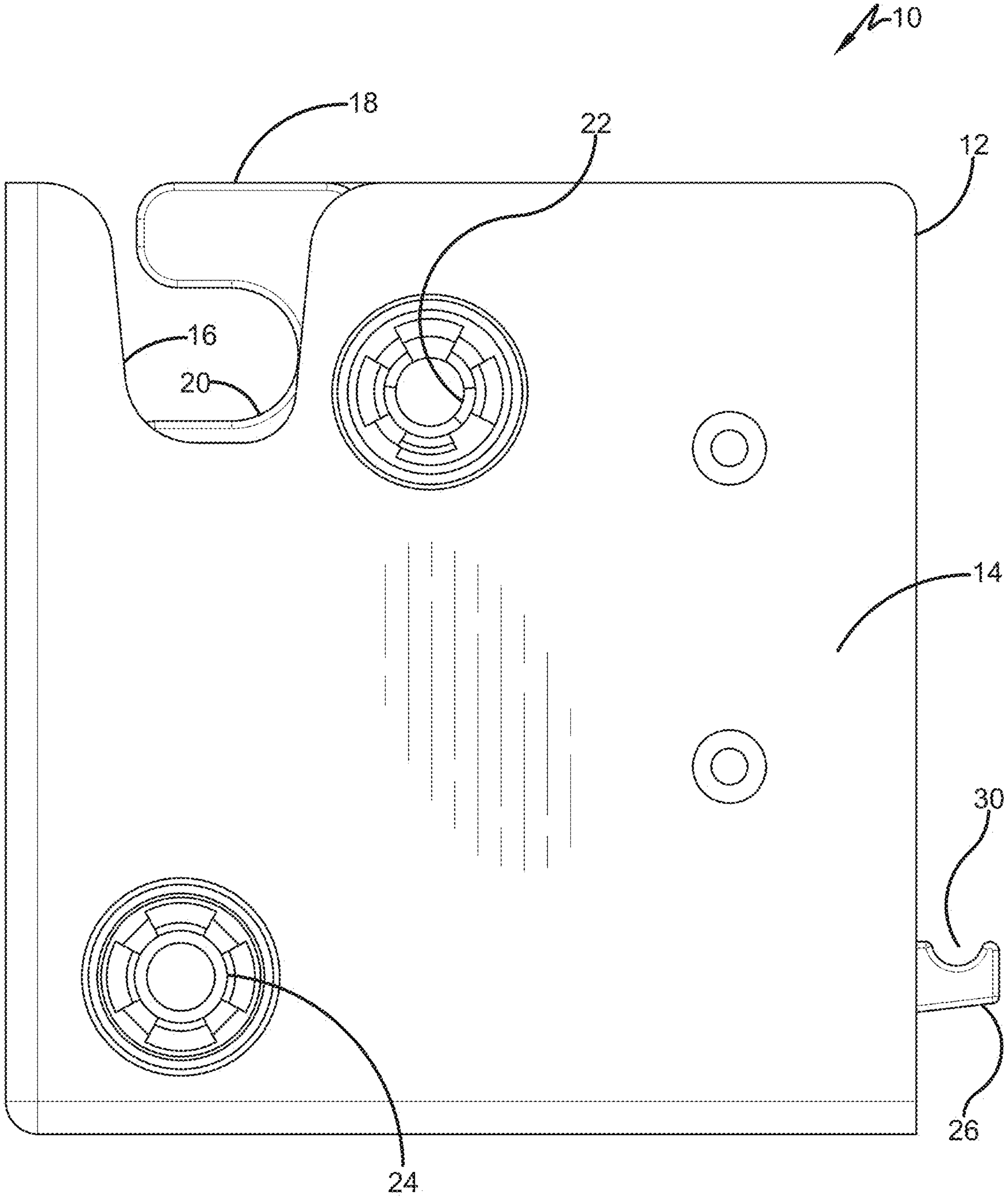
FIG. 1 is a right side view of an exemplary latch shown with the jaw of the latch in the engaged position.

Referring now to the drawings and particularly to FIG. 1 there is shown therein a latch of an exemplary arrangement generally indicated 10. Latch 10 includes a housing 12. The exemplary housing is comprised of two laterally disposed side plates 14 with a space in between that houses latch components.

The housing includes a recess in each side plate that bound a U-shaped housing recess 16. A jaw 18 is movable relative to the recess 16. Exemplary jaw 18 is rotatably movable relative to the housing and includes a notch 20. The latch further includes a pair of posts 22, 24. The exemplary posts 22, 24 extend intermediate of the side plates 14 and hold the latch components in engaged relation. In the exemplary arrangement the posts 22, 24 include openings therethrough that are usable for extending fasteners or other items therethrough for purposes of mounting the latch 10. The exemplary latch further includes an actuating end 26 of a rotatable pawl 28 (see FIG. 4). The exemplary actuating end 26 extends outside the housing and includes a cable engaging recess 30 that operates in a manner like that hereafter discussed.

Figure 2A:
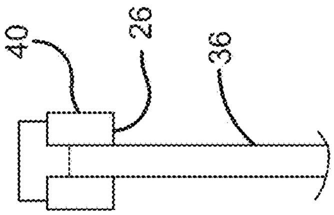
FIG. 2A is a partial back view of the pawl in engagement with the cable.
Figure 2:
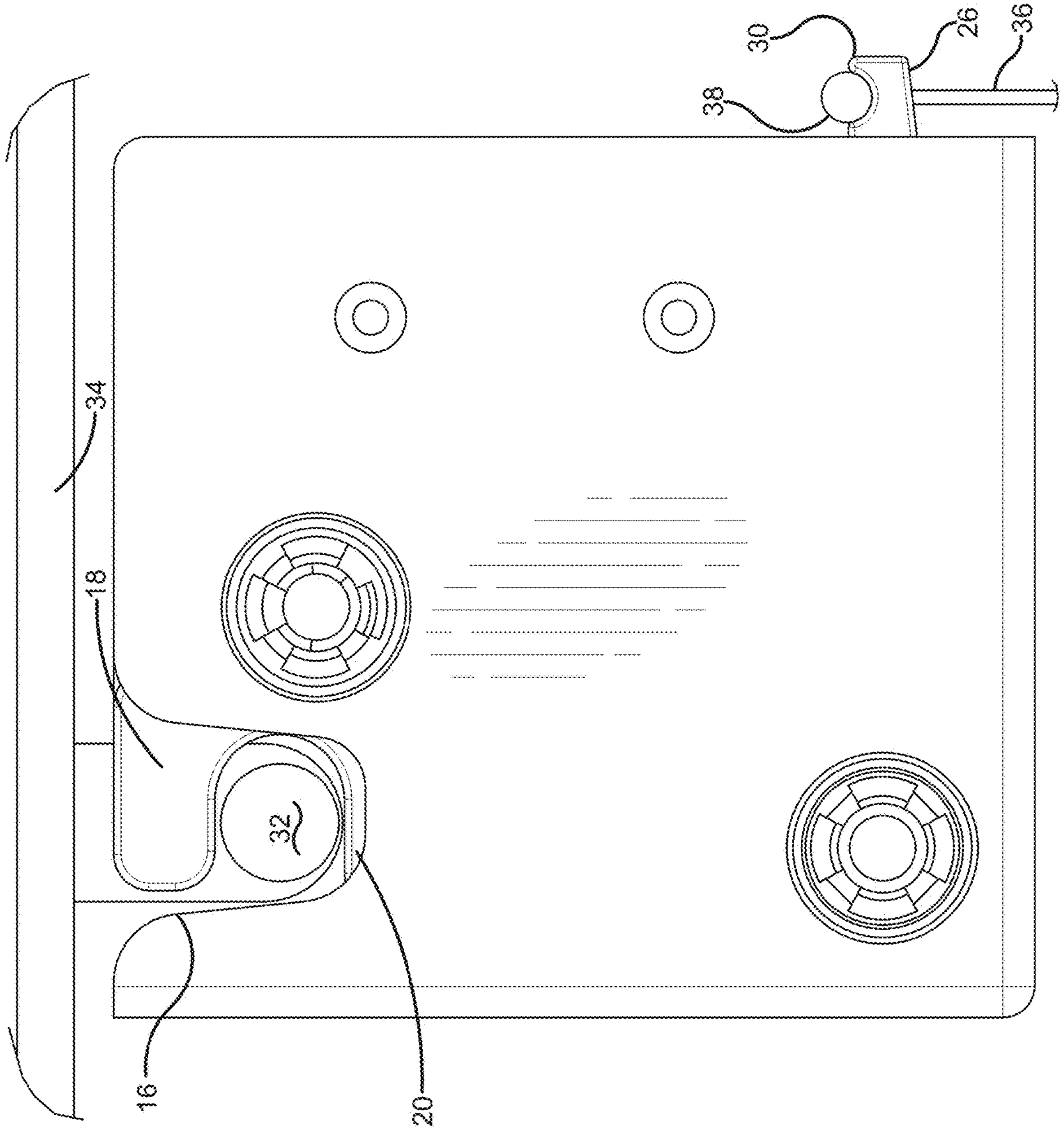
FIG. 2 is a right side view of the exemplary latch shown in engagement with a striker and closure member, with the actuating end of the pawl in engagement with a cable.
Figure 3:
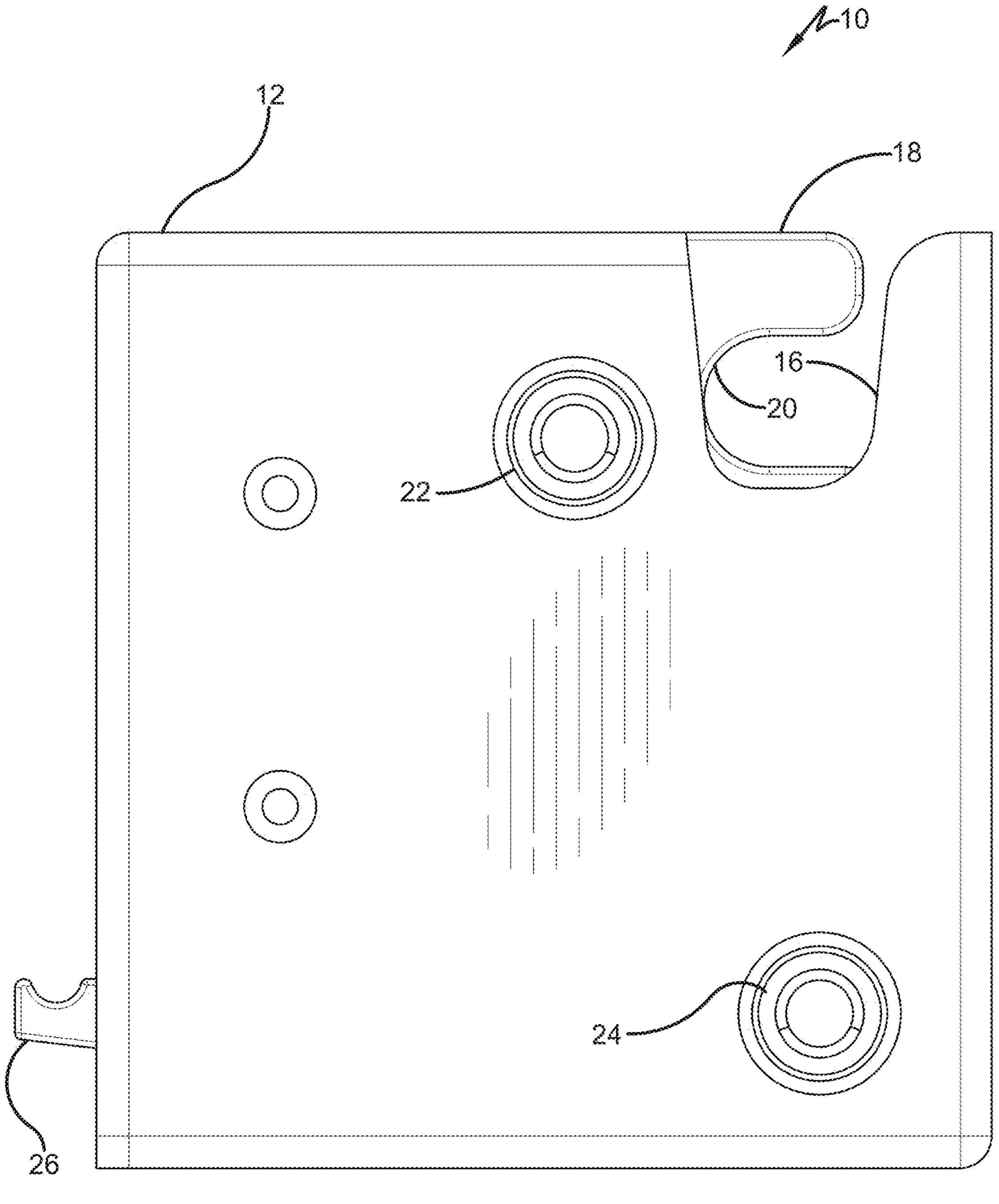
FIG. 3 is a left side view of the exemplary latch with the jaw in the latched position.

As shown in FIG. 2, in the latched position of the jaw 18 the notch 20 and recess 16 are configured to engage a striker 32. The exemplary striker 32 is in fixed attached engagement with a closure member 34. In an exemplary arrangement the closure member may comprise a door or other device that is held in position by the latch when the jaw 18 is in the latched position. Also as shown in FIG. 2 and FIG. 2A, the actuating end 26 of an exemplary pawl is in operative attached connection with a cable 36. In the exemplary arrangement the cable 36 is in attached connection with an enlarged cylindrical end 38. The cylindrical end 38 is configured to engage the recess 30. In the exemplary arrangement the actuating end 26 includes a pair of disposed fork portions through which the exemplary cable 36 extends. Of course it should be understood that this configuration is exemplary and in other arrangements other approaches and members may be used.

Figure 4:
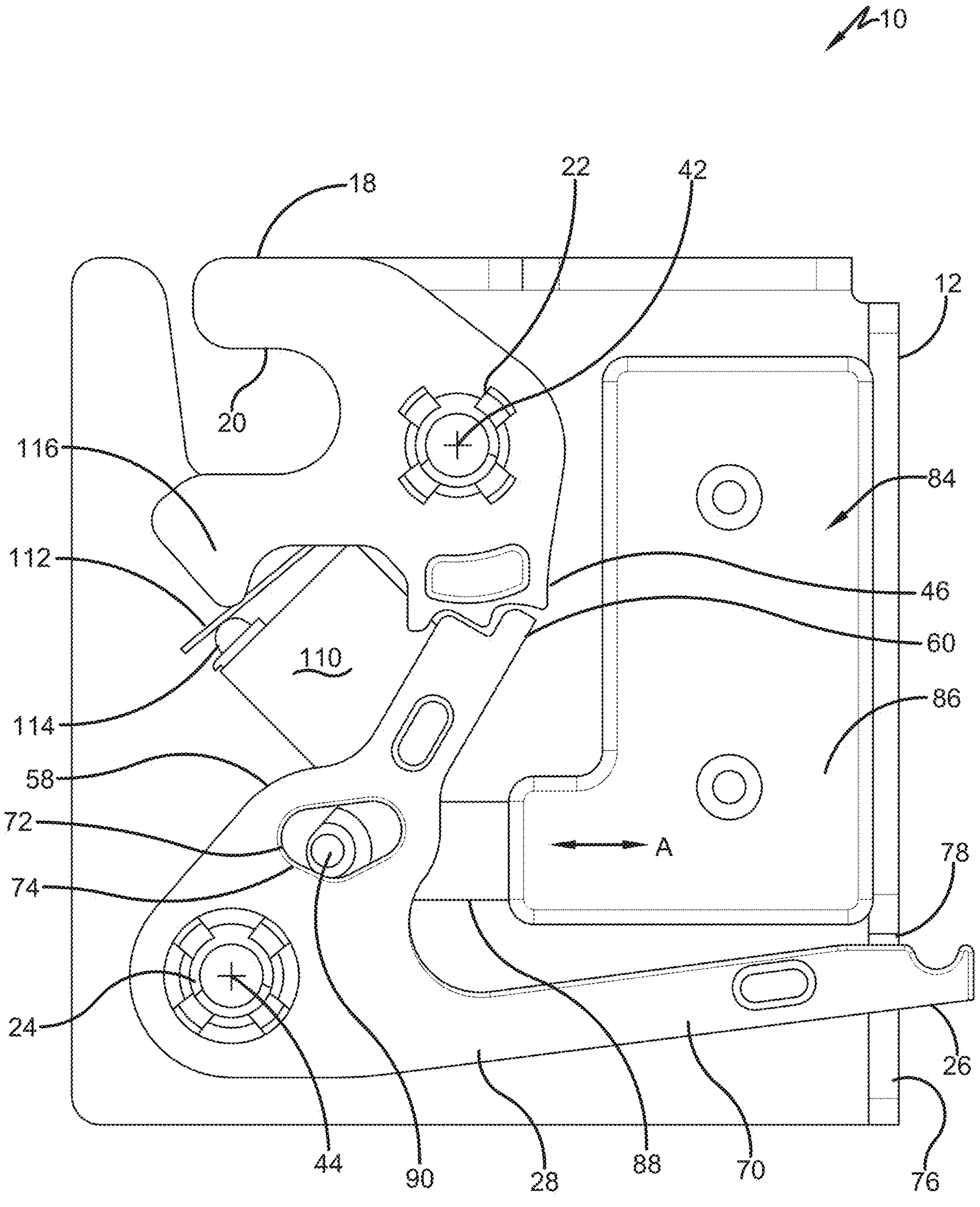
FIG. 4 is a right side sectional view showing the interior of the exemplary latch and the components therein and with the jaw in the latched position.

As shown in FIG. 4, the exemplary jaw 18 is rotatably movably mounted in operative connection with the housing. The exemplary jaw 18 is rotatably movable about the post 22 and an axis 42 which is in centered relation relative to the post 22. Axis 42 is alternatively referred to herein as a jaw pivot. The exemplary pawl 28 is rotatably movably mounted in operative connection with the housing. The pawl 28 is rotatable about the post 24 and an axis 44 which is in centered relation relative to the post 24. Axis 44 is alternatively referred to herein as a pawl pivot.

In this exemplary arrangement the jaw 18 is substantially L-shaped and includes an inner end 46. The inner end of the jaw is disposed on an opposed side of the jaw pivot from the notch 20. As better shown in FIG. 7 the inner end 46 of jaw 18 includes a plurality of jaw engagement projections 48, 50, 52 and a plurality of jaw engagement recesses 54, 56. While in the exemplary arrangement the inner end of jaw 18 includes three jaw engagement projections and two jaw engagement recesses, this configuration is merely exemplary and in other arrangements other numbers of projections, recesses or other engaging features may be used.

In the exemplary arrangement the pawl 28 includes a first arm portion 58. The first arm portion 58 radially extends relative to the pawl pivot 44. First arm portion 58 terminates radially outward at a radially outward end which is alternatively referred to as a distal end 60. As better shown in FIG. 7, distal end 60 includes pawl engagement projections 62, 64 and pawl engagement recesses 66, 68. Of course it should be understood that this arrangement comprising two engagement projections and engagement recesses is exemplary and in other arrangements different types and numbers of engaging structures configured for engaging the distal end of the pawl and the inner end of the jaw may be used.

The exemplary pawl 28 further includes a second arm portion 70. The second arm portion 70 extends radially away from the pawl pivot 44 and terminates outwardly at the actuating end 26. In the exemplary arrangement the distal end of the first arm portion 58 is angularly disposed from the actuating end of second arm portion 70 relative to the pivot, at an acute angle AA (see FIG. 11). Of course it should be understood that this arrangement is exemplary and in other arrangements other configurations may be used.

In the exemplary arrangement the first arm portion 58 includes an opening 72 that is alternatively referred to herein as an arm slot. The arm slot 72 is positioned radially intermediate of the pawl pivot 44 and the distal end 60. The exemplary arm slot 72 extends through the pawl and is bounded by an arm slot side wall 74. In the exemplary arrangement the arm slot 72 is arcuately elongated relative to the pivot and linearly elongated and has an elongated and widened generally oval-shape for reasons that are later discussed. However in other arrangements other configurations may be used.

The exemplary housing 12 includes an arm portion opening 76. The second arm portion 70 of the pawl 28 extends through the arm portion opening 76 such that the actuating end 26 of the second arm portion movably extends outside the housing. In the exemplary arrangement the arm portion opening 76 is bounded by pawl stop 78. In the exemplary arrangement the pawl stop 78 bounds one side of the arm portion opening 76 and serves to limit rotation of the pawl in the counterclockwise direction as shown, to the engaged position of the pawl in which the distal end 60 of the pawl is in engagement with the inner end 46 of the jaw. Of course this configuration is exemplary and in other arrangements other forms of stops or structures for limiting movement of the pawl may be used.

In the exemplary arrangement of the latch, the jaw 18 is in operative connection with a jaw spring schematically indicated 80. In the exemplary arrangement the jaw spring 80 is operative to bias the jaw 18 so as to urge the jaw to rotate in a clockwise direction about the jaw pivot 42 as shown. In some exemplary arrangements the jaw spring comprises a torsion spring that extends in surrounding relation of the post 22. Of course it should be understood that this configuration is exemplary and in other arrangements other types of jaws, springs and spring configurations may be used.

Figure 5:
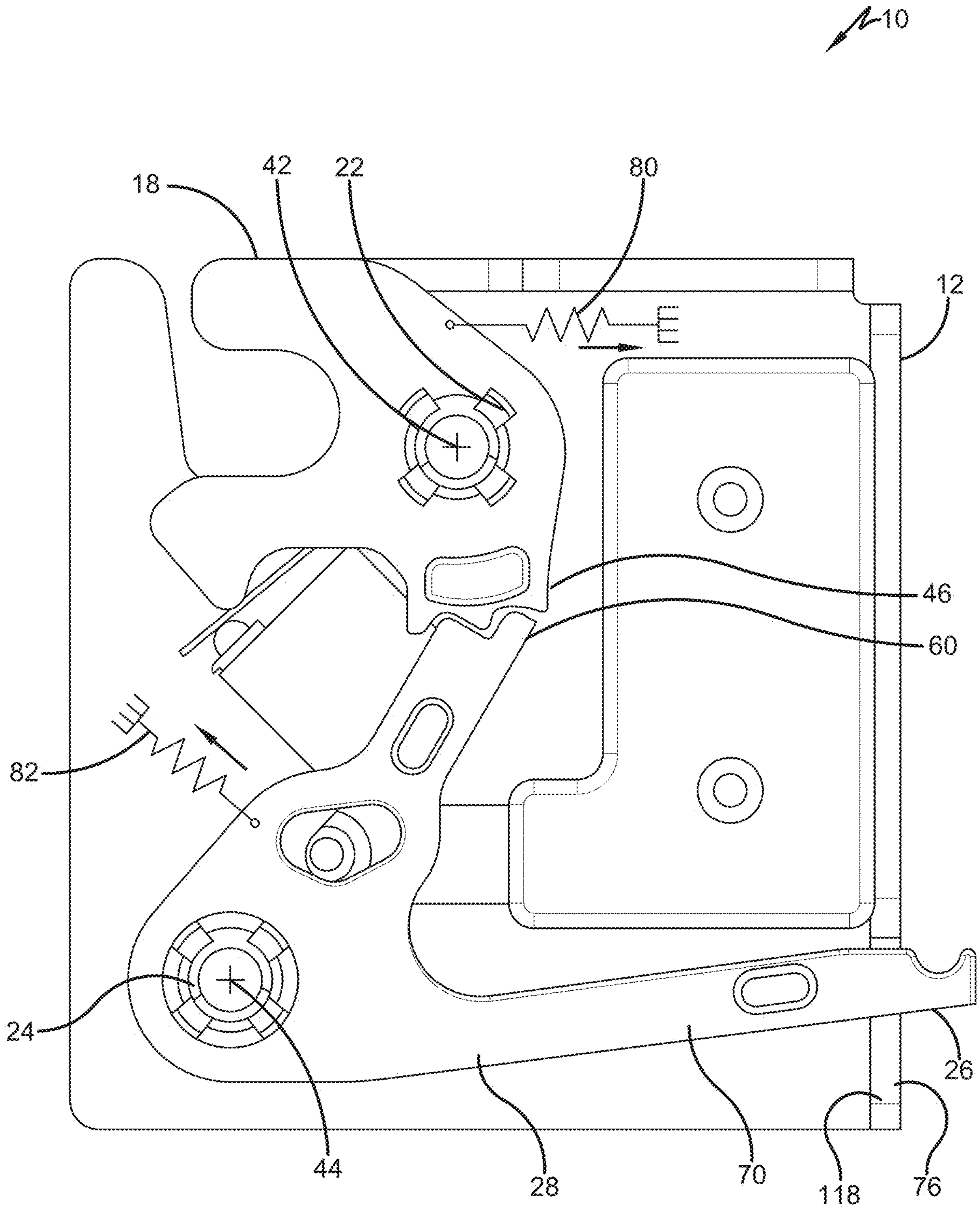
FIG. 5 is a view similar to FIG. 4 that includes a schematic representation of the springs that act on the jaw and the pawl of the exemplary arrangement.

In this exemplary arrangement of the latch, the pawl 28 is in operative connection with a pawl spring which is schematically indicated 82. In this exemplary arrangement the pawl spring 82 is operative to rotationally bias the pawl 28 in a counterclockwise direction relative to the pawl pivot 44 as shown. The exemplary pawl spring 82 is operative to bias the distal end 60 of the first arm portion of the pawl 28 into engagement with the inner end 46 of the jaw 18. In such engaged position of the pawl and in the latched position of the jaw as shown in FIGS. 4 and 5, the pawl is operative to hold the jaw in the latched position as shown. In the exemplary arrangement the pawl spring comprises a torsion spring that extends in surrounding relation of the post 24. However in other exemplary arrangements other types of spring arrangements and configurations may be used.

The exemplary latch further includes an electric actuator 84. Electric actuator 84 extends in the housing 12. The electric actuator is in connection with wires or other electrical conductors (not shown) through which electrical signals are received. The exemplary actuator 84 includes a case 86 which houses internal components of the actuator which are later described in detail. A tie rod 88 extends outside the case. The tie rod 88 is selectively movable linearly straight in the direction of Arrow A. The tie rod 88 is connected to a pin 90. The pin 90 extends transversely in the arm slot 72.

Figure 11:
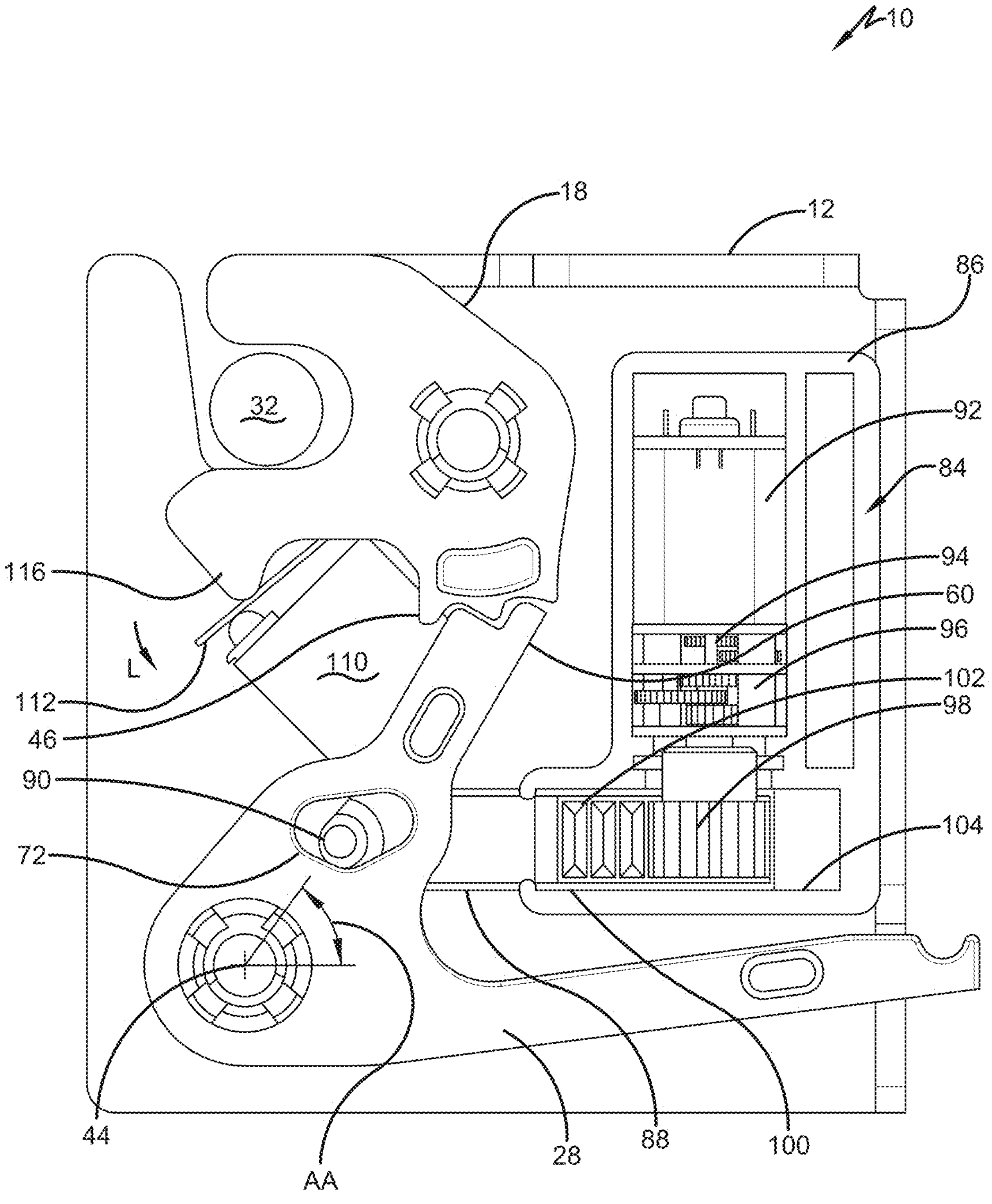
FIG. 11 is a sectional view showing the latch with the jaw in the latched position and in engagement with the striker.
Figure 12:
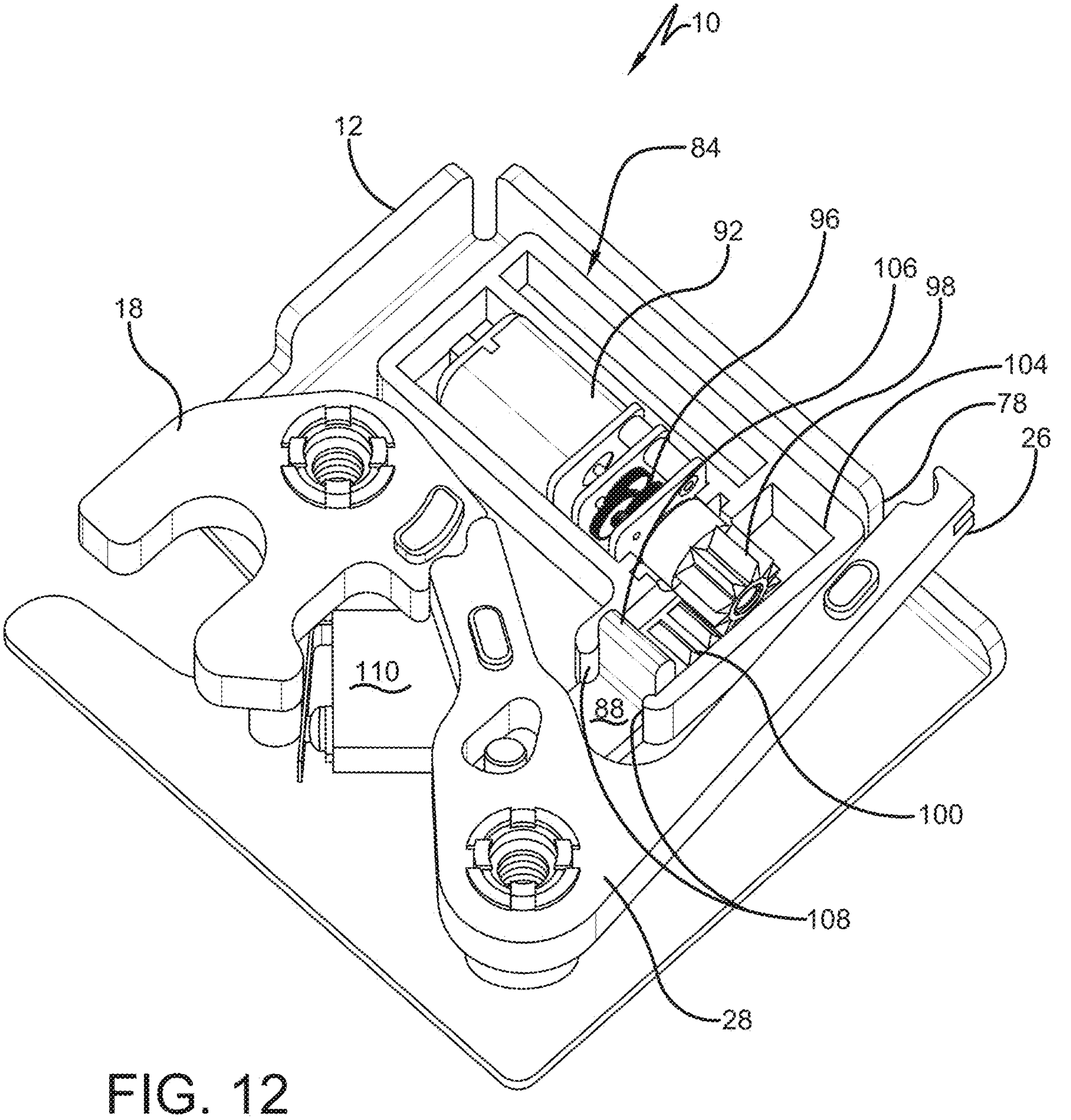
FIG. 12 is a perspective view of the latch with the jaw in the latched position as shown in FIG. 11.
Figure 13:
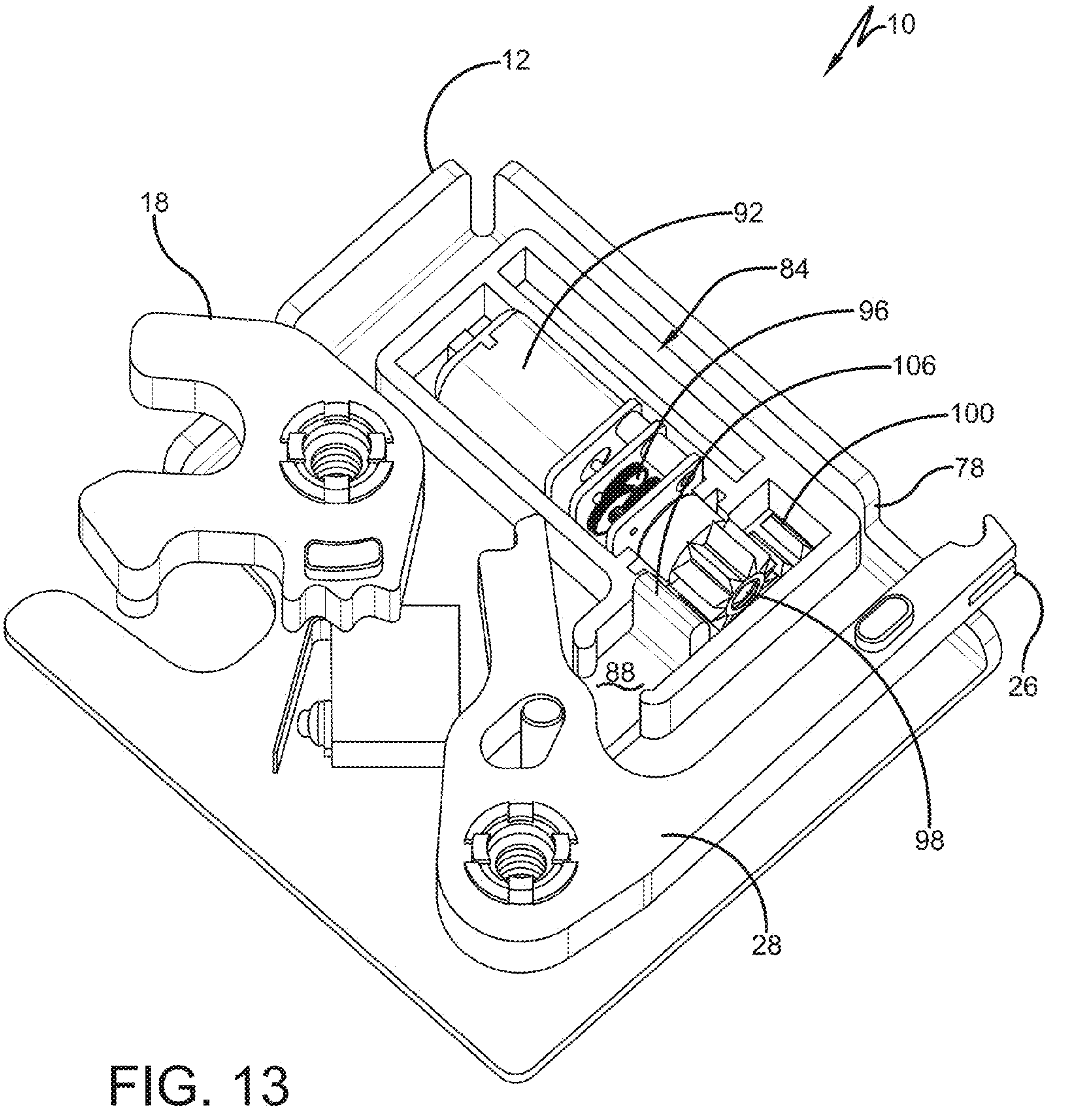
FIG. 13 is a perspective view of the electric actuator operating to move the pawl to the disengaged position to cause the jaw to move to the unlatched position.

As shown in detail in FIGS. 11-13 the actuator 84 includes a motor 92 which is positioned inside the case 86. The motor includes an output shaft 94. The output shaft 94 of the motor is selectively rotatable in either rotational direction. The output shaft 94 of the motor is operative to rotate a plurality of gears that are included in a gearbox 96. The gearbox 96 includes an output shaft that is in operative connection with a pinion 98. The gearbox 96 is operative to step down the speed from the output shaft 94 of the motor so that the pinion 98 rotates at a lower speed than the output shaft of the motor.

In the exemplary arrangement a rack 100 is in operative connection with the pinion 98. The rack 100 includes rack gear teeth 102 thereon that are in meshing engagement with the gear teeth on the pinion. The rack is guided to move within a track 104 within the case 86 so that the rack is caused to move linearly straight and selectively inward and outward from an opening in the case. The tie rod 88 is operatively connected to the rack 100 such that rotation of the pinion 98 causes movement of the tie rod 88 and the pin 90.

In the exemplary arrangement the rack 100 is in operative connection with a bumper 106. In the exemplary arrangement the bumper 106 is operative to limit movement of the rack in a direction away from the pinion 98 as well as toward the pinion 98. As represented in FIG. 12 movement of the rack 100 away from the pinion 98 is limited by engagement of the bumper 106 with inward extending stops 108 which extend at the opening to the track 104. As shown in FIG. 13 the bumper 106 limits inward travel of the rack 100 by engagement with the pinion 98. Of course it should be understood that this approach to limiting travel of the rack is exemplary and in other arrangements other approaches may be used.

In the exemplary arrangement an electrical switch 110 is positioned within the housing 12. The exemplary switch 110 includes a resilient lever 112. The switch 110 includes a plunger 114. The exemplary switch changes its electrical condition responsive to movement of the resilient lever 112 as the lever 112 engages and moves the plunger 114.

The exemplary jaw 18 includes a jaw switch projection 116. The jaw switch projection 116 is configured to operatively engage the resilient lever 112 and to cause movement and positioning of the resilient lever so as to change the electrical condition of the switch 110. For example as shown in FIG. 4, in the latched position of the jaw 18 the jaw switch projection engages the lever 112 and causes movement thereof so that the plunger 114 is depressed. This causes switch 110 to be in a first electrical condition which is indicative that the jaw is in the latched position.

Figure 7:
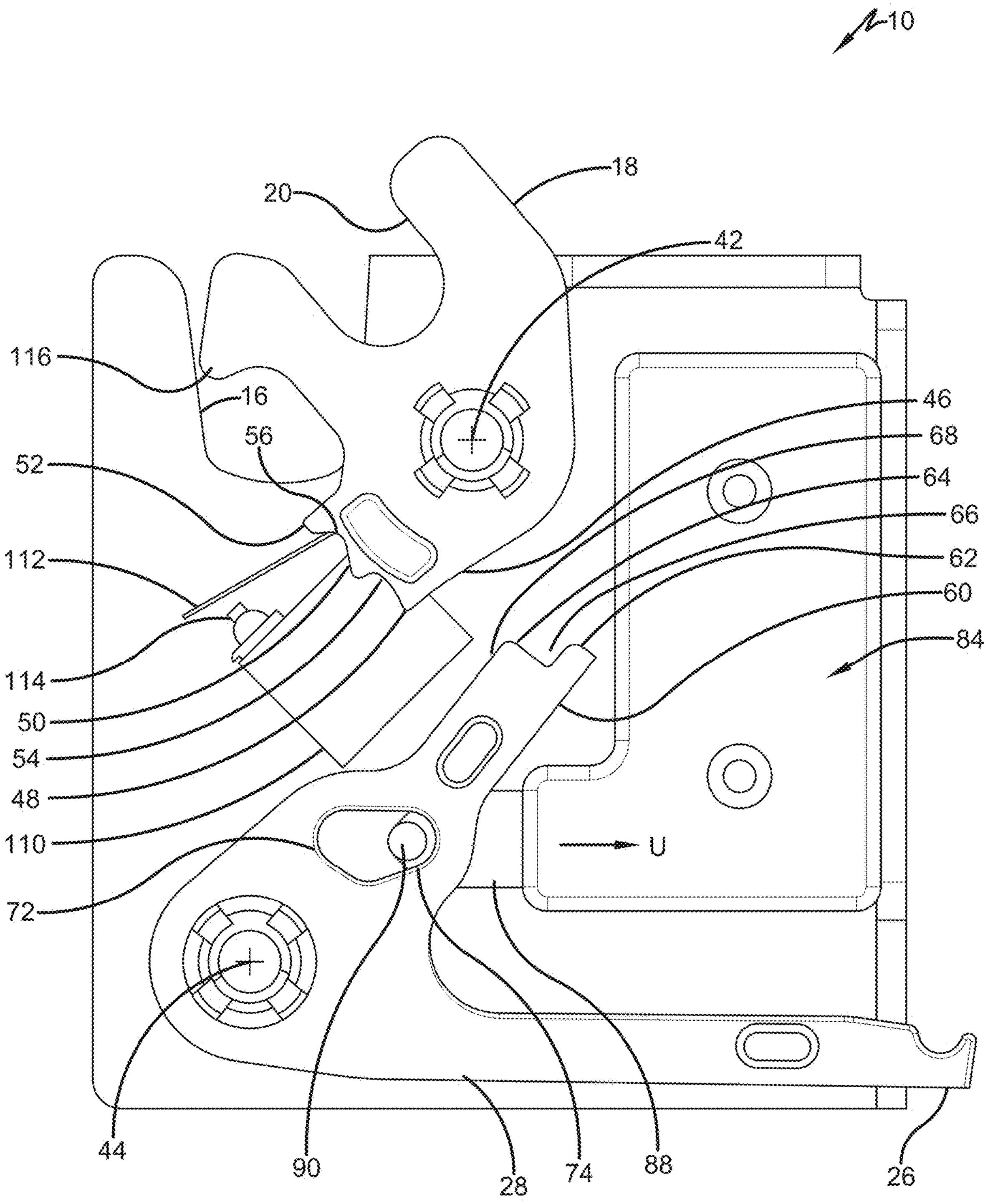
FIG. 7 is a sectional view showing the internal components of the latch with the jaw in an unlatched position.

When the jaw 18 moves to the unlatched position such as is shown in FIG. 7, the jaw switch projection 116 moves away from the resilient lever 112. The lever 112 moves away from the plunger 114 which causes the switch 110 to be in a second electrical condition that is different from the first electrical condition. In this way it can be detected that the jaw 18 is in the latched or unlatched position. Of course it should be understood that this configuration is exemplary and in other arrangements other approaches may be utilized to indicate the position of the jaw and/or the condition of the latch.

Figure 6:
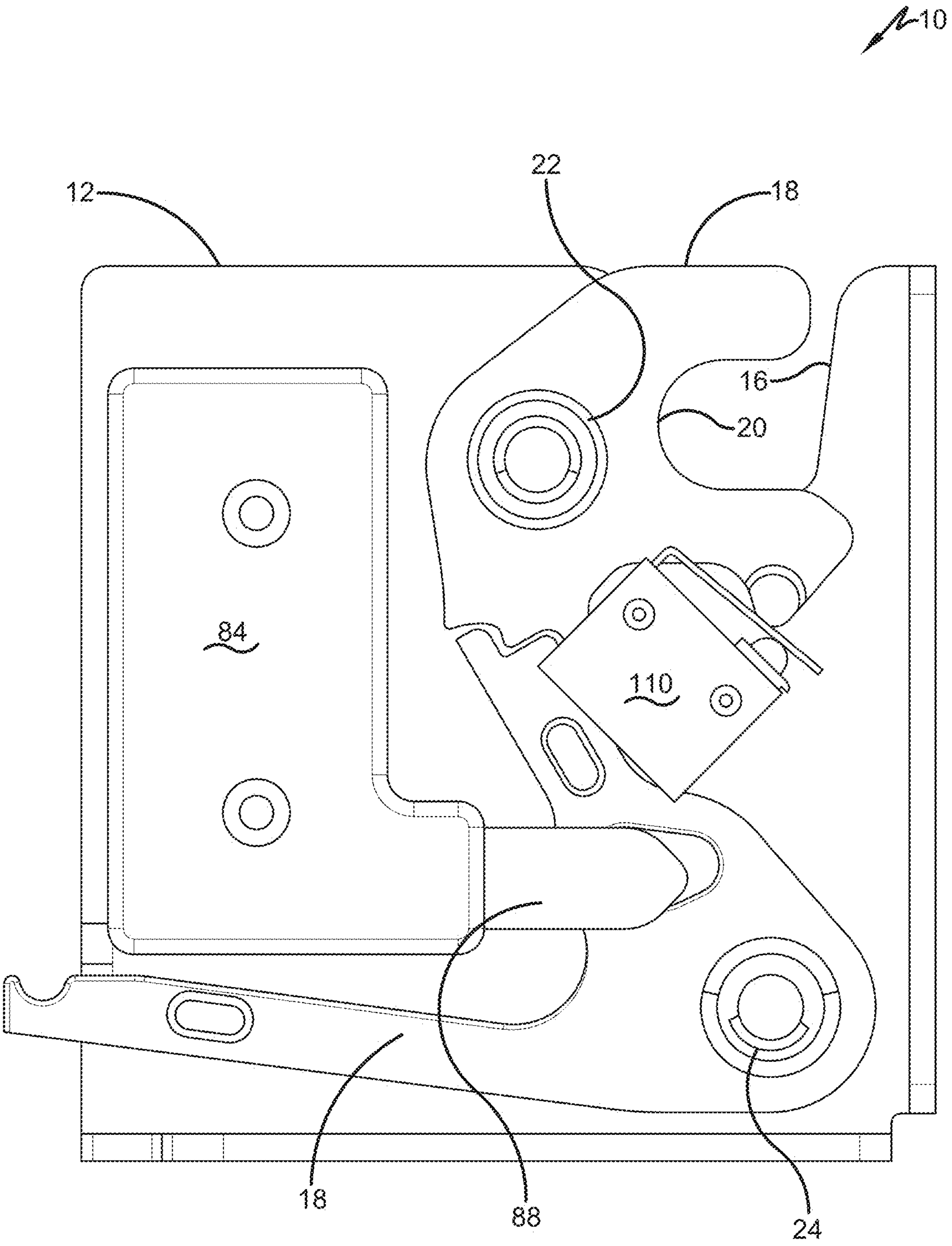
FIG. 6 is a left side sectional view of the latch showing the components within the latch with the jaw in the latched position.

In operation of the latch when the jaw 18 is in the latched position and the pawl 28 is in the engaged position as shown in FIGS. 4, 5 and 6, the jaw engagement projections and jaw engagement recesses are interengaged with respective pawl engagement recesses and projections. Such interengagement of the corresponding projections and recesses on the distal end 60 of the pawl and the inner end 46 of the jaw are operative to hold the jaw in the latched position. As can be appreciated when the striker is engaged in the notch 20 of the jaw and in the recess 16 of the housing, such as is shown in FIG. 2, the striker is prevented from disengaging from the jaw and the recess. The forces applied to the jaw by jaw spring 80 and the pawl by pawl spring 82 are operative to hold the jaw and the pawl in engaged relation such that forces that may be applied by the striker and that attempt to rotate the jaw toward the unlatched position are resisted by the pawl.

Figure 8:
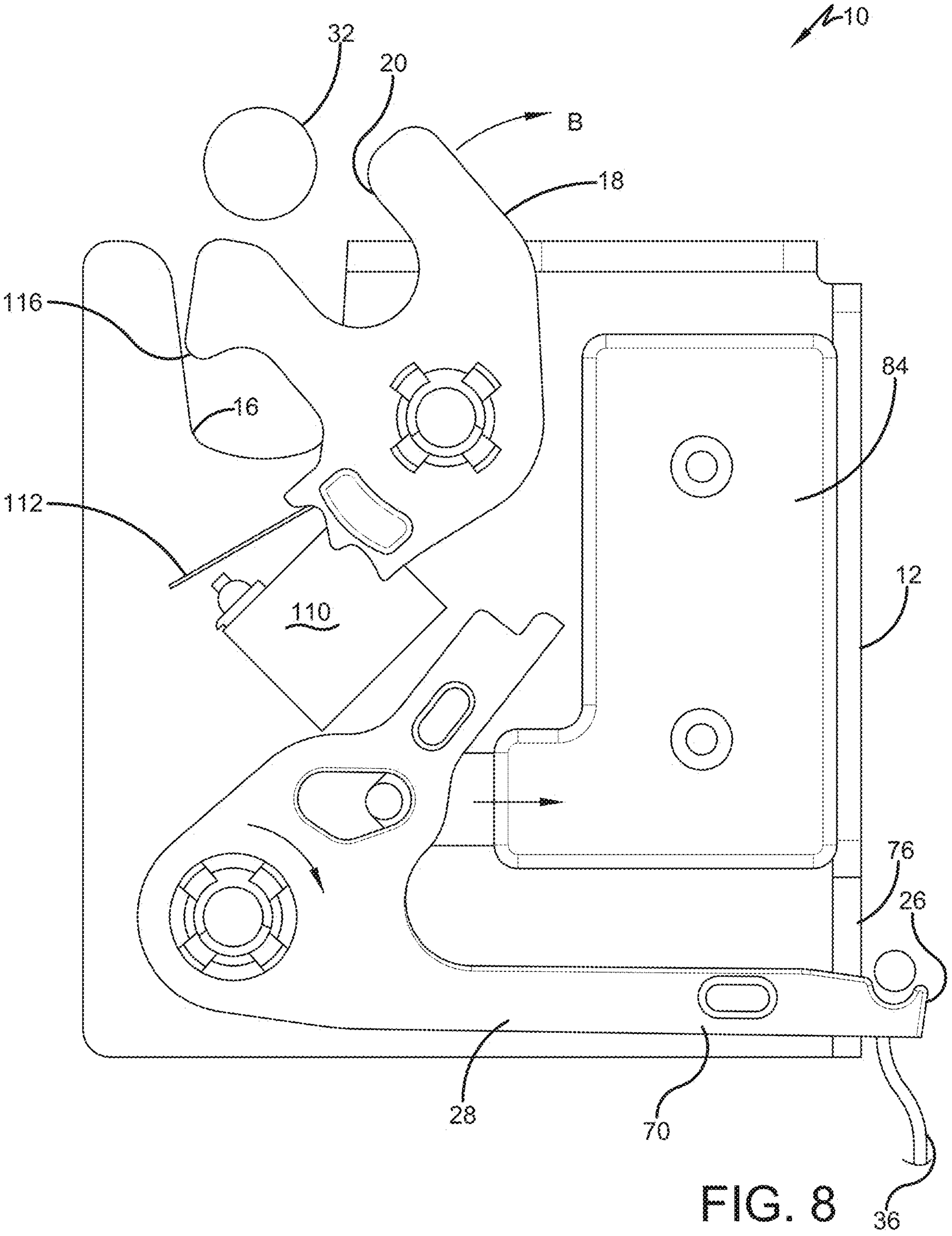
FIG. 8 is a sectional view similar to FIG. 7 showing disengagement of the striker from the jaw in the unlatched position of the jaw.

When the jaw is desired to be moved to the unlatched position such as is shown in FIGS. 7 and 8 through operation of the electrical actuator 84, electrical power is applied to the motor 92. Rotation of the motor 92, the output shaft 94 and the gears in the gearbox 96 are operative to cause the pinion 98 to rotate, causing the rack 100 to move from the position shown in FIG. 12 to the position shown in FIG. 13. Such movement of the rack 100 causes the tie rod 88 to move toward the actuator in the direction of Arrow U shown in FIG. 7. Such movement causes the pin 90 to move linearly within the slot 72 and engage the arm slot sidewall 74 which bounds the slot. Movement of the pin 90 in engagement with the side wall is operative to cause the pawl 28 to move in a clockwise direction as shown about the pawl pivot 44 against the force of the pawl spring 82. Such movement of the pin 90 causes the distal end 60 of the pawl to move from the engaged position to the disengaged position shown in FIGS. 7 and 8. Such movement of the pawl enables the jaw to rotate about the jaw pivot 42 assisted by the force applied by the jaw spring 80 as indicated by Arrow B. The jaw moves rotationally from the latched position to the unlatched position shown in FIGS. 7 and 8 so that the striker 32 may move out of and disengage from the notch 20 and the housing recess 16.

As represented in FIG. 8, the movement of the jaw 18 to the unlatched position causes the jaw switch projection 116 to disengage from the lever 112 such that the switch 110 changes its electrical condition. Further in the exemplary arrangement the actuating end 26 of the second arm portion 70 of the pawl 28 moves within the opening 76 in the housing 12. In the exemplary arrangement such movement is accommodated by the cable 36 flexing or otherwise accommodating the slack that results from the movement of the actuating end 26. Of course these approaches are exemplary and in other arrangements other approaches may be used.

In the exemplary arrangement the actuator is operated to enable the pawl 28 to rotate to return to a position in which the pawl can again engage the jaw when the jaw is moved from the unlatched position toward the latched position. In the exemplary arrangement this is done by the motor of the actuator operating in an opposite rotational direction from the direction of rotation when the actuator unlatches the pawl. The actuator operates to cause the tie rod 88 and the pin 90 to return to the positions shown in FIGS. 9 and 11. In exemplary arrangements the bumper 106 assures that the actuator returns to the proper position. In this position the pawl 28 is biased by the pawl spring 82 to rotate in a counterclockwise direction about the pawl pivot 44. In the exemplary arrangement the pawl 28 rotates counterclockwise as shown responsive to the spring until the second arm portion engages the pawl stop 78 that bounds the pawl opening 76.

Figure 9:
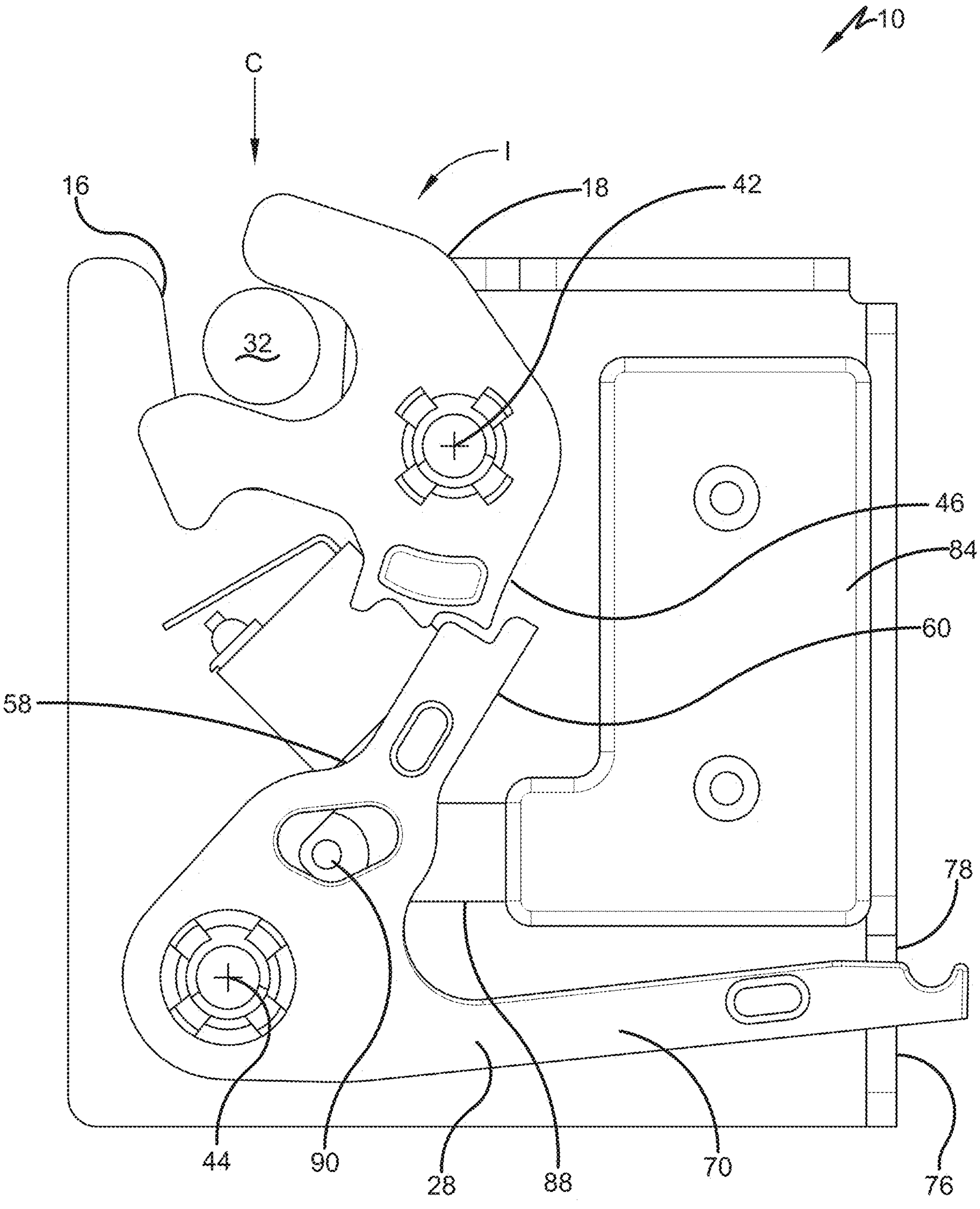
FIG. 9 is a sectional view of the latch showing the internal components of the latch when the striker moves the jaw to a secondary latched position.
Figure 10:
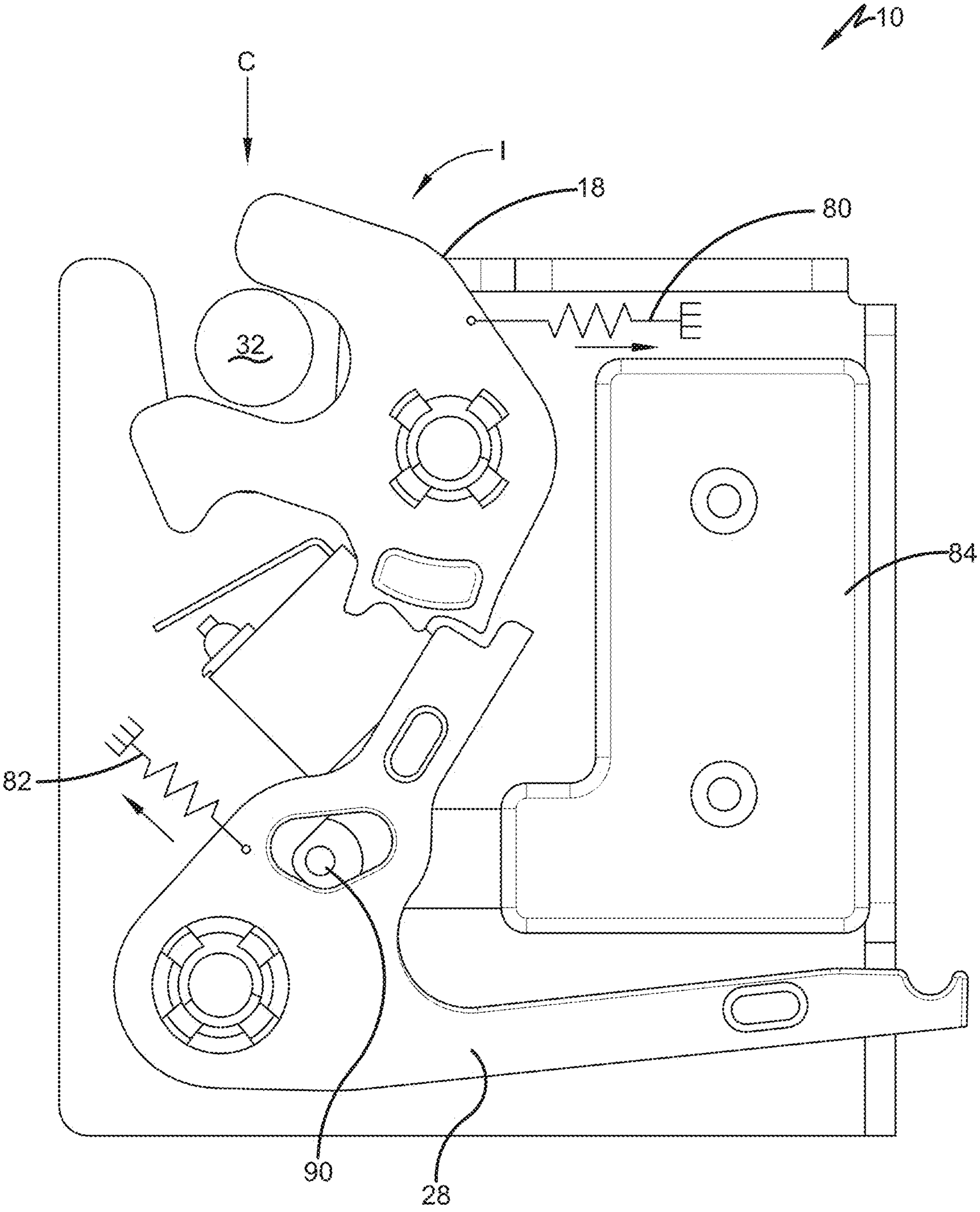
FIG. 10 is a sectional view similar to FIG. 9 that shows schematically the spring forces acting on the jaw and the pawl when the jaw is in the secondary latched position.

When the closure member is to be closed, the striker 32 is again engaged with the jaw 18 by movement into the notch 20. This is represented in FIG. 9 by Arrow C. Movement of the striker 32 into the notch 20 and the recess 16 in the housing is operative to cause the jaw 18 to move from the unlatched position and to rotate counterclockwise as shown in the direction of Arrow I about the jaw pivot 42. In the exemplary arrangement the inner end 46 of the jaw 18 engages the distal end 60 of the first arm portion 58 of the pawl 28. In this secondary latched position of jaw 18 shown in FIG. 9, the interengaging pawl and jaw engagement projections and recesses are operative to engage and act as a ratchet so that the jaw is prevented from moving by the pawl engagement from the secondary latched position shown in FIG. 9 to the jaw unlatched position. However the jaw is enabled to rotationally move from the secondary latched position to the latched position shown in FIG. 11 so as to fully position the striker 32 within the notch 11 and the recess. Such movement of the jaw 18 is enabled by the capability of the distal end 60 of the pawl to move in biased engagement with the inner end 46 of the jaw such that the respective projections and recesses thereon are fully engaged.

As can be appreciated from FIGS. 9 and 11 for example, as the jaw and pawl move as the jaw moves from the secondary latched position to the latched position of the jaw and the engaged position of the pawl respectively, the pin 90 remains stationary. The arm slot 72 moves relative to the pin 90 as the pawl 28 rotates about the pawl pivot 44 as the distal end 60 of the pawl and the inner end 46 of the jaw relatively move in engaged relation. Further as shown in FIG. 11, when the jaw 18 moves to return to the latched position, the jaw switch projection 116 engages with and causes movement of the lever 112 in the direction of Arrow L so that the electrical condition of switch 110 is changed to indicate that the jaw is in the latched position. Of course it should be understood that this arrangement is exemplary and in other arrangements other approaches may be used.

Figure 14:
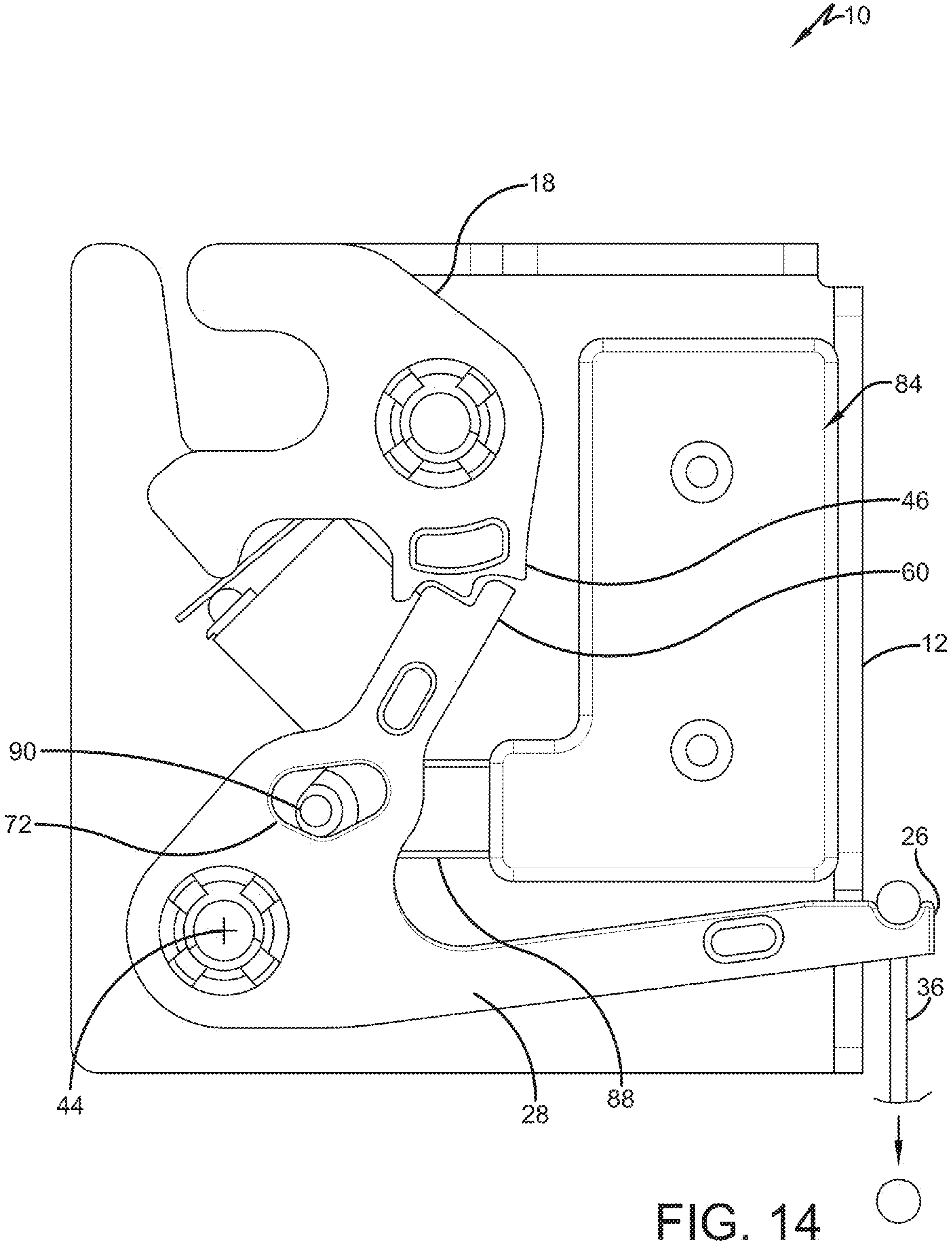
FIG. 14 is a sectional view showing the latch with the jaw in the latched position and movement of the actuating end of the pawl by the cable.
Figure 15:
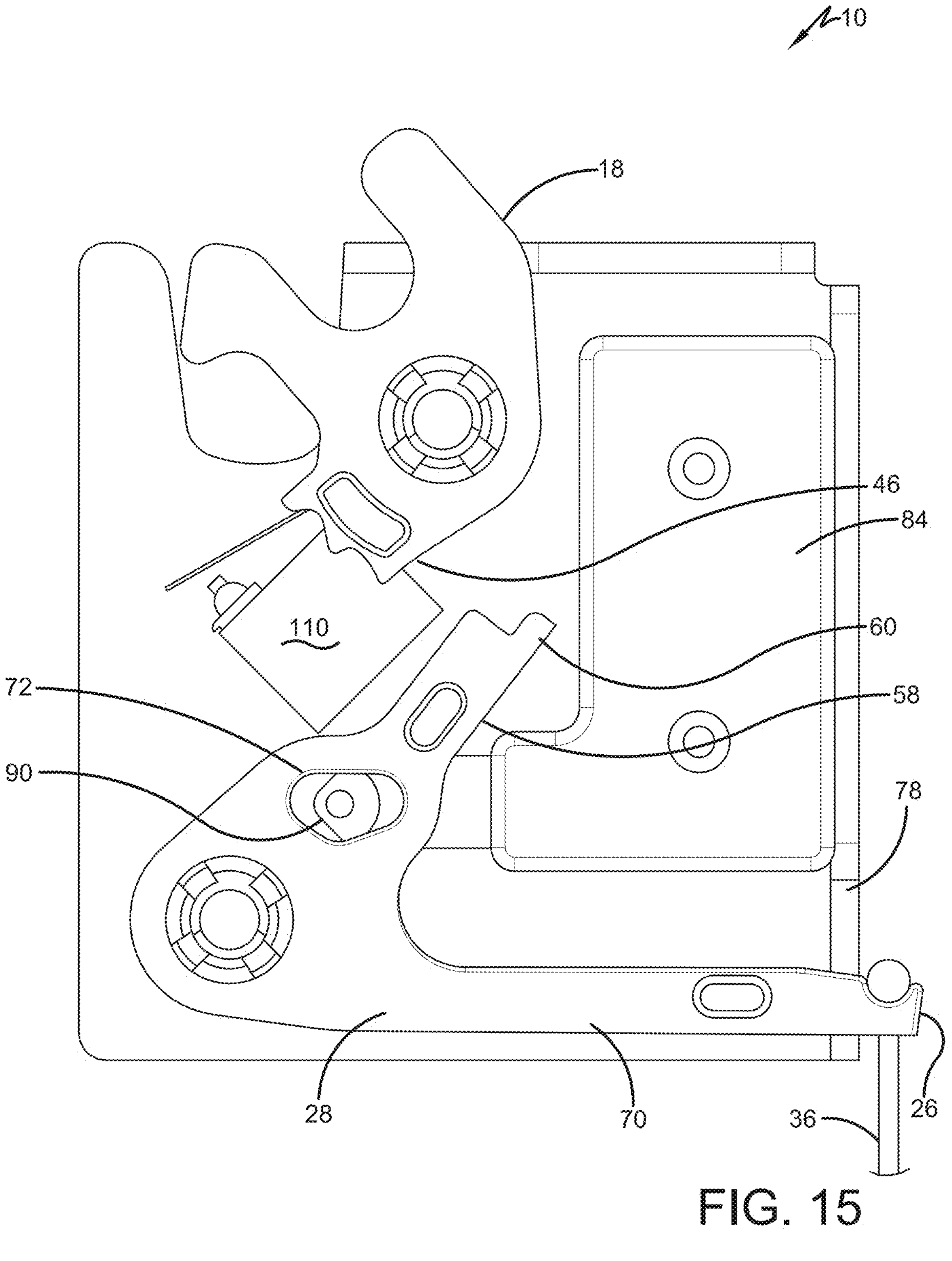
FIG. 15 is a sectional view showing the latch with the pawl moved through operation of the cable to cause the jaw to move to the unlatched position.

FIGS. 14 and 15 further demonstrate how the exemplary latch 10 may be changed from having the jaw 18 in the latched position to having the jaw in the unlatched position responsive to movement of the actuating end of the pawl 28. With the jaw 18 in the latched position as shown and the pawl 28 in the engaged position with the jaw as shown in FIG. 14, the jaw is held in the latched position. In this position the tie rod 88 is positioned by the actuator 84 so that the pin 90 extends in the arm slot 72 and is disposed away from the arm slot sidewall 74 that bounds the arm slot. In this position, movement of the cable 36 in the direction of Arrow O causes the actuating end 26 to move in the opening 76 of the housing 12. The actuating end moves until the second arm portion 70 is in engagement with a transverse wall 118 that bounds opening 76. This movement causes the pawl 28 to rotate in a clockwise direction as shown about the pawl pivot 44.

In the exemplary arrangement because the pin 90 is sufficiently disposed both radially and linearly away from the arm slot sidewall 74, the arm slot 72 is enabled to move relative to the pin unimpeded by engagement of the pin and the side wall. The pin 90 remains stationary as the pawl 28 rotates responsive to movement of the actuating end 26 and the arm slot 72 moves relative to the pin. Movement of the pawl 28 to the disengaged position shown in FIG. 15, causes the distal end 60 of the first arm portion 58 to disengage from the inner end 46 of the jaw 18. This causes the jaw to move responsive to the force of the jaw spring and rotate to the unlatched position.

As can be appreciated, once the cable 36 and the actuating end 26 of the pawl 28 are allowed to move responsive to the force of the pawl spring back toward the position where the second arm portion 70 of the pawl is engaged with the stop 78, the latch is ready to be again engaged with the striker. As the striker is engaged in the notch of the jaw and the jaw returns to the latched position, the latch can again be changed to release the striker and the associated closure member either by the electrical actuator 84 in response to electrical signals or alternatively through mechanical movement of the cable 36. Of course it should be understood that this latch configuration is exemplary and in other arrangements other configurations and structures utilizing the principles discussed herein may be utilized.

FIGS. 16-28 show an alternative arrangement of a latch generally indicated 120. Latch 120 is generally similar to latch 10 previously described except as noted. Latch 120 includes a housing 122. Housing 122 is generally similar to housing 12 previously discussed and in an exemplary arrangement includes side plates which have a recess therein similar to recess 16 previously discussed.

Within the housing 120 is a jaw 124. Jaw 124 includes a notch 126 that is sized for engaging a striker 128 which is shown in phantom in FIG. 17. The jaw 124 is rotatable about a post 130 and a central axis thereof. A pawl 132 that is generally similar to pawl 28 is rotatably movable within the housing about a post 134 and a central axis thereof. Pawl 132 includes a first arm portion 136 and a second arm portion 138. Second arm portion 138 extends through an arm portion opening 140 in the housing and terminates outside the housing at an actuating end 142. The actuating end may include a cable engaging recess or other configuration for engaging an actuating member.

Figure 16:
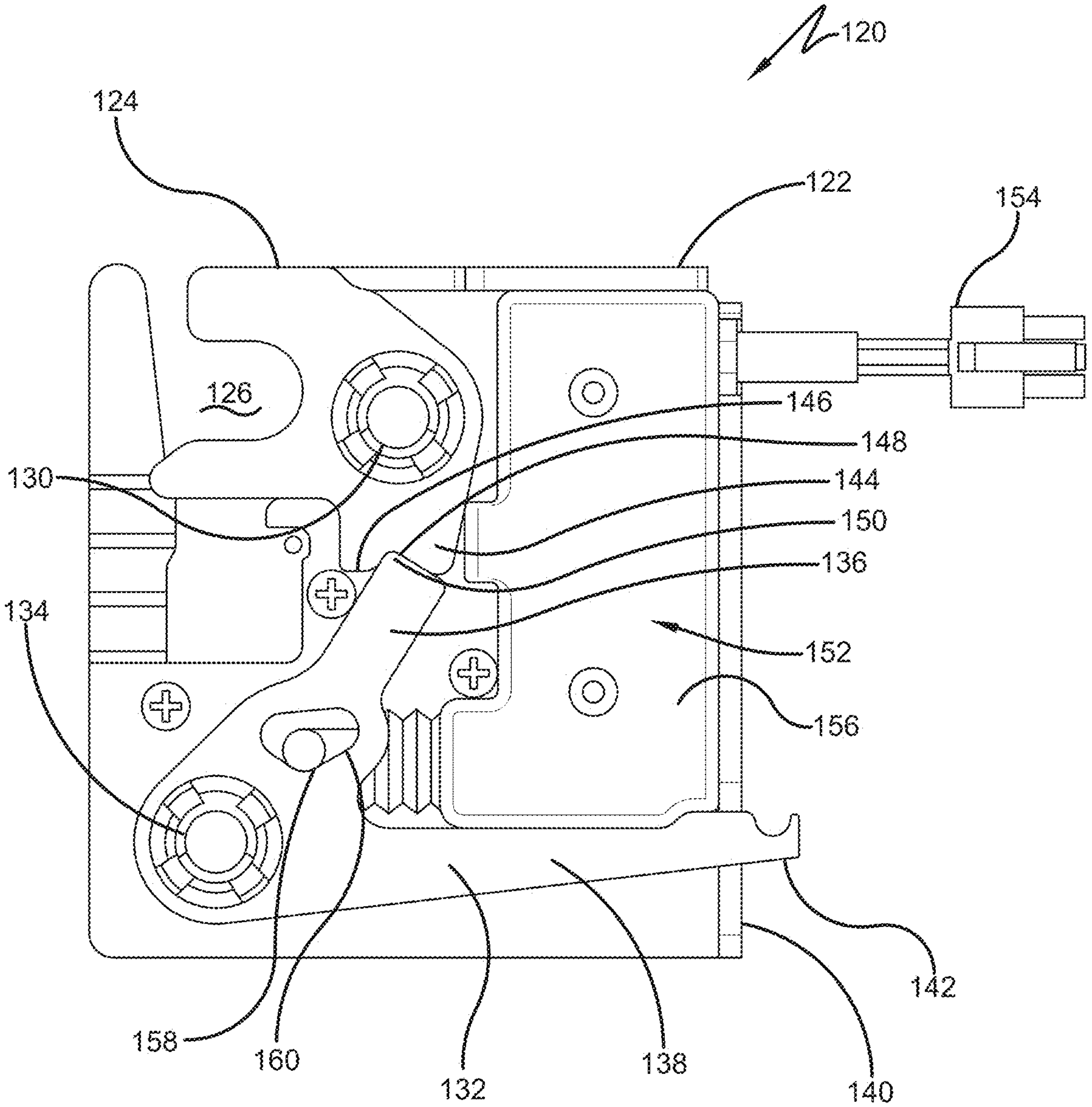
FIG. 16 is a front side sectional view of an alternative latch arrangement shown with the jaw in a latched position.

Jaw 124 includes an inner end 144. The exemplary jaw inner end includes a pair of jaw engagement projections 146 with an intermediate jaw engagement recess 148. The first arm portion 136 of the pawl includes a pawl engagement projection 150. In the latched position of the jaw 124 and the engaged position of the pawl 132 as shown in FIG. 16, the pawl engagement projection 150 is engaged in the jaw engagement recess 148. Such engagement is operative to hold the jaw in the latched position. Further in the exemplary arrangement the jaw is in operative connection with a jaw spring similar to jaw spring 80 of the previously discussed arrangement which is operative to bias the jaw toward the unlatched position. A pawl spring similar to spring 82 is operative to bias the first arm portion 136 of the pawl toward the engaged position as shown in FIG. 16.

It should be appreciated that the exemplary arrangement shown in FIG. 16 is a latch that is of a single stage type that only has conditions in which the jaw is either in the fully latched position or the unlatched position. In this exemplary arrangement there is no intermediate position in which the jaw is held. However it should be understood that other arrangements may include an arrangement of jaw projections and recesses and pawl projections and recesses that are operable to enable holding the jaw in an intermediate position in engagement with the striker in a manner like that previously discussed.

Latch 120 includes an electric actuator 152. Electrical connector 154 is in operative connection with the electric actuator and extends outside the housing 122. The actuator includes a case 156. The exemplary actuator includes a cam follower as later discussed, that operatively extends outside the housing and is operatively connected to a pin 158. Similar to pin 90, pin 158 is selectively movable along a linearly straight actuating direction responsive to operation of the actuator 152.

Arm portion 136 of pawl 132 includes an arm slot or opening 160. Arm slot 160 is positioned radially intermediate of the axis of the post 134 about which the pawl rotates and the distal end of first arm portion 136. Opening/arm slot 160 is bounded by arm slot sidewall 162. Arm slot 160 is elongated both in the linear actuating direction of travel of pin 158 responsive to the actuator 152, as well as transversely of the actuating direction of pin travel. This enables the pawl 132 to be rotatably moved responsive to movement of the actuating end 142 without pin 160 interfering with such pawl movement.

Figure 17:
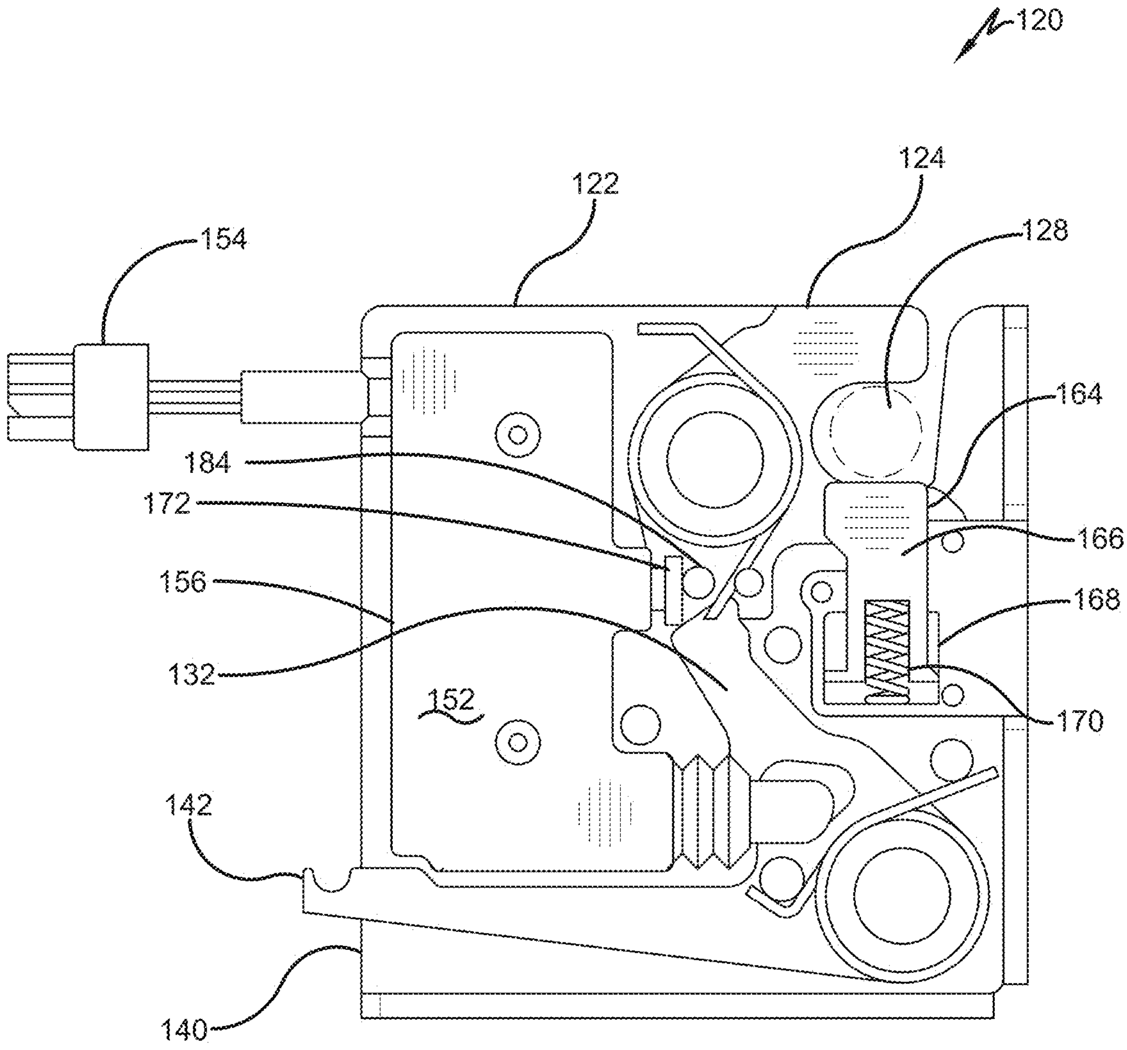
FIG. 17 is a back side sectional view of the alternative latch shown in FIG. 16.

As shown in FIG. 17 latch 120 further includes a plunger 164. Plunger 164 includes a plunger body 166 that is movable along a linear direction in guided relation within a plunger guide 168. The plunger 164 further includes a compression spring 170. The compression spring biases the plunger body 166 outwardly relative to the recess in the housing 122.

Figure 20:
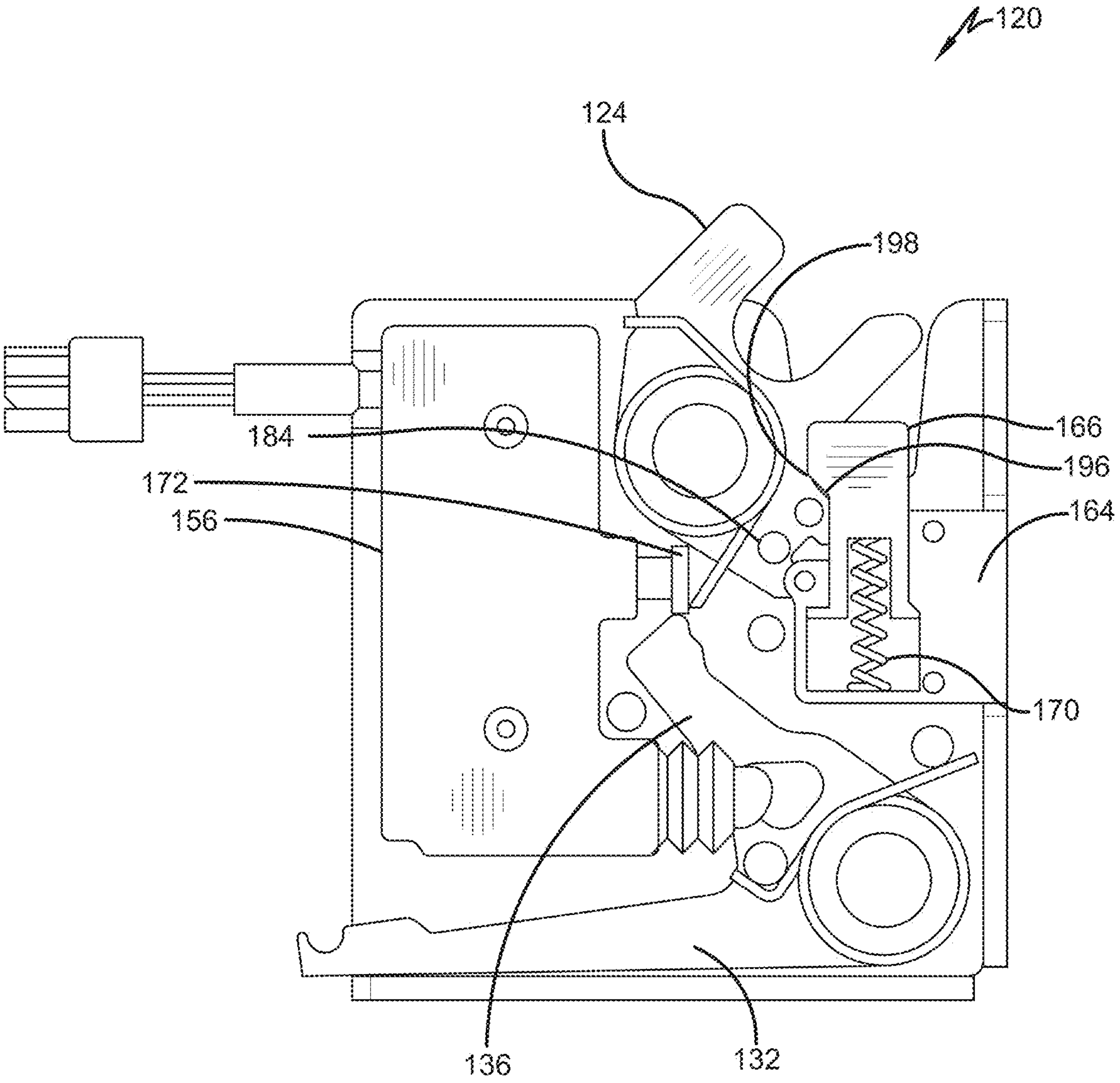
FIG. 20 is a back side sectional view of the alternative latch as shown in FIG. 19.
Figure 21:
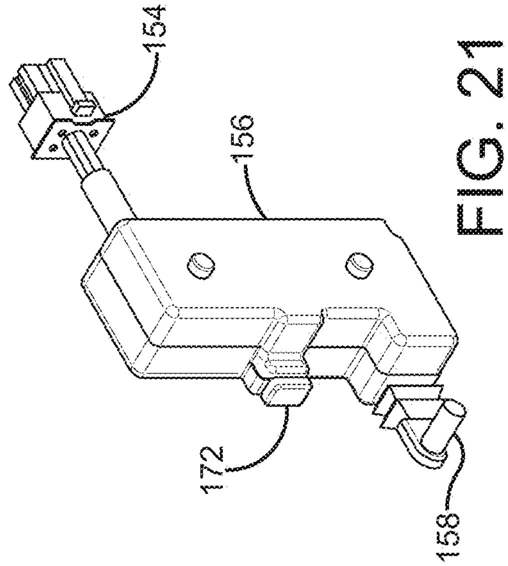
FIG. 21 is a top right perspective view of the electrical actuator shown in the latch of FIGS. 16-20 with the cam follower thereof extended.
Figure 22:
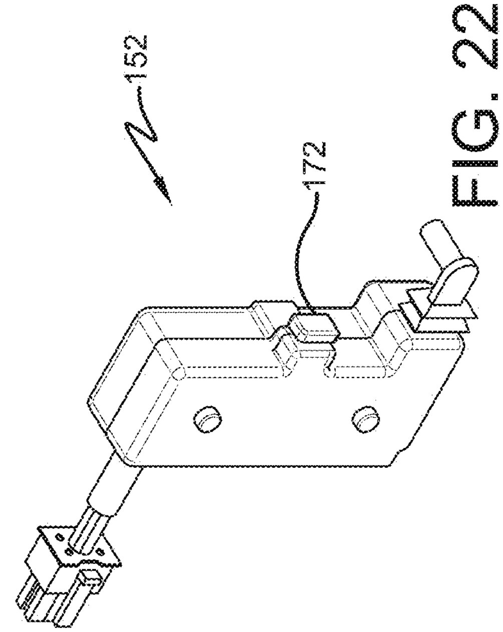
FIG. 22 is a top left perspective view of the electrical actuator shown in FIG. 21.
Figure 23:
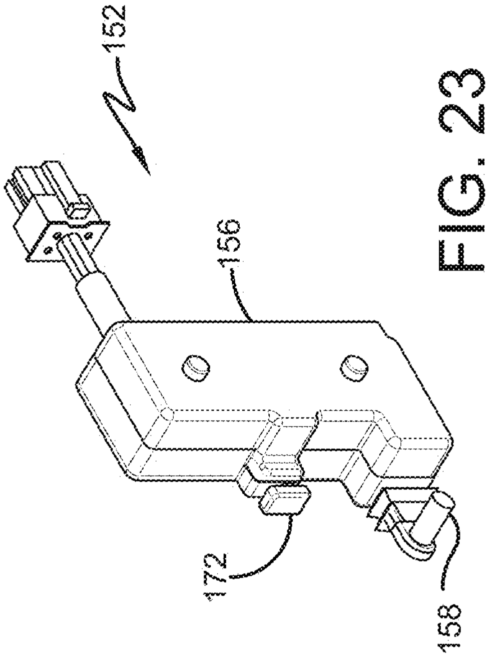
FIG. 23 is a top right perspective view of the electrical actuator shown in FIG. 21 with the cam follower thereof retracted.
Figure 24:
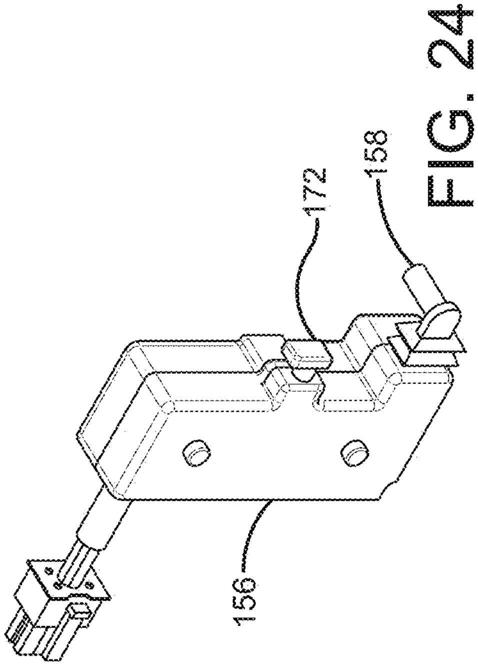
FIG. 24 is a top left perspective view of the electrical actuator shown in FIG. 23.

In the exemplary arrangement the plunger body 166 is in adjacent relation to the jaw 124. When the jaw 124 is in the latched position and in engagement with the striker 128, the plunger body is in abutting engagement with the striker. As shown in FIG. 20 when the pawl 132 rotates to enable the jaw 124 to move to the unlatched position, the plunger body 166 moves outward responsive to the biasing force of the spring 170 and helps to urge the striker 128 to disengage from the jaw 124 and the latch 120. As can be appreciated the plunger 164 acts to supplement the biasing force provided by the jaw spring to assist in releasing the striker when the pawl disengages the jaw and the latch is opened. When the striker is to be again engaged with the jaw 124, the striker engages the plunger body 166 as the jaw is moved from the unlatched position shown in FIG. 20 toward the latched position shown in FIG. 16. The plunger body 166 is moved against the force of the compression spring 170 through engagement with the striker so as to return the plunger to the initial position shown in FIGS. 16 and 17. Of course it should be understood that this configuration is exemplary and other arrangements other approaches may be used.

The exemplary case 156 of the electric actuator 152 also includes an integral electrical switch that is operative to electrically indicate the position of the jaw 124. As shown in FIGS. 21-28 a movable lever piece 172 extends outside the case 156. As shown in FIGS. 25-28 lever piece 172 includes a stem 174 and an enlarged head 176. The stem 174 is movable in an opening that extends through the case. The stem includes an inner end 178. The inner end 178 engages a movable actuator plate 180. The actuator plate is biased by springs 182 or other biasing members to urge the stem 174 and the lever piece 172 to extend outward from the case.

Figure 25:
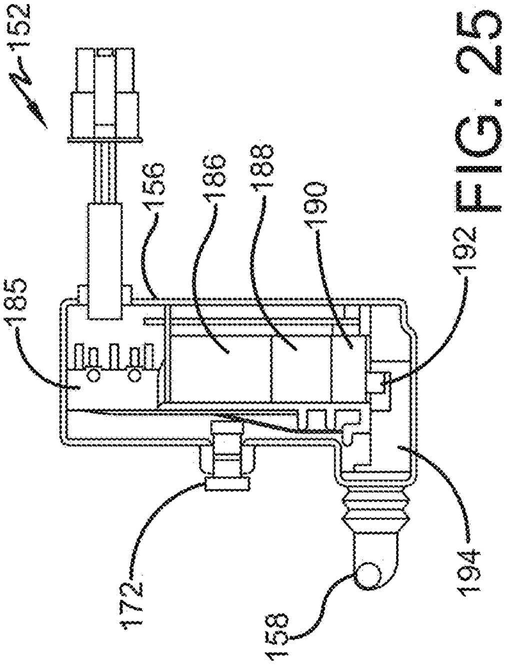
FIG. 25 is a right side sectional view of the actuator shown in FIG. 21.
Figure 26:
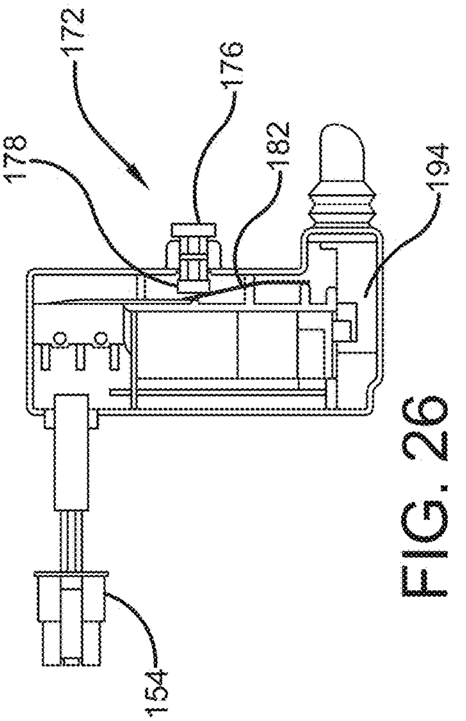
FIG. 26 is a left side sectional view of the actuator shown in FIG. 21.
Figure 27:
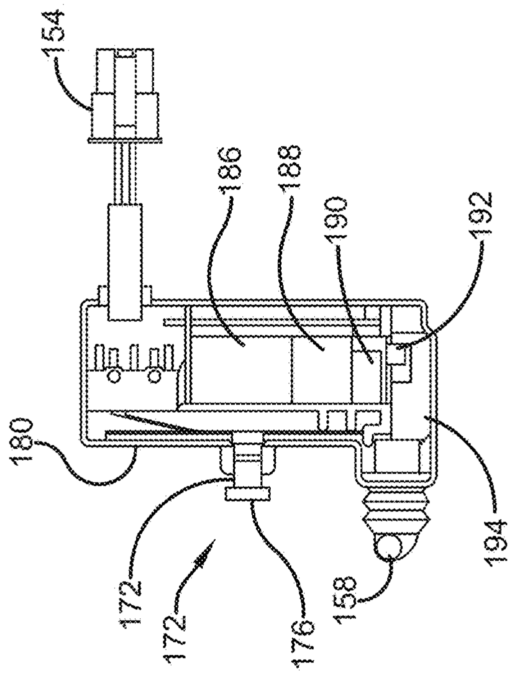
FIG. 27 is a right side sectional view of the actuator shown in FIG. 23.
Figure 28:
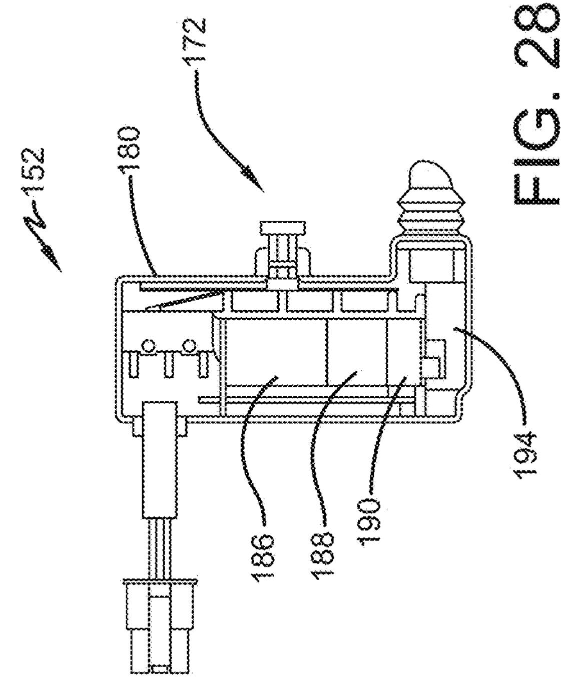
FIG. 28 is a left side sectional view of the actuator shown in FIG. 23.
Figure 29:
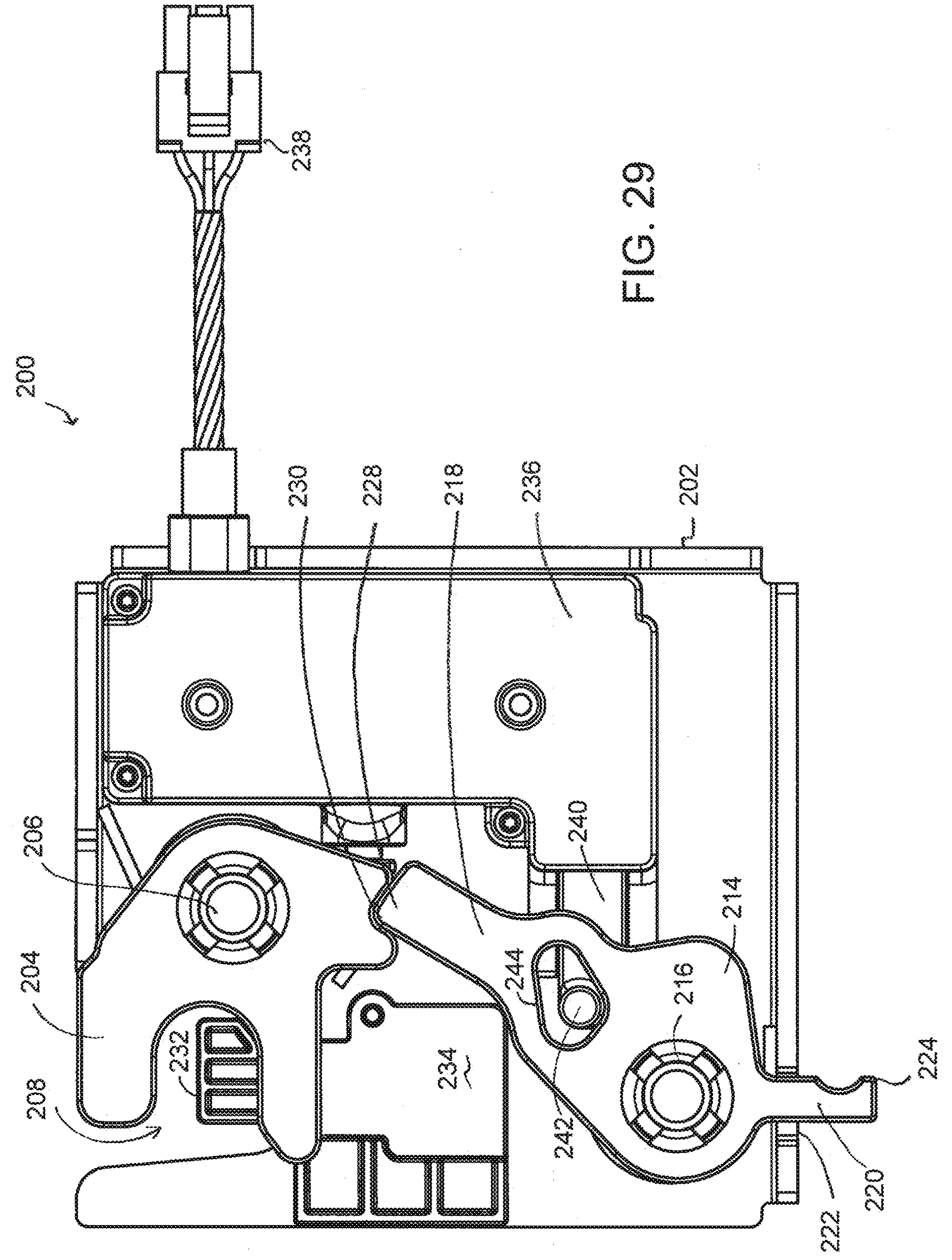
FIG. 29 is a front side sectional view of a further alternative latch arrangement with the jaw shown in the latched position.
Figure 30:
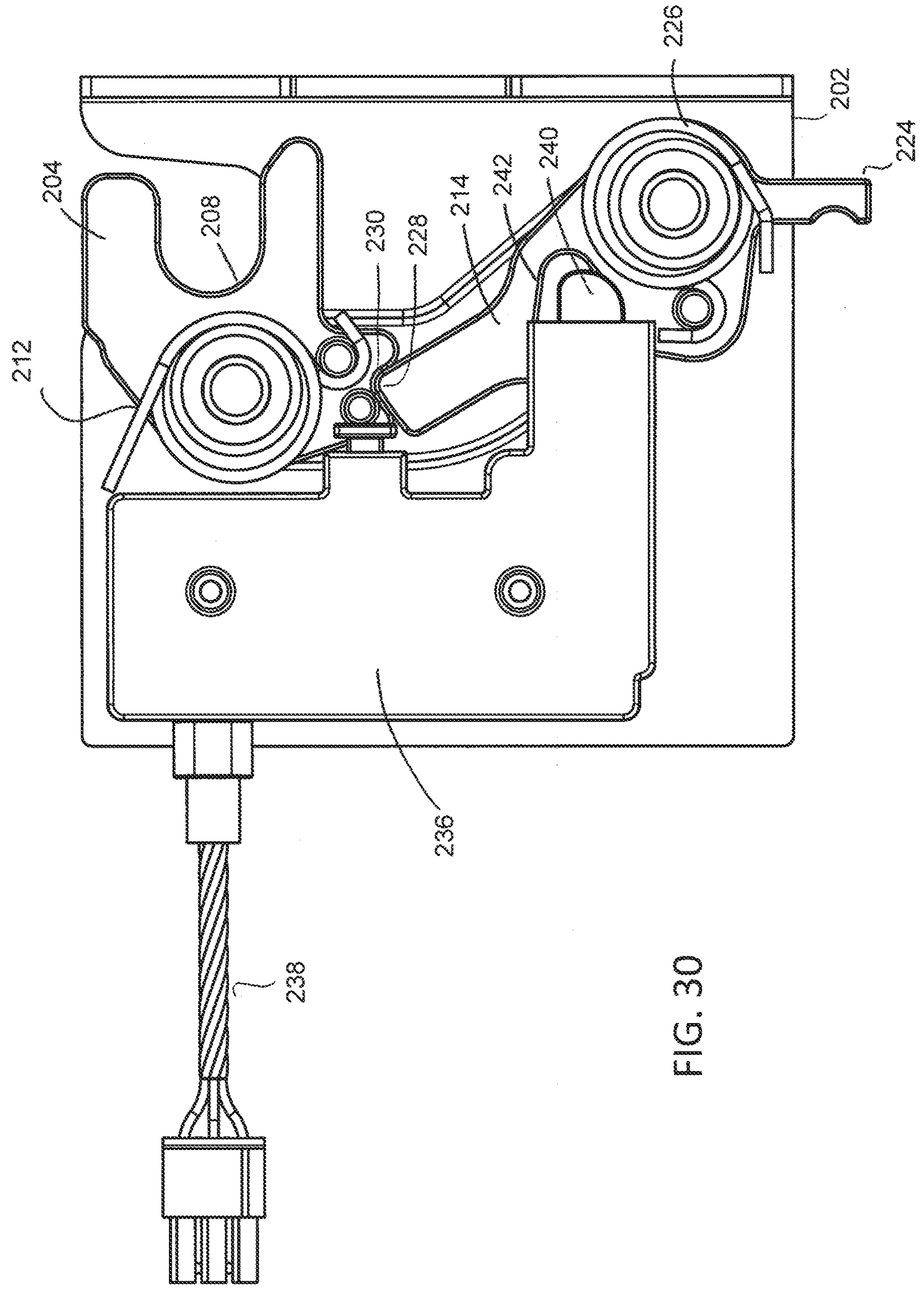
FIG. 30 is a back side sectional view of the latch shown in FIG. 29

A switch 185 is positioned within the case 156. The switch 184 includes an actuator which moves and changes the electrical condition of the switch responsive to the position of the lever piece and the actuator plate 180. FIGS. 25 and 26 show the lever piece 172 disposed inwardly on the case against the biasing force of the springs 182. FIGS. 27 and 28 show the lever piece 182 disposed at a position extending outward on the case. Of course it should be understood that this configuration is exemplary and in other arrangements other approaches may be used.

As shown in FIG. 17 in the exemplary arrangement the jaw 124 includes a jaw switch projection 184 that extends from a surface thereof. In the latched position of the jaw 124 the jaw switch projection 184 engages the lever piece 172 and causes the lever piece to be disposed inwardly on the case 156 of the actuator 152. This causes the switch 185 to be in a first electrical condition. When the jaw 124 moves to the unlatched position as shown in FIG. 20, the jaw switch projection 184 is disposed away from the lever piece 172. The lever piece 172 moves and extends further outwardly on the case 156 and causes a change in the electrical condition of the switch 185. This enables the switch 185 to provide electrical signals that are indicative of the position of the jaw 124 as well as whether the latch is in the latched or unlatched condition. Of course it should be understood that this arrangement is exemplary and other arrangements for sensing the condition of the latch may be used.

The exemplary actuator 152 includes within the case thereof an electric motor 186. The electric motor 186 includes an output shaft or similar rotating member that rotates when electrical power is supplied to the electric motor. The exemplary electric motor is in operative connection with a gearbox 188. The gearbox operates to receive rotational motion via an output shaft of the motor or other rotating member at the speed provided by the electric motor and to provide rotational motion of an output shaft or other output member of the gearbox at a speed that is lower than the input speed provided by the motor.

The gearbox 188 is in operative connection with a rotatable cam 190. Cam 190 includes an eccentric cam lobe 192. The cam 190 rotates responsive to rotational motion from the motor that is transmitted through the gearbox. As the cam rotates the lobe moves rotationally with the cam. A cam follower 194 is movable in operative engagement with the cam lobe 192. The cam follower 194 is operatively connected to the pin 158. The cam follower 194 is positioned within the case so that it is guided to move linearly along a straight line in the actuation direction back-and-forth responsive to the position of the cam lobe 192.

As represented in FIGS. 25 and 26 with the cam lobe 192 positioned as shown, the pin 158 is positioned at the furthest outward extent of its travel relative to the case 156 of the electric actuator. As the cam 90 rotates responsive to the electric motor and the gearbox, the cam lobe 192 moves to the position shown in FIGS. 27 and 28. In this position the pin 158 is retracted to the furthest inward extent of travel along the actuation direction relative to the case. Thus as can be appreciated, operation of the motor 186 causes the pin to move linearly straight along the actuation direction inward and outward relative to the case of the actuator 152. As a result in this exemplary arrangement the pin may be moved between the extended and retracted positions through movement of the motor in only one rotational direction. This avoids the need to reverse the direction of the motor as is done to move the rack in the previously described arrangement. The use of the exemplary cam arrangement may also avoid the need for bumpers or other structures to limit the extremes of travel of the structures which operatively move the pin. Of course it should be understood that the arrangements described herein are exemplary and in other arrangements other configurations may be used.

Figure 18:
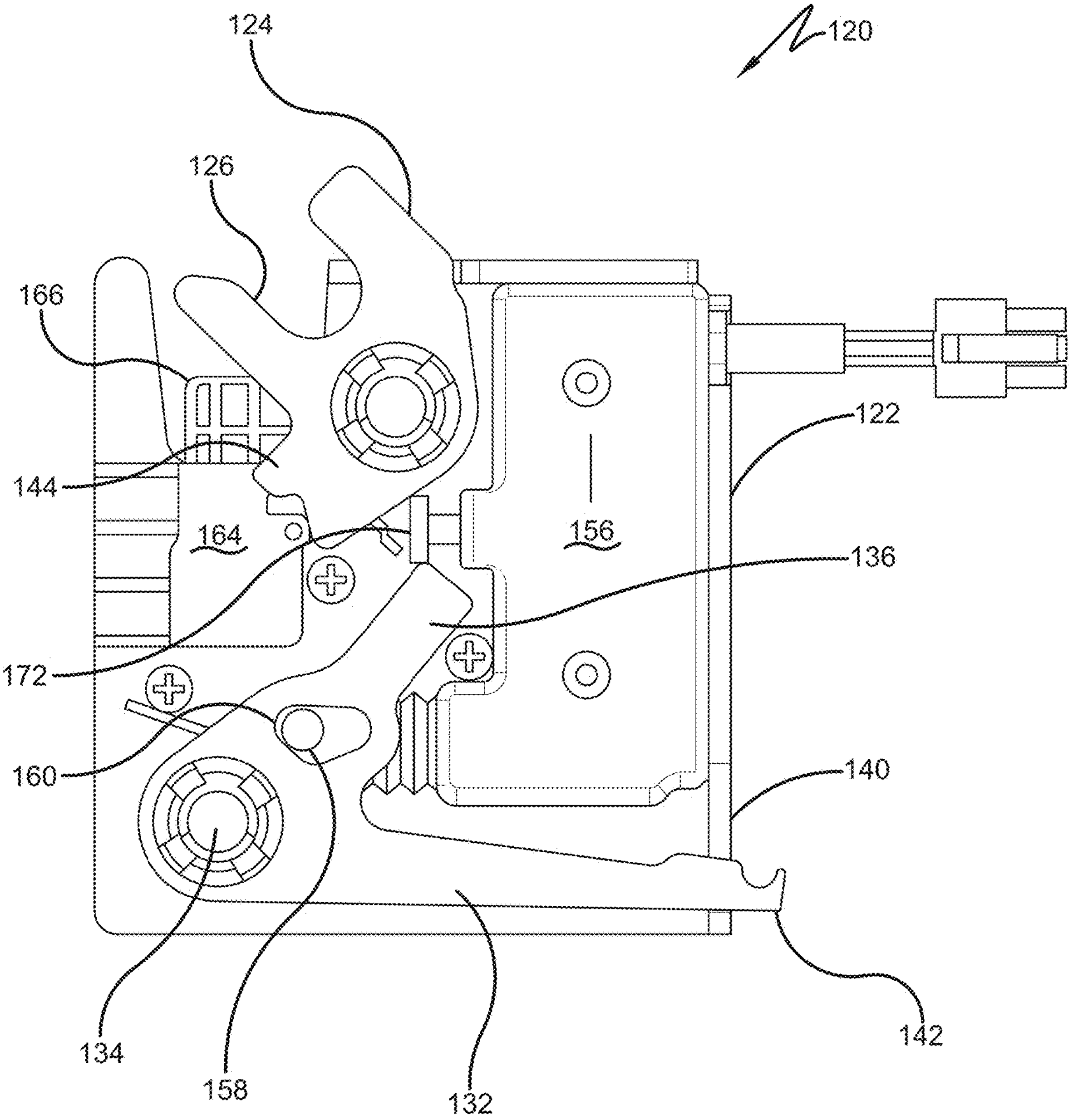
FIG. 18 is a front side sectional view of the latch shown in FIG. 16 with the jaw moved to the unlatched position responsive to movement of the actuating end of the second arm portion of the pawl.

An exemplary arrangement of latch 120 is shown in FIGS. 16 and 17 with the jaw 124 in the latched position in engagement with the striker 128. In this position a closure member that is in operative connection with the striker is held in a fixed position in response to the engagement of the striker with the latch. To change the latch so the jaw 124 is movable to the unlatched position, the pawl 132 is rotated such that the distal end of the first arm portion 136 is disengaged from the jaw inner end 144. FIG. 18 shows the pawl rotated to disengage from the jaw 124 by movement of the actuating end 142 in the arm portion opening 140 of the housing 122 of the latch. The disengagement of the pawl with the jaw causes the jaw to rotate to the unlatched position as shown in FIG. 18. The plunger body 166 also moves responsive to the biasing force of the compression spring 170 to help to disengage the striker from the notch 126 of the jaw.

Also as shown in FIG. 18, as the jaw 124 moves from the latched position to the unlatched position the lever piece 172 is enabled to move outward on the actuator case 156 so that the change in the condition of the latch can be indicated by the switch 185. Also as represented in FIG. 18 the pin 158 remains stationary while the arm slot 160 and the pawl 132 relatively move with respect to the pin. As a result the pin 158 does not interfere with the movement of the pawl 132 to unlatched the latch responsive to movement of the actuating end 142.

Figure 19:
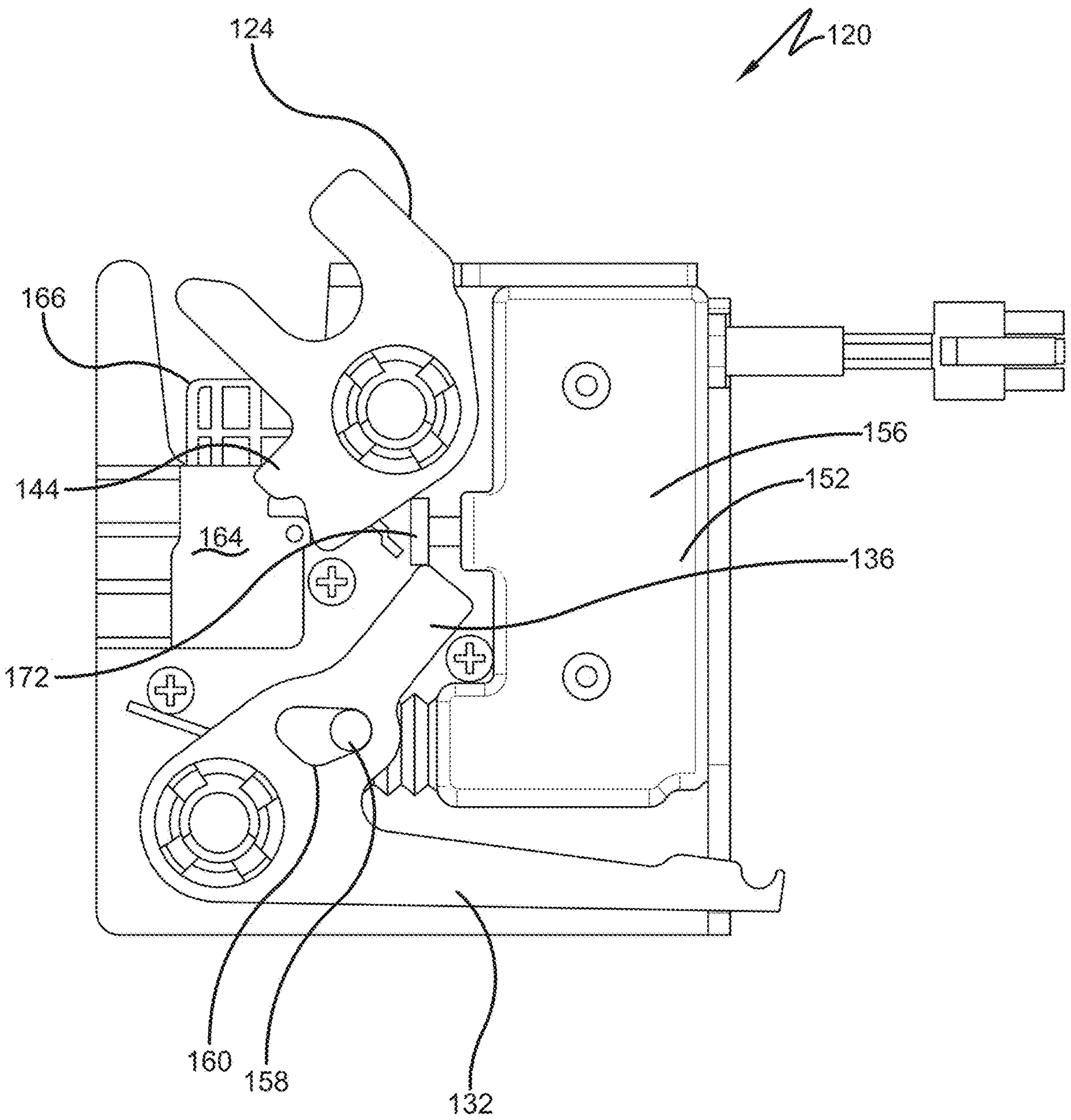
FIG. 19 is a front side sectional view of the latch shown in FIG. 16 with the jaw moved to the unlatched position responsive to the electrical actuator.

FIG. 19 shows the manner in which the condition of the latch 120 may be changed from the latched condition to the unlatched condition responsive to the electric actuator 152. As shown in FIG. 19, the pin 158 is moved by the cam follower 194 to engage the wall of the slot 160 and to rotate the pawl 132. Such movement causes the distal end of the first arm portion 136 to disengage from the jaw inner end 144. Jaw 124 is enabled to rotate from the latched position shown in FIG. 16 to the unlatched position shown in FIG. 19 so that the striker can be disengaged from the jaw. The plunger body 166 of the plunger 164 biasingly extends to further urge the striker out of the notch in the jaw and the recess in the housing of the latch so that the striker can be disengaged from the latch. The extension of the plunger body 166 is further shown in FIG. 20.

Also in the exemplary arrangement, the jaw 124 includes a stop projection 196. The stop projection 196 is configured to engage the extended plunger body 166 so as to limit the rotational movement of the jaw 124 to the unlatched position. The exemplary plunger body 166 further includes a step 198 to further facilitate the engagement of the stop projection with the plunger body and limit the extent of rotational travel of the jaw. Of course this approach is exemplary and in other arrangements other approaches may be used. Also as represented in FIGS. 19 and 20 the lever piece 172 is enabled to extend further outward on the case 156 in response to the jaw switch projection 184 moving so as to be disposed away therefrom. As a result the change in the condition of the latch from the latched condition to the unlatched condition is enabled to be detected by the change in the electrical condition of the switch 185.

The alternative latch 120 includes an integrated actuator and electrical switch. The actuator can be operated to change the condition of the latch from the latched condition to the unlatched condition responsive to the delivery of electrical power thereto, and also provide an electrical indication of the change in the latch condition. The exemplary latch further enables the latch to be changed from the latched condition to the unlatched condition without using the electric actuator, by mechanical movement of the pawl via the actuating end which extends outside the housing of the latch. This further provides the alternative of unlatching the latch through a mechanical connection. A further alternative latch configuration which has the capability of changing the condition of the latch responsive to the delivery of electrical signals or via mechanical activation is shown in U.S. patent application Ser. No. 17/729,655 filed Apr. 26, 2022 which is incorporated herein by reference in its entirety. Further arrangements may include features described in U.S. Pat. Nos. 10,676,962; 9,809,999; and/or 11,346,129 the disclosures of each of which are incorporated herein by reference in their entirety. Of course it should be understood that these configurations and components that make up the exemplary latch may be used in other latch arrangements, including those that may provide for only electrical control of the latch or only mechanical control of the latch. In addition the features described may be implemented in connection with latches that use other structures for engaging a striker or a similar latching member that is selectively held and released through operation of the latch.

Figure 37:
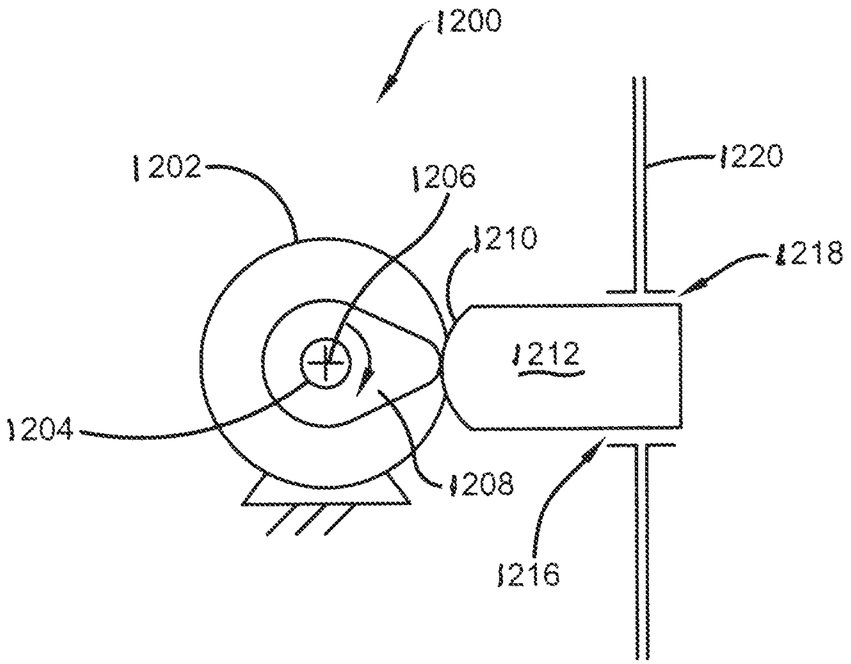
FIG. 37 is a schematic representation of a motorized cam actuated latch apparatus in a latched condition.
Figure 38:
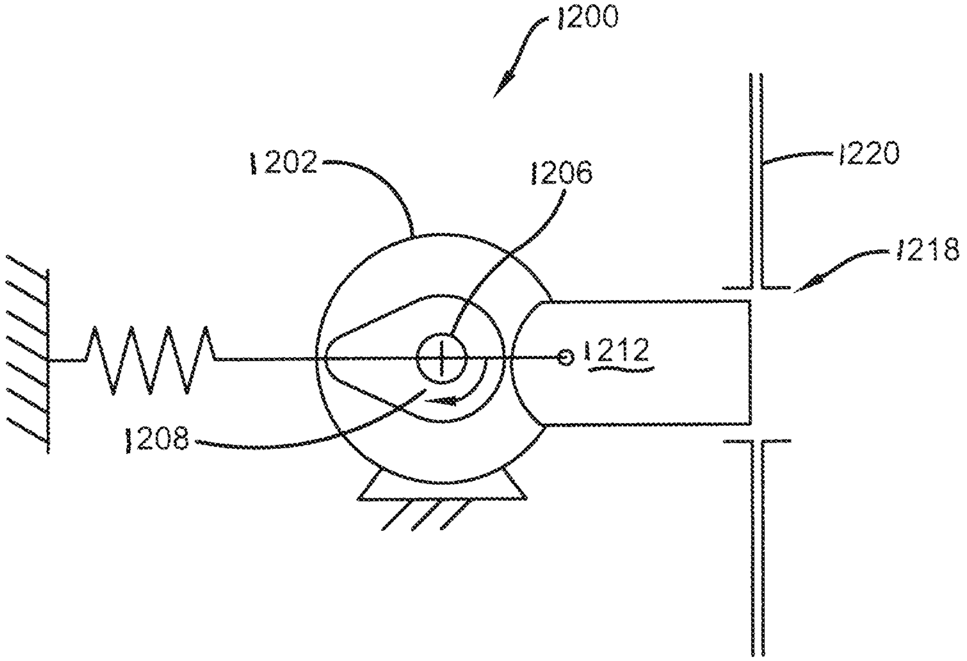
FIG. 38 is a schematic representation of the motorized cam actuated latch apparatus shown in FIG. 37 in an unlatched condition.
Figure 39:
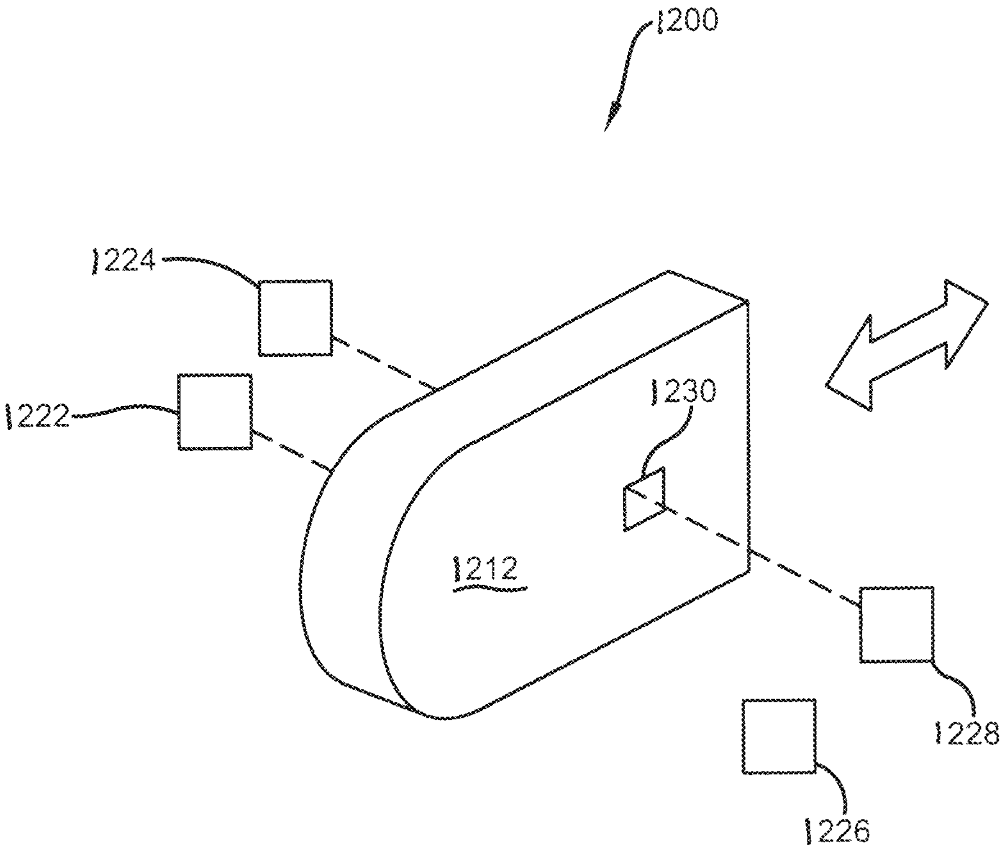
FIG. 39 is a schematic representation of at least one sensor that is operative to detect the condition of the latch shown in FIGS. 37 and 38.
Figure 40:
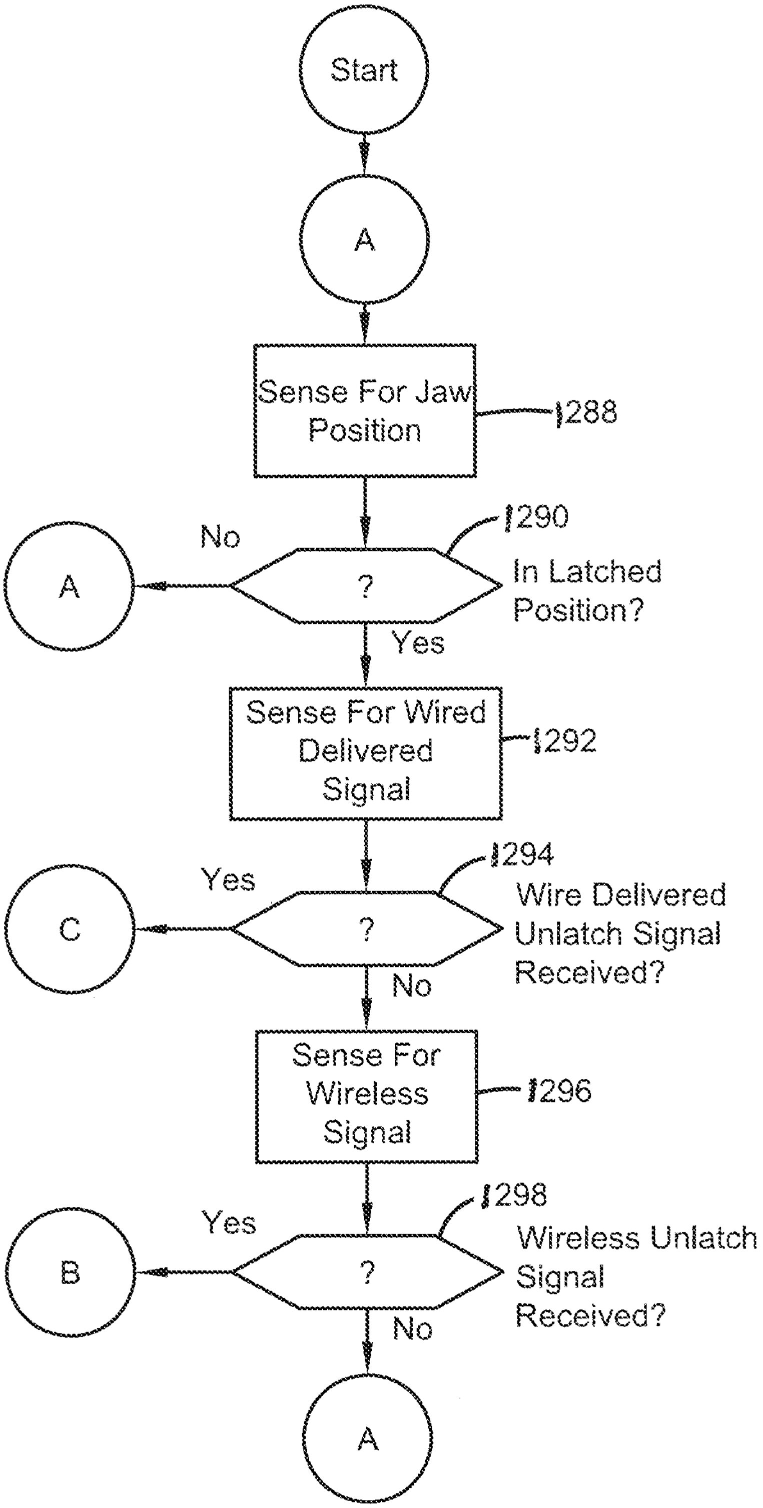
FIGS. 40-44 are a schematic representation of logic flow carried out by the circuitry of an exemplary latch controller.
Figure 41:
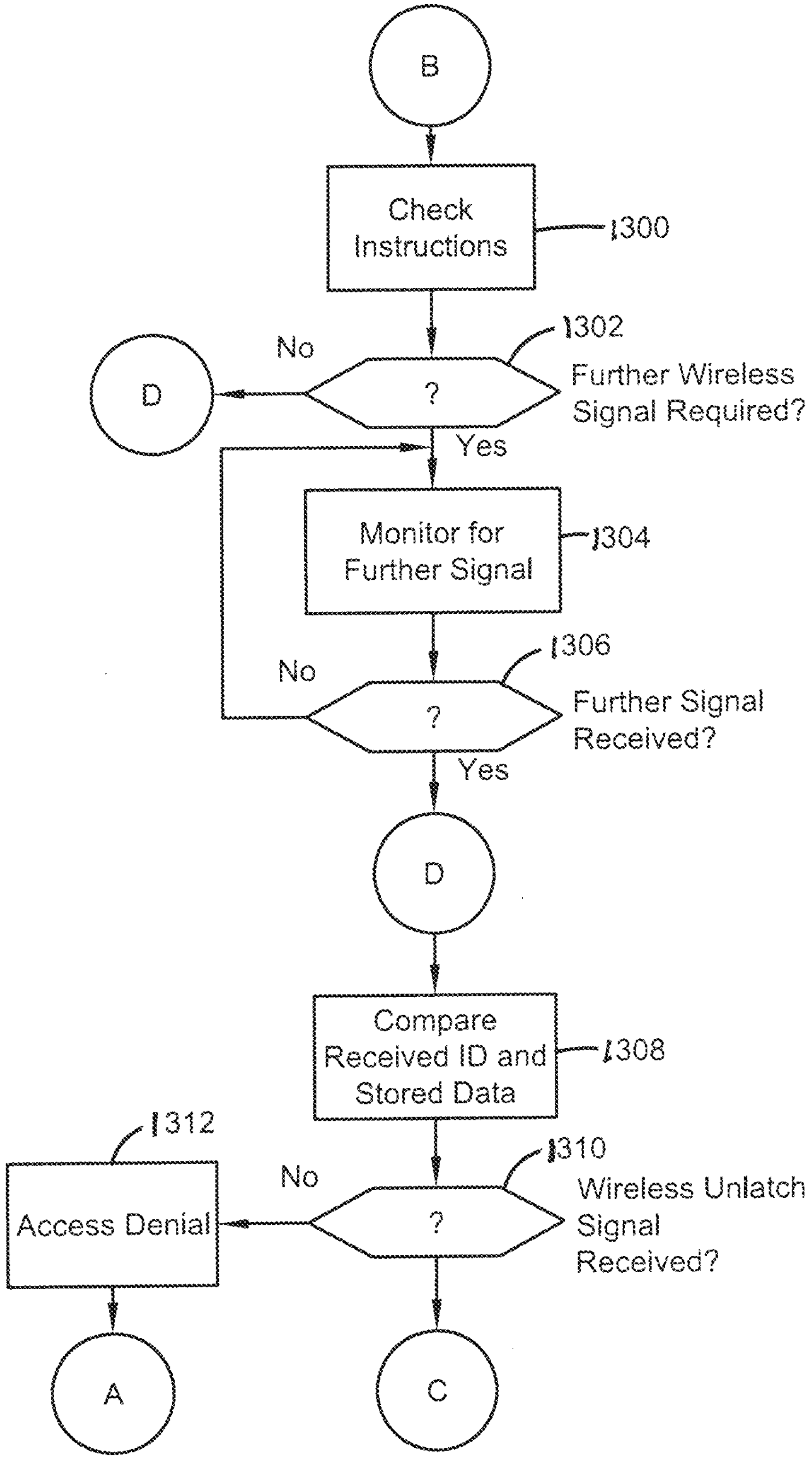
Figure 42:
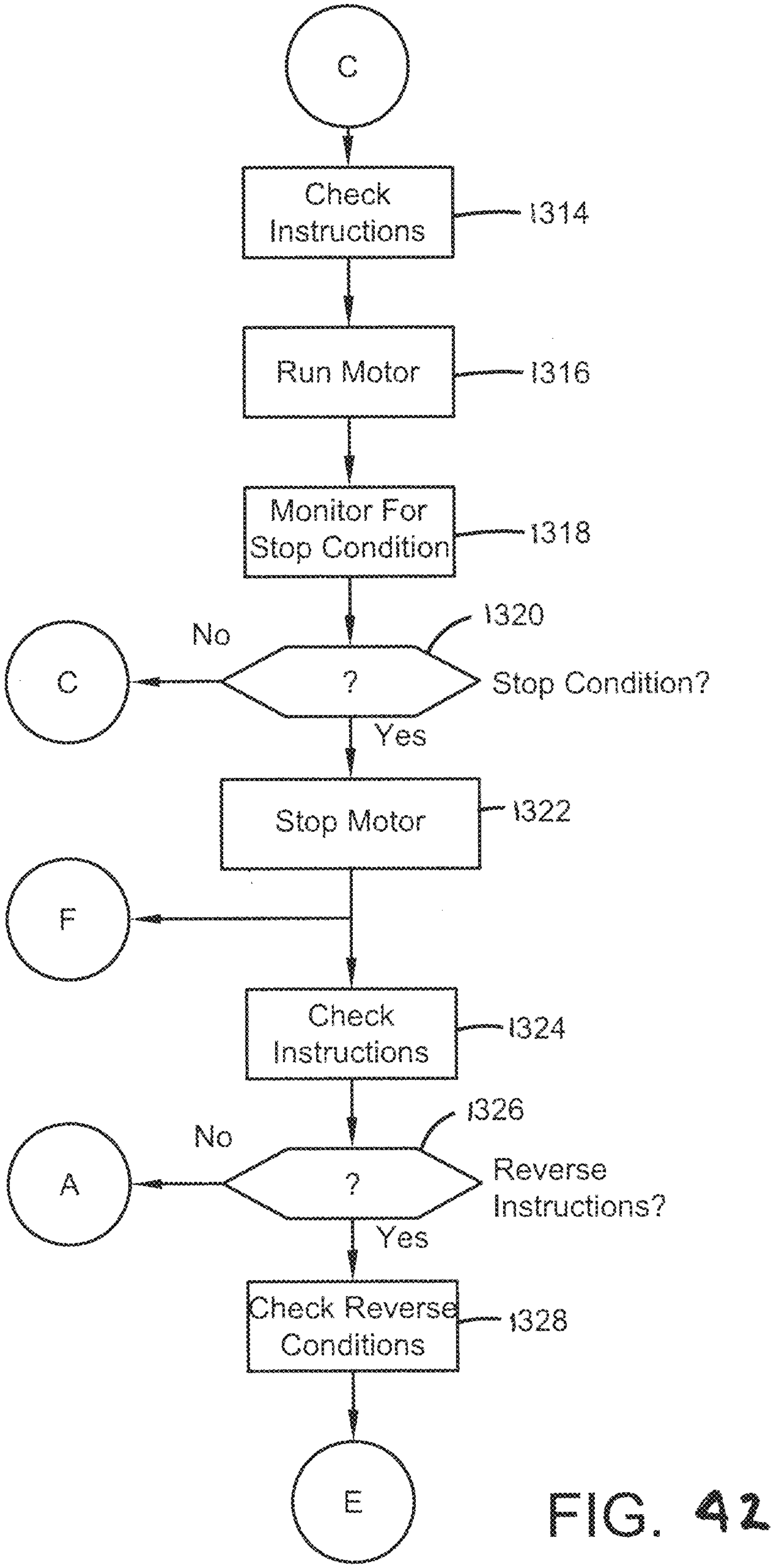
Figure 43:
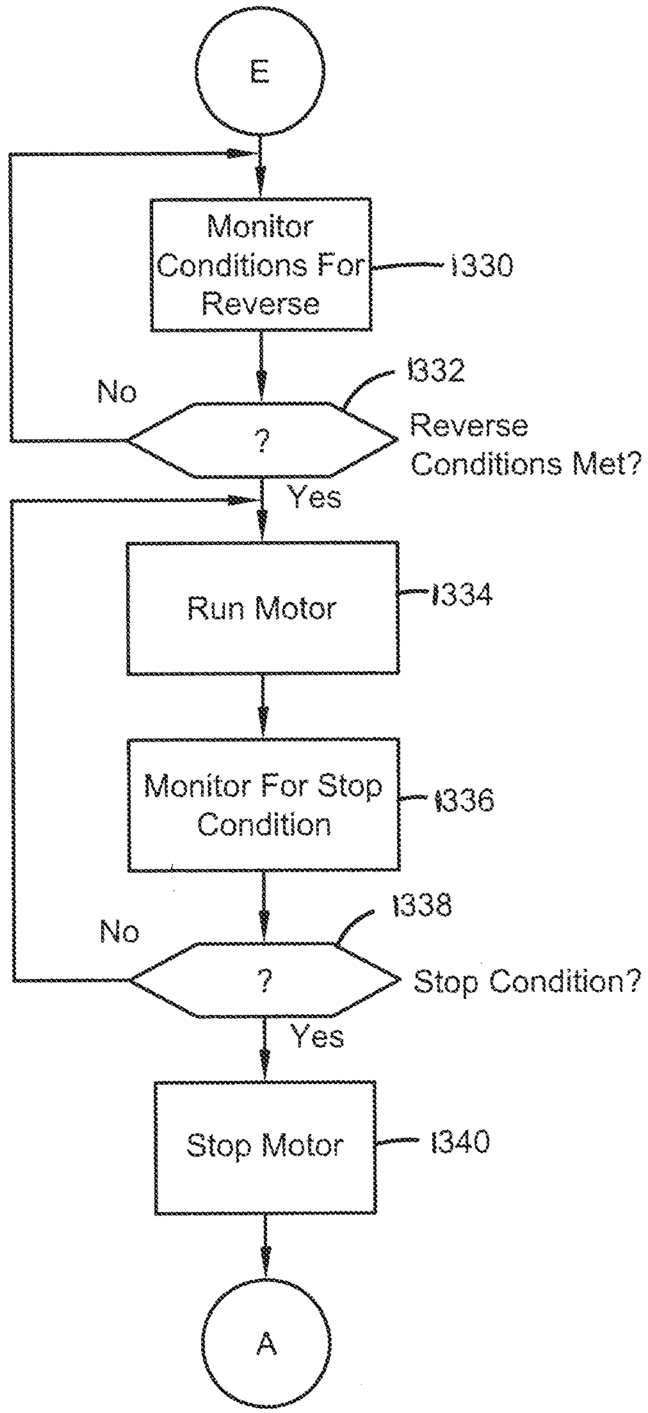
Figure 44:
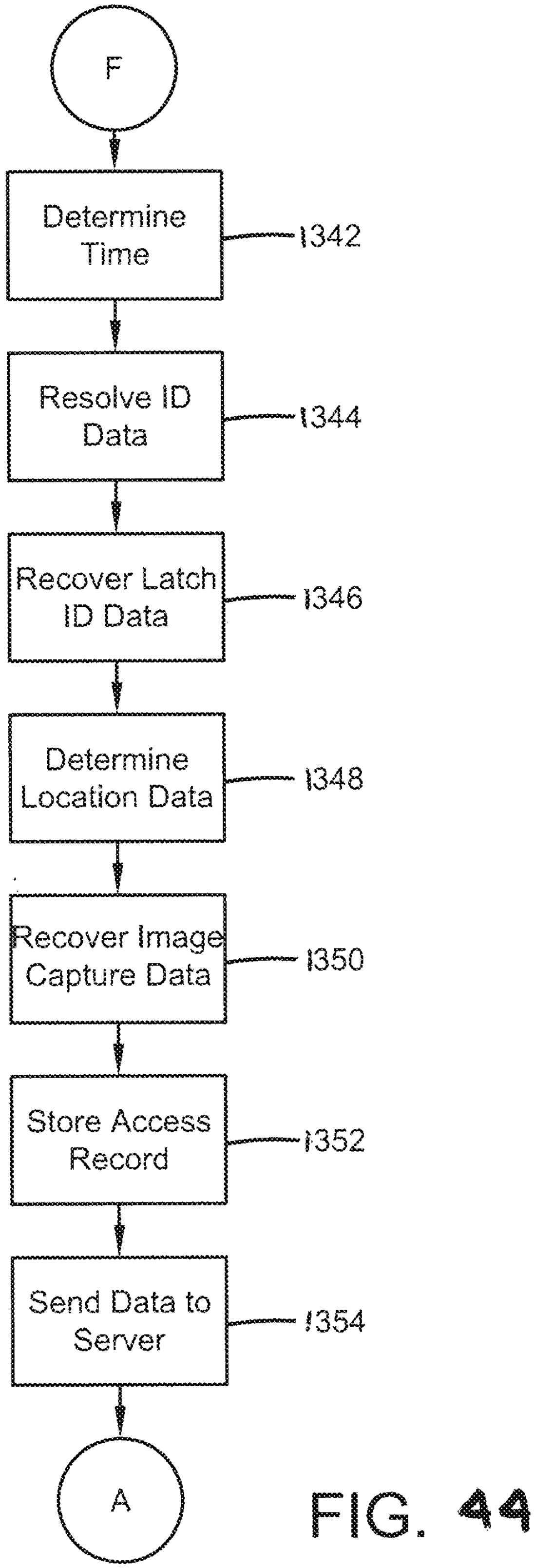

An alternative latch arrangement which may be controlled responsive to a latch controller of the type discussed herein is the cam actuated latch 1200 which is shown schematically in FIGS. 37-39. The exemplary latch 1200 includes a motor

1202. The exemplary motor includes a shaft 1204 that is rotatable about an axis 1206. In the exemplary arrangement the shaft 1204 is rotatable in both directions about the axis dependent on the direction of current flow delivered to the motor by the latch controller. However as can be appreciated the exemplary cam latch 1200 may operate by having the motor 1202 rotate the shaft in only one rotational direction.

A cam 1208 is in operative connection with the shaft 1204 and rotates therewith. The eccentric surface of the cam is in operative connection with a cam follower surface 1210 of a bolt 1212. For purposes hereof the bolt 1212 may alternatively be referred to as a jaw. As schematically represented in FIG. 38 the bolt 1212 is biased into engagement with the surface of the cam and into a retracted position by a spring 1214.

FIG. 37 represents an engaged condition of the latch 1200 in which the bolt 1212 extends outward from an opening 1216 in a latch housing or similar structure, and into engaged relation with an aperture 1218 in a strike plate 1220. For purposes hereof the strike plate may alternatively be referred to as a striker. As can be appreciated, the engagement of the bolt 1212 in the extended position into the aperture 1218 of the strike plate is operative to hold the latch and the strike plate in engaged relation.

Rotation by the motor 1202 of the shaft 1206 from the position shown in FIG. 37 to the position shown in FIG. 38 is operative to cause the cam 1208 to rotate. Rotation of the cam 1208 to the position shown in FIG. 38 is operative to cause the bolt 1212 to be retracted so that it is no longer engaged in the aperture 1218 of the strike plate 1220. As a result the strike plate 1220 which may be attached to a closure member for example, is relatively movable with regard to the latch 1200 and its associated housing. Of course it should be understood that in alternative arrangements the latch 1200 may be attached to the closure member and the strike plate 1220 may be fixed to an immovable body or other structure. Of course numerous other types of arrangements may be utilized.

FIG. 39 shows exemplary sensors which may be utilized in conjunction with the latch 1200 to provide an indication of the position of the bolt 1212 in the latched and unlatched conditions of the latch 1200. In the exemplary arrangement shown, a pair of photosensors are utilized to determine the position of the bolt 1212. Each respective photosensor includes a respective emitter 1222 and 1224. Each emitter emits a respective radiation signal such as a light beam that is directed toward the bolt 1212. A respective receiver 1226 is associated with emitter 1222, while a receiver 1228 is associated with emitter 1224.

In the exemplary arrangement the bolt 1212 includes a feature that is detectable by the photosensors such as an opening 1230 therein. When the bolt 1212 is in the extended position corresponding to the latched position, radiation from the emitter 1224 is detectable by the receiver 1228. In this condition receiver 1226 does not detect the radiation emitted by emitter 1222. As a result the signals from the photosensors associated with receiver 1228 are usable by the latch controller to determine that the latch is in the latched condition. Similarly when the bolt 1212 is retracted which corresponds to the latch 1200 being in the unlatched condition, receiver 1226 is enabled to receive the radiation emitted by emitter 1222 while receiver 1228 does not detect radiation from emitter 1224. As a result the latch controller may use the signals received from receivers 1226 and 1228 to determine that the latch 1200 is in the unlatched condition. Of course it should be understood that this sensor arrangement is exemplary. In other arrangements other types of sensors such as contact type sensors, Hall Effect sensors, magnetic sensors, inductance sensors and other sensor types may be utilized.

Further in other exemplary arrangements sensors associated with the latch may include other sensors that are in operative connection with a latch and usable to determine the condition of the latch or of a latch component such as a jaw thereof. Such sensors may include sensors of the types described in the incorporated disclosures which are operative to detect the open and/or closed condition of the closure member, the condition or status of which is controlled through operation of the latch.

Of course it should be understood that the latches and sensors described herein are merely exemplary of numerous different types of electrically actuated latches and sensors that may be utilized in conjunction with various types of devices in which a latch may be selectively controlled to control a condition of a closure member or other items or structures.

Figure 31:
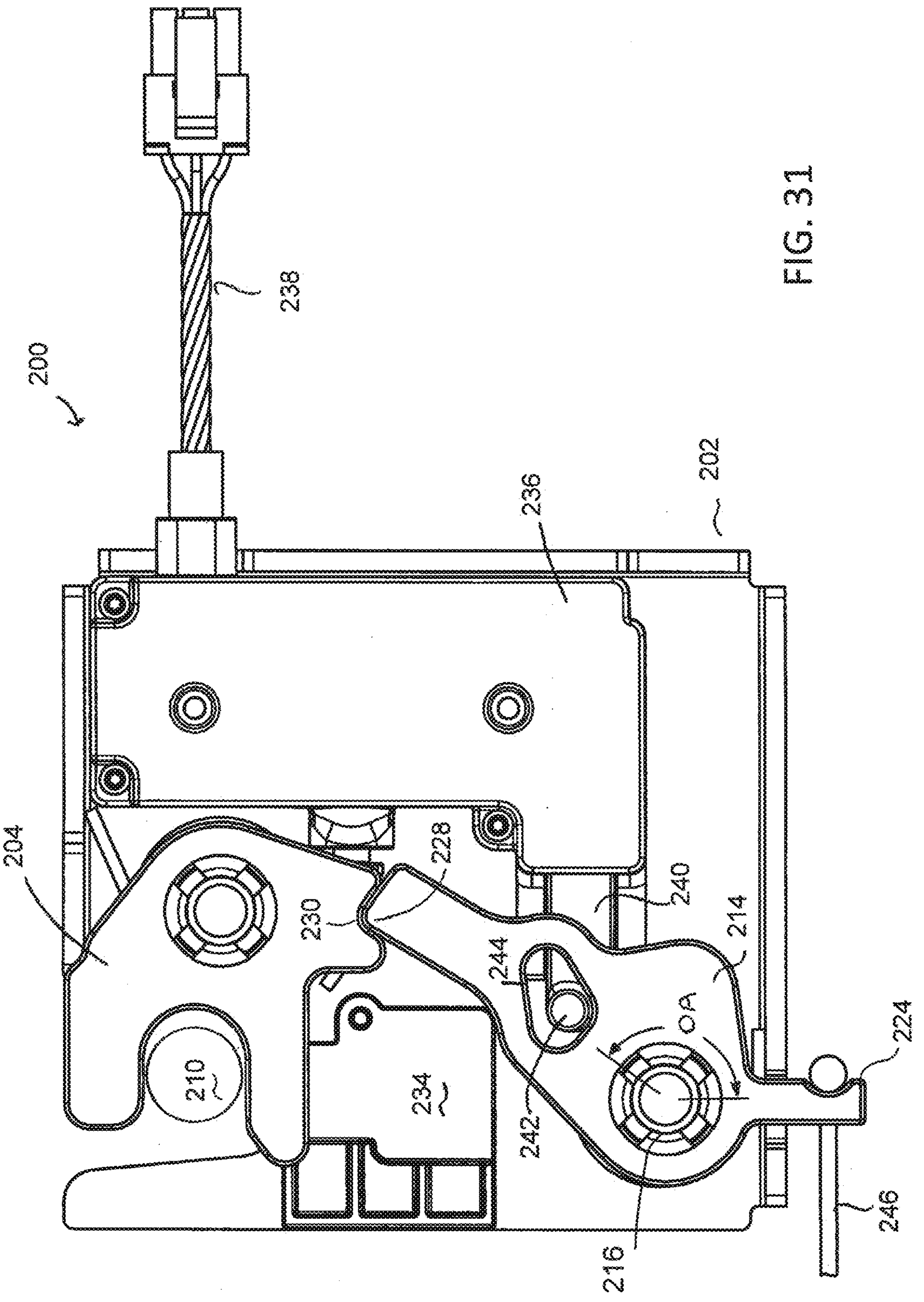
FIG. 31 is a front side sectional view of the latch shown in FIG. 29 with the pawl in engagement with a cable.

FIGS. 29 through 34 show an alternative exemplary arrangement of a latch 200. The exemplary latch 200 is similar to latch 120 except as otherwise described. Latch 200 includes a housing 202 that houses a jaw 204 which is rotatable about a central axis of a post 206. The jaw includes a notch 208 that is configured for engaging a striker 210 in the latched position as shown in FIG. 31. The exemplary jaw is biased by a jaw spring 212 toward the unlatched position.

Latch 200 further includes a pawl 214. Pawl 214 is rotatable about a central axis of a post 216. Pawl 214 includes a first arm portion 218 and a second arm portion 220. The first arm portion and the second arm portion are angularly spaced apart. In this alternative arrangement the second arm portion 220 extends at an obtuse angle OA (see FIG. 31) relative to the first arm portion. The housing includes an arm portion opening 222 through which an actuating end 224 of the pawl 214 extends. Actuating end 224 may be configured to engage a cable. As used herein a cable shall be deemed to include a cable, a rod, a lever or other suitable actuating member. Pawl 214 is in operative connection with a pawl spring 226. Pawl spring 226 is operative to bias the pawl 214 in a rotational direction that is opposite to the rotational direction in which the jaw 204 is biased by the jaw spring 212.

Figure 34:
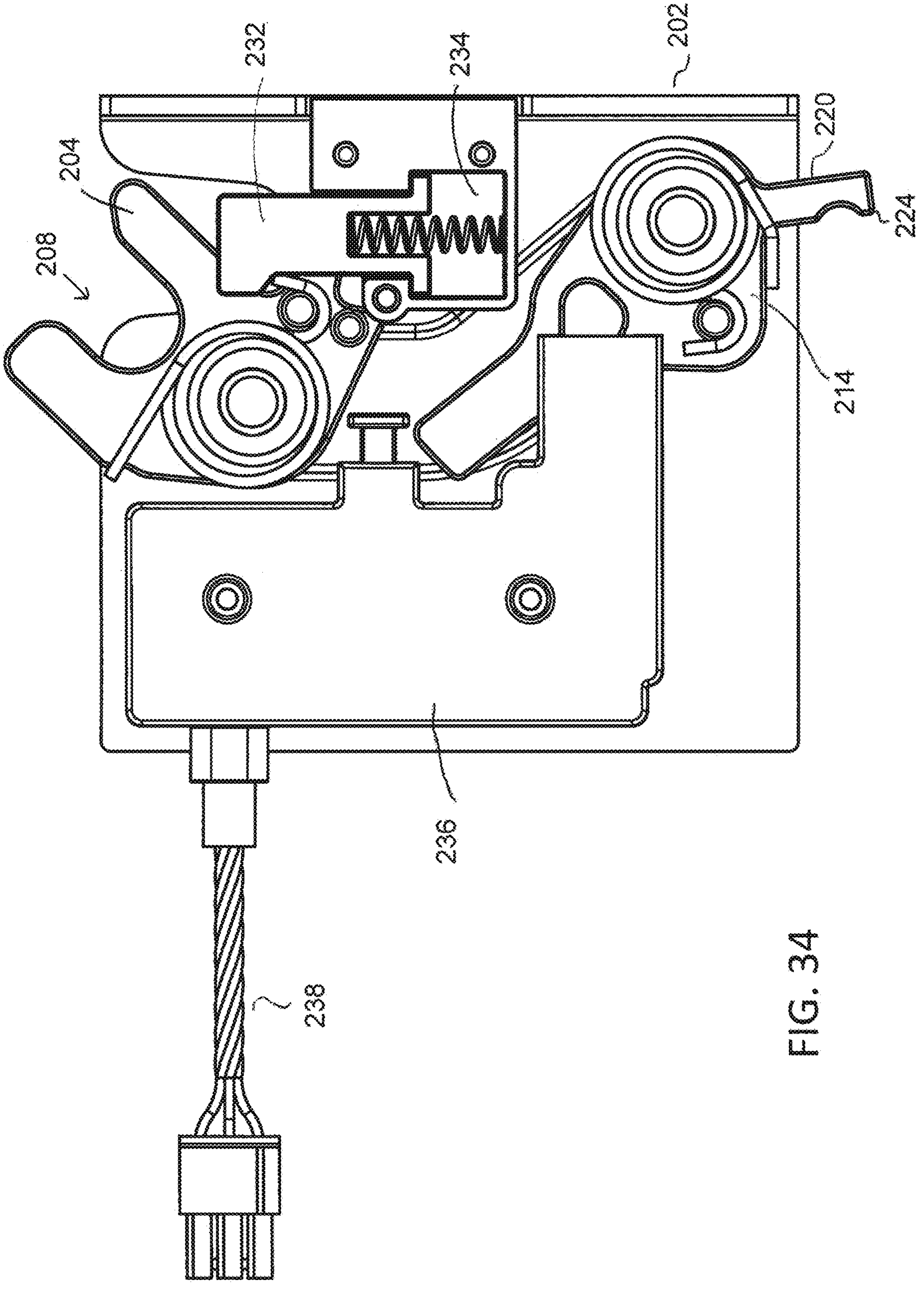
FIG. 34 is a back side sectional view of the latch showing a plunger which acts to release the striker from engagement with the jaw, in an extended position.

Similar to the pawl of latch 120, pawl 214 includes a pawl engagement projection 228. The pawl engagement projection is configured to engage a jaw engagement recess 230 of the jaw. Engagement of the pawl engagement projection 228 and the jaw engagement recess 230 is operative to hold the jaw 204 in the latched position. The exemplary latch further includes a spring-loaded plunger 232 that is mounted in movable biased engagement with a plunger body 234. The plunger operates in a manner similar to plunger 164 described in connection with latch 120 to further bias the striker to disengage from the jaw when the jaw is moved from the latched position shown in FIG. 29 to the unlatched position as shown in FIGS. 32 and 34.

Latch 200 further includes an electrical actuator 236. Electrical actuator 236 may be similar to the electrical actuators 152 or 84 that have been previously described. The electrical actuator includes an electrical connector 238 that extends outside the housing 202 and is configured to be in connection with an electrical wiring harness. Similar to the other actuators, actuator 236 includes a linearly movable tie rod 240 or similar structure that is selectively movable inward and outward from the actuator 236 responsive to operation thereof. The exemplary tie rod is in operative connection with a transversely extending pin 242. The pin is engaged in an opening 244 that extends in the arm portion 218. The opening 244 is alternatively referred to herein as an arm slot. The exemplary arm slot 244 is configured so as to enable the pawl 214 to rotate about the pawl pivot that is centered at the axis of post 216 in a clockwise direction from the position shown in FIG. 29 while the pin 242 remains stationary within the slot. This enables the latch to be unlatched responsive to either the actuator or movement of the actuating end of the pawl.

In the exemplary arrangement of latch 200 in which the pawl 214 includes a second arm portion 220 that is disposed at an obtuse angle from the first arm portion 218, the actuating end 224 of the pawl extends from the housing on a different side of the housing from the actuating ends of the pawls in the previously described arrangements. Thus as shown for example in FIG. 31, a cable 246 or other actuating mechanism may be engaged with the actuating end 224 in a different location relative to the housing 202 compared to the other exemplary arrangements. Further as can be appreciated from FIG. 32, the movement of the cable 246 may be in a direction that is substantially transverse to the direction of movement of the cable or other actuating structure that moves the actuating end of the pawl in other described latch arrangements. This exemplary configuration provides additional types of mechanical actuating options for the latch 200 compared to the other exemplary latch arrangements.

Figure 32:
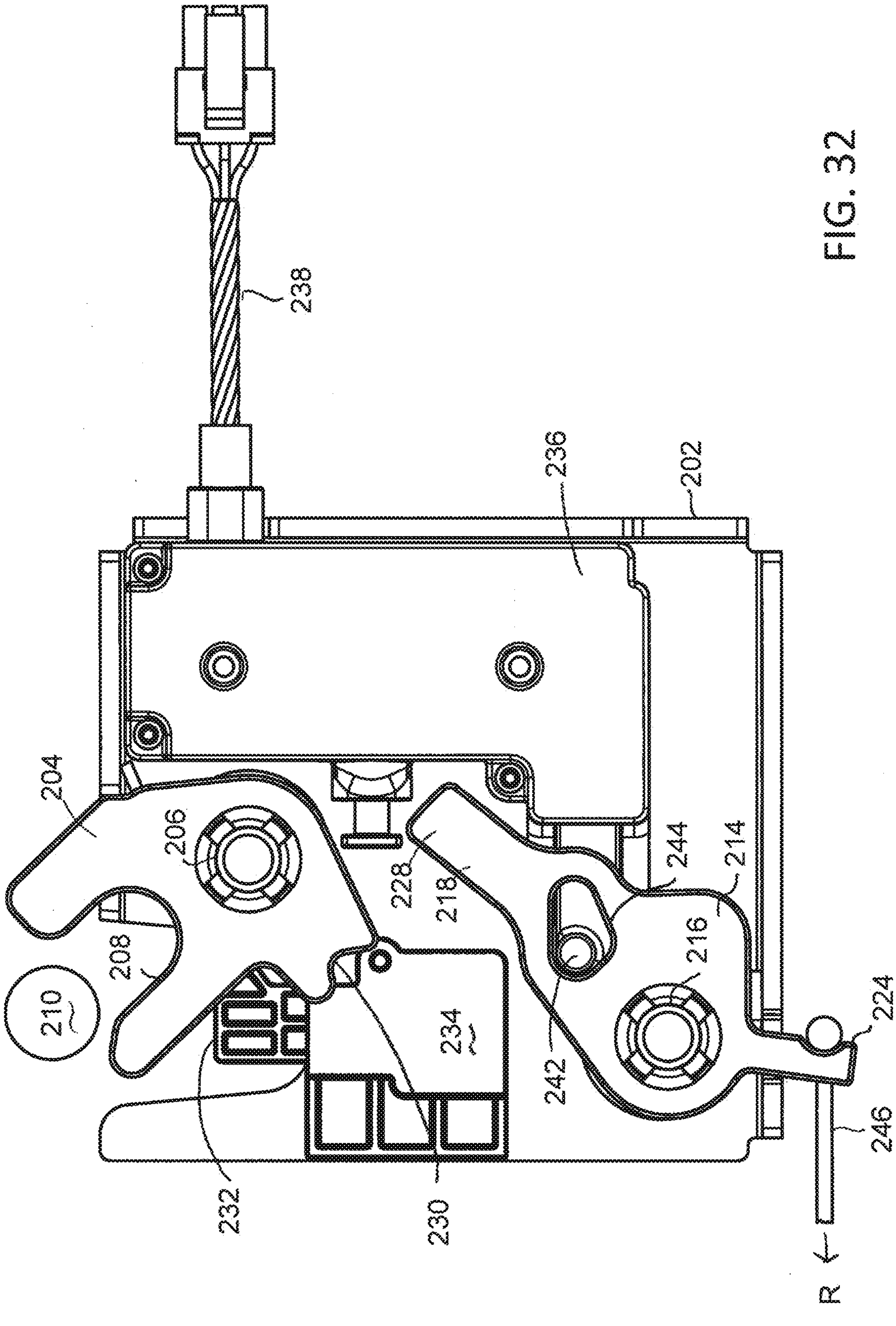
FIG. 32 is a view similar to FIG. 31 but with the latch changed to the unlatched condition responsive to movement of the cable.
Figure 33:
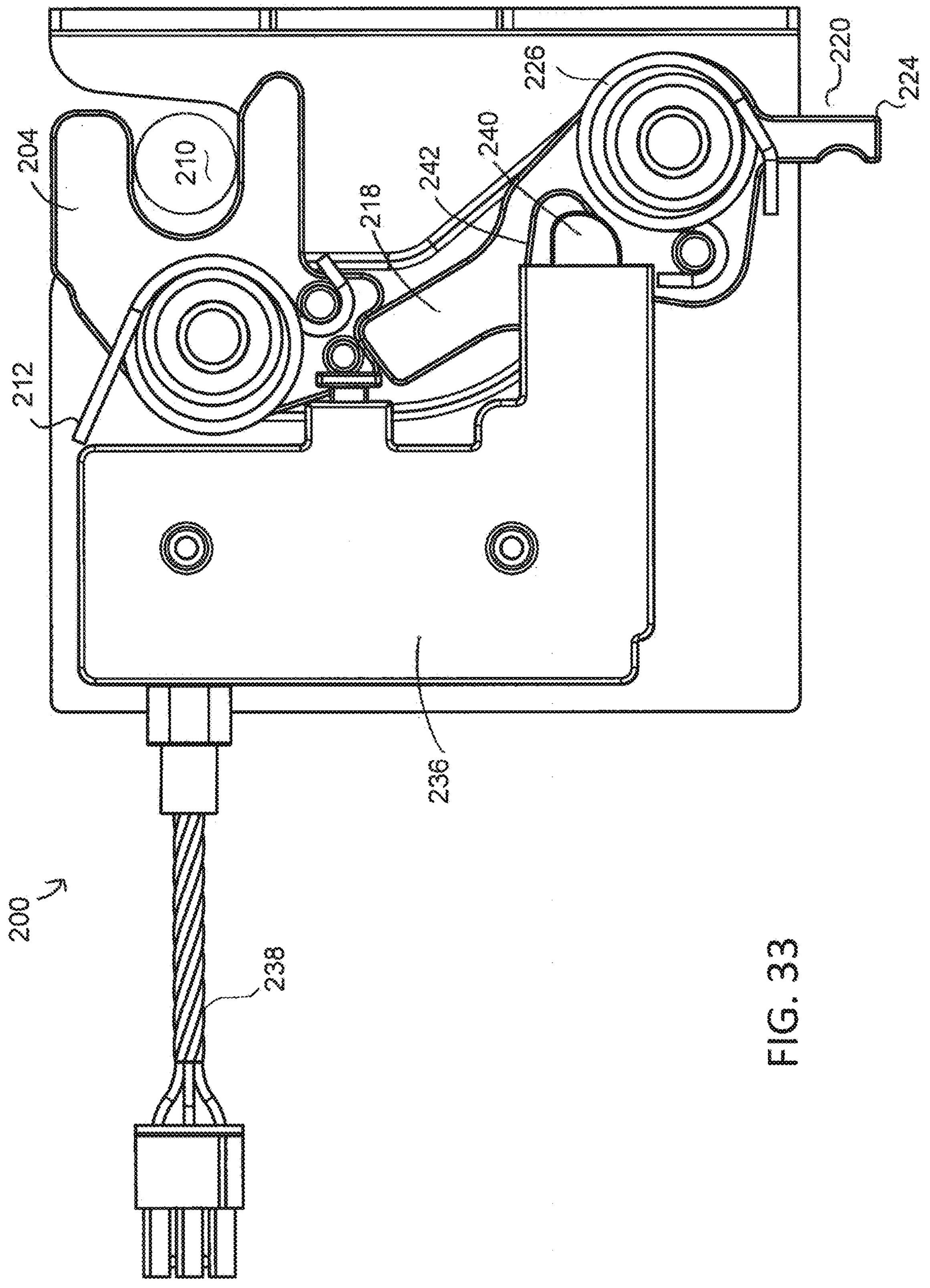
FIG. 33 is a back side sectional view of the latch shown in the latched position and with the jaw in engagement with a striker.

As can be appreciated, from the latched position of the jaw 204 shown in engagement with the striker 210 in FIG. 31, movement of the cable 246 in the direction of Arrow R in FIG. 32 rotates pawl 214 in a clockwise direction about the pawl pivot and the post 216. Such movement by the first arm portion 218 of the pawl disengages the pawl engagement projection 228 and the jaw engagement recess 230. This causes the jaw 204 to rotate in a clockwise direction about the jaw pivot and the post 206 which releases the striker 210 from the notch 208. Disengagement of the striker and the notch is further assisted by the outward biasing force applied by the plunger 232. As can be appreciated as the pawl 214 is rotated by the movement of the cable 246 the pin 242 remains stationary as the arm slot 244 moves relative thereto. Of course the movement of the cable 246 back to the position shown in FIG. 29 enables the latch to again engage the striker and the jaw 204 to hold the striker in the latched position.

Similar to the previously described arrangements, the latch may be changed from the latched condition to the unlatched condition by movement of the tie rod 240 of the actuator 236 to the right as shown in FIG. 31. Such movement of the tie rod by the actuator causes the pin 242 to engage the wall bounding the arm slot 244 and rotate the pawl 214 about the post 216. This causes the pawl engagement projection 228 to disengage from the jaw engagement recess 230, enabling the jaw 204 to move and disengage from the striker. Further as can be appreciated when the actuator 236 operates to return the pin 242 to the initial condition, the pawl 214 is again enabled to rotate to engage the pawl engagement projection 228 with the jaw engagement recess 230 as the striker moves to engage the notch 208 of the jaw. Of course it should be understood that these approaches are exemplary and in other arrangements other approaches may be used.

Figure 35:
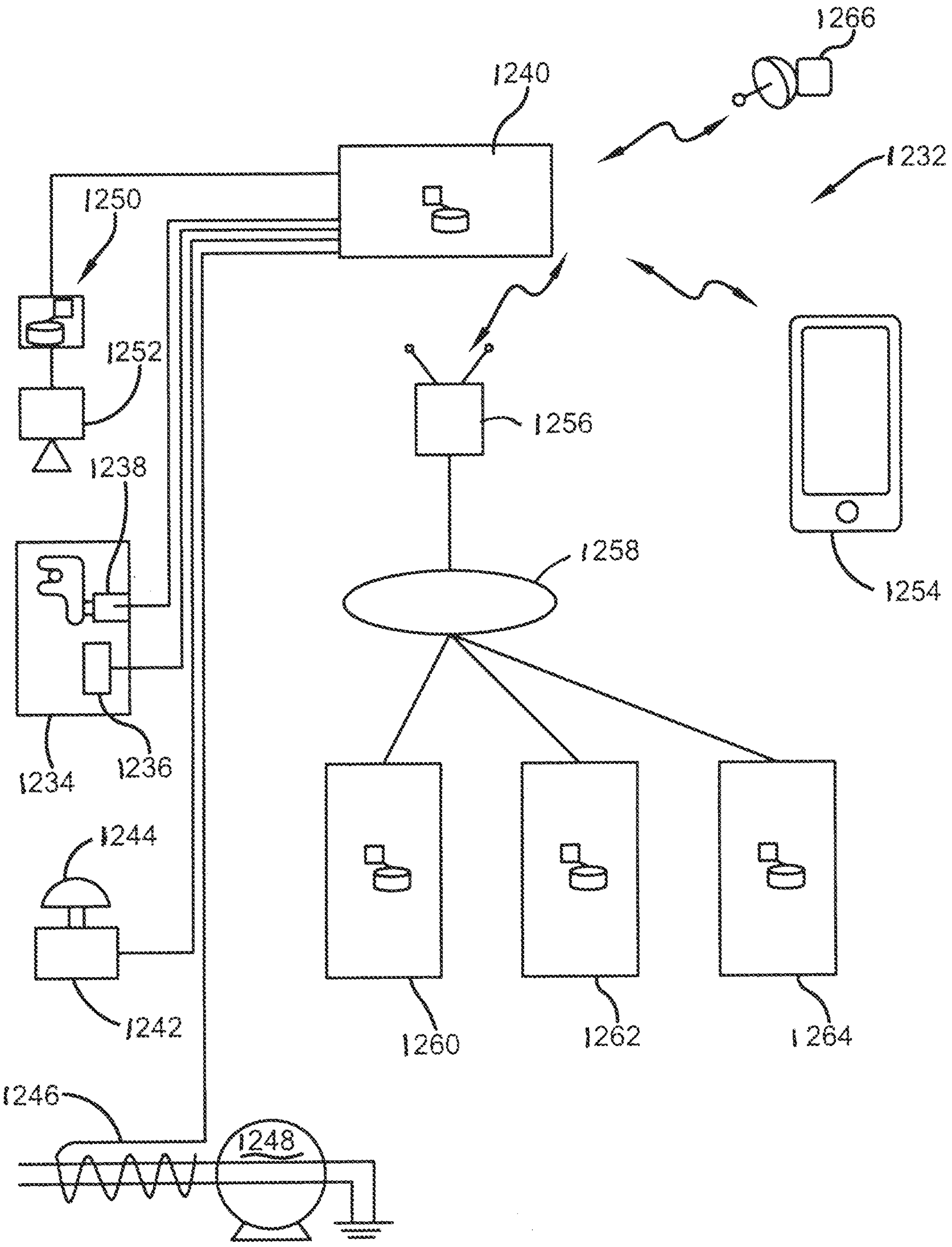
FIG. 35 is a schematic view of an exemplary latch controller in operative connection with a motorized latch and other exemplary system components.

FIG. 35 schematically shows an exemplary arrangement of a system 1232 associated with controlling a latch. In this exemplary system 1232 a latch 1234 which may be similar to latch 10, 120 or 200 is shown. Of course it should be understood that this type of latch is exemplary and in other systems other latch types may be used. The exemplary latch 1234 includes a motor 1236 which may be of the type previously described for selectively controlling actuation of the latch. The exemplary latch 1234 further includes or is in operative connection with at least one sensor 1238 which may be of the types previously described. The exemplary sensor 1238 is in operative connection with the jaw and is usable to determine if the jaw is in the latched position for example. Of course it should be understood that numerous other types of sensors may also be used.

The exemplary system includes a latch controller 1240. The latch controller 1240 which is later described in detail is in operative connection with the latch 1234 including the motor 1236 and the at least one sensor 1238 thereof. The exemplary latch controller is also in operative connection with at least one switch schematically indicated 1242. The exemplary at least one switch may be any of numerous different types of switches which are capable of being actuated. The exemplary switch 1242 is a manually actuatable switch that includes or is in operative connection with a manually actuated input device 1244. It should be understood that in some exemplary arrangements the manually actuated input device may be directly associated with the associated switch 1244, while in other arrangements the input device may be arranged so as to be operatively connected to the switch through other structures. The exemplary switch 1242 of this exemplary arrangement provides wire delivered signals to the latch controller 1240. Exemplary systems may include features and capabilities like those disclosed in U.S. Ser. No. 17/096,148, now U.S. Pat. No. 11,400,888 which is incorporated herein by reference in its entirety.

A further exemplary feature of the exemplary arrangement is an inductance sensor 1246. The exemplary inductance sensor is configured to sense current flow through a wire or other electrical conduit that delivers electrical power to a motor or other electrical device 1248. In some exemplary arrangements the electrical device 1248 may be part of an existing system such as a locking system on a vehicle such as a truck cab, to which a service body which includes at least one compartment has been added. In such an arrangement a locking system for one or more closure members on the service body may be controlled by the latch controller in coordinated relation with the locking system for the doors on the cab by sensing locking and unlocking signals in the existing wires using the inductance sensor 1246. Such an arrangement may enable the latch controller to control latches on the service body in coordinated locking and unlocking relation with the doors of the truck cab without the need for modifying the existing wiring harness of the truck cab. Of course as can be appreciated numerous other applications may be provided in which an inductance sensor is useful for providing a wire delivered signal to the latch controller which is indicative of electrical current being delivered to a device.

Latch controller 1240 of the exemplary system is in operative connection with an image capture system 1250. The exemplary image capture system 1250 includes at least one camera 1252. The exemplary image capture system may be operative to capture data corresponding to images in a field of view adjacent to the closure member or other structure or item that is controlled through operation of the latch 1234. In exemplary arrangements the image capture system may be usable to capture the image data so as to record the appearance of persons who access the compartment or other area that is associated with the closure member or other structure or item that is controlled by the latch 1234. Of course it should be understood that this closure member image capture arrangement is exemplary and other arrangements or other approaches may be used or in some arrangements an image capture interface may not be provided.

The exemplary latch controller 1240 is also configured to communicate with a mobile wireless device 1254 in a manner like that later discussed. The exemplary mobile wireless device may include a smart phone, augmented reality headset, tablet computer or similar device. In the exemplary arrangement the latch controller is configured to wirelessly communicate with the mobile wireless device through wireless signals such as radio frequency (RF) signals and/or magnetic field signals. When referred to herein the magnetic field signals which are communicated by a magnetic field transceiver refers to short-range wireless signals in the 13.553 MHz to 13.567 MHz ISM band and that are used to communicate between devices on a point-to-point basis through inductive coupling. In the exemplary arrangements described herein the magnetic field signals correspond to signals of the Near Field Communication type that are communicated at 13.56 MHz in accordance with the ISO/IEC 18000-3 air interface Standard. In exemplary arrangements magnetic field signals and associated devices used to communicate such signals may comply with the ISO/IEC 18092 Standard and/or the ISO/IEC 21481 Standard. In other exemplary arrangements the mobile wireless device may communicate with the latch controller via Wi-Fi or cellular communications. Of course it should be understood that these approaches are exemplary and in other arrangements other types of communication may be used.

In the exemplary system shown the latch controller further wirelessly communicates with at least one wireless portal 1256. In the exemplary arrangement the wireless portal 1256 may include a Wi-Fi hub, Bluetooth portal, cellular communications portal or other suitable device that enables the latch controller to communicate with other devices and systems. In the exemplary arrangement the wireless portal 1256 is in operative connection with at least one network schematically indicated 1258. In exemplary arrangements the network 1258 may include one or more local area networks or wide area networks such as the Internet. The exemplary network is in operative connection with a plurality of remote devices and systems such as remote servers 1260, 1262 and 1264.

Such remote servers in some arrangements may include a cloud computing and/or cloud storage arrangement in which the latch controller 1240 communicates. For example in some arrangements as later discussed, the exemplary latch controller is made to operate responsive to signals received from the remote systems. Further in some arrangements the latch controller may be operative to store data related to events including opening of the latch and other associated data, in remote data storage. In still other arrangements circuit executable instructions for operation of the latch controller may be downloaded into at least one data store of the latch controller from the remote servers and systems. In addition, data such as identifying data corresponding to authorized devices such as mobile wireless devices or operators of such devices that are authorized to cause the latch to provide access to a storage compartment or other item or device, may be delivered from the remote systems and servers to at least one data store in the latch controller.

Further in other arrangements the circuit executable instructions such as software and data which operate in the latch controller 1240 may be operated remotely as a virtual machine in one or more remote servers. In such arrangements the latch controller may comprise a local network appliance device which interfaces with the latch, the sensors and the other local devices and systems. Of course it should be understood that this approach is exemplary and numerous other approaches may be used.

Further in the exemplary arrangement the exemplary latch controller is in operative communication with at least one remote location system 1266. In an exemplary arrangement the remote location system may include a GPS system that enables a determination of a current location of the latch controller 1240. In some exemplary arrangements, particularly arrangements in which the latch controller is associated with a vehicle or other mobile unit, the ability to determine the current location of the latch controller may be useful for purposes of recording where events and other activities occur.

It should be understood that these functional components that are shown in the exemplary system 1232 are merely examples of devices and systems that may be operated in conjunction with a latch controller of exemplary arrangements. Other systems may include different types of devices and systems and provide other types of functions and capabilities, such as those described in the incorporated disclosures.

The exemplary latch controller 1240 includes circuitry that is operative to communicate with the connected devices and systems, and to control the operation of the latch 1234. In the exemplary arrangement the latch controller includes at least one circuit including a processor schematically indicated 1268 and at least one data store schematically represented 1270. In exemplary arrangements the at least one processor may include a processor suitable for carrying out circuit executable instructions that are stored in the one or more associated data stores. The processor may include or be in operative connection with a nonvolatile storage medium including instructions that include one or more input/output circuits. For example in some exemplary arrangements processors may correspond to one or more or a combination of a CPU, FPGA, ASIC or any other integrated circuit or other type of circuit that is capable of processing data and instructions. The at least one data store may correspond to at least one medium including one or more of volatile or nonvolatile memory such as random access memory, flash memory, magnetic memory, optical memory, solid-state memory or other devices that are operative to store circuit executable instructions and data. Circuit executable instructions may include instructions in any of the plurality of different programming languages and formats including without limitation, routines, subroutines, programs, threads of execution, scripts, objects, methodologies and functions which carry out the activities such as those described herein. Structures for processors may include, corresponds to and utilize the principles described in the textbook entitled Microprocessor Architecture, Programming and Applications with the 8085 by Ramesh S. Gaonker, Sixth Edition (Penram International Publishing 2013), which is incorporated herein by reference in its entirety.

Exemplary processors may include processors provided by Intel Corporation, Advanced Micro Devices, ARM or other manufacturers. Further in exemplary arrangements processors may be provided as part of a System on a Chip (SOC) arrangement with numerous different types of embedded circuitry that provide different capabilities and functions.

The exemplary data stores used in connection with exemplary arrangements may include any one or more of several types of mediums suitable for holding circuit executable instructions and data. These may include, for example magnetic media, optical media, solid-state media or other types of media such as RAM, ROM, PROM, flash memory, magnetic memory, optical memory or other suitable form of media that is capable of holding data and circuit executable instructions.

Figure 36:
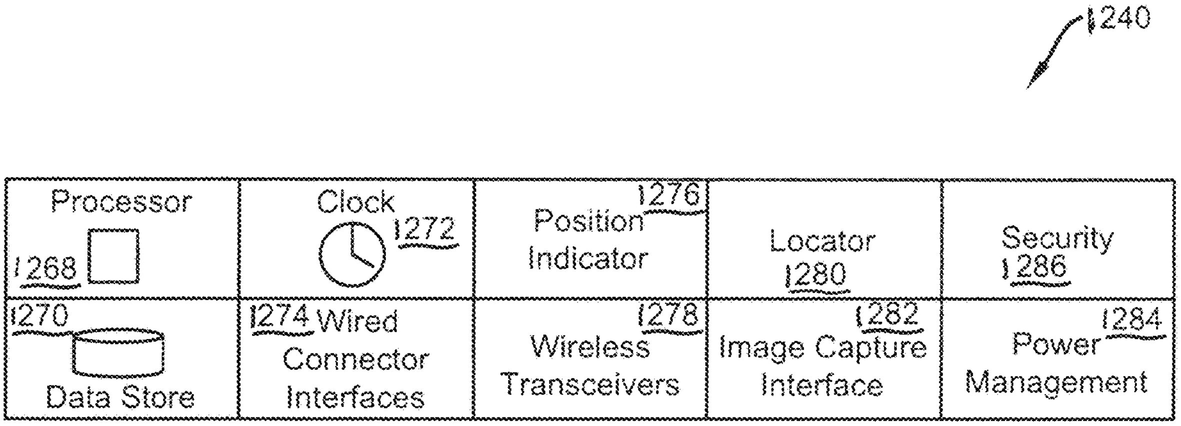
FIG. 36 is a schematic representation of the functional components of the exemplary latch controller circuitry.

The exemplary latch controller 1240 further includes circuitry which provides the functions that are referenced in connection with FIG. 36. It should be understood that these functions are merely exemplary, and do not necessarily represent all the functions that would be carried out in connection with the operation of the latch controller. Further in other arrangements some of the circuitry functions represented in FIG. 36 may not be included.

The exemplary controller includes clock circuitry 1272. The exemplary clock circuitry is operative to enable the latch controller to carry out the circuit executable instructions. The exemplary clock further enables the controller to determine event sequences and times associated with events which occur.

The exemplary circuitry further includes at least one wired connector interface 1274. The exemplary wireless connector interfaces include interfaces for the sensors which deliver wire delivered electrical signals to the latch controller. The wired connector interfaces 1274 further include interfaces which deliver signals to devices such as the motor of the latch in the exemplary arrangement. The at least one wired connector interface further includes in an exemplary arrangement a connector interface to the image capture system 1250. Of course these interfaces are exemplary and in other arrangements other interfaces may be used. Further it should be understood that while in the exemplary arrangement a wired connector interface is utilized to communicate with a device or system, in other arrangements a wireless interface may be utilized for such communication.

The exemplary latch controller circuitry further includes position indicator circuitry 1276. In the exemplary arrangement the position indicator circuitry includes circuitry which is operative to indicate a current position of the latch controller relative to a locally positioned detecting device. This may include for example a wireless transceiver such as Bluetooth circuitry that is operative to cause at least one position indicating message to be sent which is operative to indicate a latch controller position to a mobile wireless device 1254. In exemplary arrangements the position indicator circuitry is usable to assist an operator of a mobile wireless device in locating the latch controller and its associated structures. Such functionality may be particularly useful in environments where the latch controller is associated with a device that is portable or mobile and which a user needs to locate to obtain access or otherwise utilize its functionality.

Wireless transceiver circuitry 1278 is included in the circuitry of the exemplary latch controller 1240. The wireless transceiver circuitry 1278 corresponds to at least one wireless transceiver through which the latch controller may communicate with other devices and systems. In exemplary arrangement the at least one wireless transceiver includes a local magnetic field transceiver such as a Near Field Communication (NFC) transceiver. In the exemplary arrangement the local magnetic field transceiver has a maximum range of less than one foot. In exemplary arrangements the magnetic field transceiver enables communication wirelessly with another device which includes a magnetic field transceiver that is in very close proximity to the latch controller through inductive coupling. Thus for example the local magnetic field transceiver is operative to communicate with a mobile device only within a range of less than one foot. This enables carrying out functions like those that are later discussed.

The exemplary wireless transceiver circuitry further includes at least one RF transceiver. In the exemplary arrangement this includes Bluetooth transceiver circuitry which is operative to communicate in a local area with Bluetooth enabled devices. This may include for example mobile wireless device 1254.

Further exemplary arrangements may include wireless transceiver circuitry that provides Wi-Fi communication or cellular communication with the wireless portal 1256. Further in other exemplary arrangements other types of wireless transceiver circuitry may be utilized. This may include for example satellite communication circuitry, infrared communication circuitry, ultrasonic communication circuitry, laser communication circuitry or other suitable forms wireless communication capabilities.

The exemplary latch controller further includes locator circuitry 1280. In the exemplary arrangement the locator circuitry is usable to determine a current position of the latch controller. In the exemplary arrangement the locator circuitry comprises circuitry that is operative to communicate with a GPS system for purposes of enabling a determination of a current geolocation of the latch controller. Of course it should be understood that this location circuitry is exemplary and in other arrangements other approaches may be used.

The exemplary latch controller further includes an image capture system interface 1282. In the exemplary arrangement the image capture system interface is an interface that communicates with the image capture system 1250. In exemplary arrangements the image capture interface is usable to communicate with the image capture system to provide instructions such as instructions to capture image data through operation of the camera 1252. Alternatively or in addition, the image capture interface may operate to provide instructions that cause the image capture system to store data corresponding to images in at least one data store of the system for later recovery. Such image capture instructions may further include instructions to move captured image data from a transient storage medium to a more permanent medium. This may include for example image data that is been captured and temporarily stored in advance of the current time, which may be useful for review when an event has occurred. For example in some arrangements it may be useful to have available stored image data that was captured prior to the latch controller receiving a signal which causes the latch controller to unlatch the latch. Having such image data stored and available for later review and audit may be helpful for documenting the circumstances or the identity of the individual who caused the latch to be unlatched. Further in exemplary arrangements the image capture interface may operate to exchange information with the latch controller that is usable to tag certain image data or to recover such image data from memory for purposes of associating the stored image data with data corresponding to events which are detected or caused through operation of the latch controller. Of course it should be understood that these features are exemplary and in other arrangements other approaches may be used.

The exemplary latch controller further includes additional circuitry associated with additional functions. For example power management circuitry 1284 is operable to control and deliver power to the circuit functions. The power management circuitry may also be operative to assure that potentially harmful conditions are detected and/or avoided. Further exemplary arrangements may include circuitry 1286 associated with security functions. Such security functions may include storage and management of encryption keys, digital certificates or other security features. Such security functions may further include functions associated with the encryption of messages that are sent from the latch controller and the decryption of messages that are received. Further exemplary security functions may include encryption of stored data included in the at least one data store of the latch controller.

Further in exemplary arrangements the exemplary security functions include assuring that messages that are received by the latch controller and that seek to provide instructions to the controller are received from an authorized device or individual. Further the exemplary security features include assuring that instructions that are received by the latch controller which seek to modify or delete stored data or instructions are provided by an authorized device.

For example in an exemplary arrangement the latch controller is enabled to have the stored circuit executable instructions and data therein modified or erased responsive to communication with one or more remote devices and systems. This may include for example, the data which is stored in the at least one data store of the latch controller, that is used to determine if identifying data that is received by the latch controller will cause the controller to unlatch the latch. In such arrangements the security circuitry 1286 is operative to assure that the device and/or operator from which the programming messages are received is an authorized device and/or operator. This may be done through the use of digital certificates and a public-key infrastructure approach with authenticates the source of the messages as an authorized source.

Of course the exemplary programming messages which may be received through at least one RF transceiver may further include additional authenticating data which is utilized by the security circuitry to assure that program and data changes and updates originate from an authorized source. Further in some exemplary arrangements the security circuitry operates to selectively enable only certain executable instructions to be modified as a result of receipt of messages from remote devices. In exemplary arrangements certain core instructions which may help to assure proper operation or device recovery from malfunctions may be secured against being modified or erased.

In some exemplary arrangements groups of circuit executable instructions and data may be modified only through certain types of communications with the latch controller. For example in some exemplary arrangements a group of circuit executable instructions stored in the at least one data store 1270 may be modifiable responsive to RF programming messages received through an RF transceiver. Such received programming messages may be operative to modify the stored instructions and data provided that they meet the required authorization and security criteria of the program security circuitry. However while the one group of circuit executable instructions and data may be modifiable through RF programming messages, a further group of circuit executable instructions may not be modifiable responsive to RF programming messages. Such further group may be modifiable only through receipt of wireless messages which meet different criteria for authentication, encryption or security. Further in some exemplary arrangements the further group of circuit executable instructions and data may be modifiable only through messages communicated via the local magnetic field transceiver circuitry. Limiting such changes to wireless messages communicated through the local magnetic field transceiver helps to assure that such messages are communicated from a device that is in close proximity to the latch controller, which in the exemplary arrangement is necessarily located less than one foot away from the latch controller.

For example in some arrangements the configuration of the structure in which the latch is operated may only enable changing certain programming through the use of a device that has been authorized to gain access to an interior area of a room, compartment or other area from which the local magnetic field signals can be communicated to the latch controller. Further in other exemplary arrangements the required proximity of the device which delivers the magnetic field programming messages to the latch controller may be within a field of view of the camera of the image capture system 1250 which assures that images of the individual making the changes to the circuit executable instructions and data is recorded. Further other features for assuring proper security of the circuit executable instructions and data may be utilized.

Of course it should be understood that the functions and capabilities discussed in connection with the latch controller 1240 are exemplary and other arrangements other or additional features may be used.

FIGS. 40-44 schematically represent logic flow which may be carried out by an exemplary latch controller in connection with the operation of the exemplary system 1232. It should be understood that this logic flow is presented at a high-level and may not include all the steps and actions that would be carried out in connection with many systems which include the features discussed. Further systems which include the useful aspects of the exemplary latch controller may provide further functions and capabilities that are not specifically described in the exemplary logic flow.

In the operation of the exemplary latch controller the logic flow begins with the controller determining whether the jaw is in the latched position such that the latch is in the latched condition. This is done in the exemplary arrangement by the latch controller receiving signals from the one or more sensors in operative connection with the latch, the closure member or other system components. In a step represented 1288 the latch controller is operative to sense for signals which are indicative of the position of the jaw of the latch which holds the striker in a fixed position. Then in a step 1290 the controller is operative to make a determination concerning whether the jaw is in the latched position. If it is determined in step 1290 that the jaw is not in the latched position the system continues to monitor the sensors for conditions to change so that it is determined that the jaw is in the latched position, and the latch is in the latched condition.

However if it is determined in step 1290 that the jaw is in the latched position, the circuitry operates as represented by step 1292 to sense for receipt through the wired connector interface of a wire delivered electrical unlatch signal. This may include for example a wire delivered signal to the latch controller from the at least one switch 1242 or the inductance sensor 1246. If it is determined in a step 1294 that a wired delivered electrical unlatch signal has been received, latch controller circuitry operates in a manner like that later discussed to cause the motor to rotate in a first rotational direction which causes the jaw to be enabled to move from the latched position to the unlatched position.

If in step 1294 it is determined that a wired delivered electrical unlatch signal has not been received, the circuitry operates to sense for receipt of at least one wireless unlatch signal through the at least one wireless transceiver. This is represented by step 1296. A determination is then made in step 1298 concerning whether the at least one wireless unlatch signal has been received. If such a signal has been received the circuitry operates to cause the actions next discussed. However if the at least one wireless unlatch signal has not been received, the circuitry repeats the steps as indicated to continue to monitor for receipt of a signal which causes the circuitry to operate in accordance with its circuit executable instructions to cause the latch to change to the unlatched condition.

The exemplary latch controller may operate responsive to circuit executable instructions and data stored in the at least one data store 1270 to determine the approach to be carried out to enable the latch to change from the latched condition to the unlatched condition. For example in some exemplary arrangements the circuit executable instructions associated with the latch controller may cause the latch controller to operate in response to receiving a wire delivered unlatch signal which corresponds to the latch controller initially receiving electrical power from a source. In such arrangements the latch controller operates as later discussed to unlatch the latch responsive to the powering up of the latch controller.

In other exemplary arrangements the latch controller may receive power continuously from a power source. In such arrangements the latch controller may operate in accordance with its circuit executable instructions to cause the condition of the latch to change responsive to receipt of one or more wire delivered electrical unlatch signals. Such signals may include signals from the one or more sensors such as the sensor types previously discussed.

In other exemplary arrangements the latch controller may receive power continuously from a power source. In such cases the latch controller may operate to monitor for one or more wireless signals which correspond to the at least one wireless unlatch signal from a remote mobile wireless device, a locally positioned wireless device, or a remote system (or a combination thereof). As can be appreciated numerous different signal types and combinations of signals, as well as signals which include identification data corresponding to a remote system, a mobile wireless device and/or a device operator requesting unlatching of the latch, may be required to change the condition of the latch. Of course it should be appreciated that these discussed scenarios are exemplary and in other arrangements other approaches may be used.

As represented in step 1300 when an at least one wireless unlatch signal has been received, the circuitry of the latch controller is operative responsive at least in part to the data in the at least one data store 1270 to determine the requirements that must be met for the latch controller to cause the latch to change to the unlatched condition. In the exemplary arrangement represented, the latch controller operates to make a determination if the associated circuit executable instructions require the receipt of a further wireless signal before the latch is changed to the unlatched condition. This is represented by step 1302.

If it is determined in step 1302 that a further wireless signal is required, the latch controller operates in accordance with its circuit executable instructions to monitor for receipt of the further signal. This is represented by a step 1304. A determination is then made at a step 1306 concerning whether the further signal has been received. If the required signal has not been received the circuitry of the latch controller continues to monitor for receipt of the signal.

As can be appreciated in exemplary arrangements the circuit executable instructions may require a plurality of different wireless signals and/or data included in such signals (or a combination of wireless signals and wire delivered signals) before the latch controller will operate to cause the latch to change to the unlatched condition. For example in some exemplary arrangements the latch controller may operate the at least one wireless transceiver to be enabled to receive at least one remote authorization message from a remote system before the controller will cause the latch to be unlatched. This may include at least one wireless RF signal that is generated by the mobile wireless device 1254. Such a signal may include identifying data which corresponds to at least one of the particular mobile wireless device (such as a token or other device identifying data), or identifying data for the person operating the mobile wireless device. In some arrangements this information that is received from the mobile wireless device may be compared through operation of the latch controller with locally and/or remotely stored data in at least one data store for purposes of determining whether the received data and the stored data have a predetermined relationship and the latch controller should operate to unlatch the latch. Further the mobile wireless device signals may include data corresponding to at least one lock instruction which causes a change in the condition of the latch when the received identifying data and the stored data have the predetermined relationship.

In other exemplary arrangements the latch controller may receive one or more wireless signals including mobile wireless device and/or operator identifying data through the local magnetic field transceiver. Such data may be compared through operation of the latch controller with local and/or remotely stored data for purposes of determining if the data has a predetermined relationship indicative that the latch should be unlatched.

Further in exemplary arrangements the circuit executable instructions associated with the latch controller may be operative to require that the latch controller receive the at least one wireless unlatch signal or data from multiple sources. This may include for example receiving a first wireless signal or instruction data from the mobile wireless device, and the latch controller communicating with a remote system such as one of the remote servers, 1260, 1262, 1264 through the at least one wireless transceiver of the latch controller and the wireless portal 1256. The communication with the remote server may correspond to a request for authorization to provide the user with access based on the identifying data received from the mobile wireless device and/or other access parameters such as the time, location, latch information or other data which is usable to determine if the request for unlatching the latch should be authorized. In such exemplary arrangements the remote server may return at least one message including data or instructions authorizing access. Alternatively and/or in addition the remote server may return one or more messages including data or instructions that can be utilized in conjunction with data received from the mobile wireless device to verify that the device and/or the operator thereof is authorized to open the latch.

Alternatively or in addition the circuit executable instructions associated with the latch controller may enable the controller to receive wireless messages from the mobile wireless device both through the wireless RF transceiver and the local magnetic field transceiver, which messages comprise the at least one wireless unlatch signal. For example in some arrangements the mobile wireless device may be operated to deliver to the latch controller at least one wireless RF Bluetooth message which is indicative of a request to unlatch the particular latch. Such signals may include identifying data associated with the device and/or the operator of the device. The circuit executable instructions associated with the latch controller may then require the receipt of wireless signals through the local magnetic field transceiver, which signals include further operator or device identifying data or other identifying data and/or instructions that can be utilized to authenticate the mobile wireless device and/or the operator.

Further as can be appreciated, the timing and content of the different signals that are received either from a remote server, RF signals from the mobile wireless device and/or through the local magnetic field transceiver interface from the mobile wireless device may be different in various arrangements. Numerous different requirements and message content may be established through the programming of the latch controller to provide the level of security required by the system operator. Numerous different approaches may be used.

As represented by step 1308, after the latch controller has received the at least one wireless unlatch signal in accordance with the requirements of the circuit executable instructions, the exemplary latch controller is then operative to determine if the received identifying data has a predetermined relationship with stored data. This may include in some arrangements determining if the predetermined relationship exists with regard to the data stored in the at least one data store 1270 of the latch controller. In other arrangements this may include determining if there is a predetermined relationship between the received identifying data corresponding to the mobile wireless device and/or the operator thereof, and data included in a data store remote from the latch controller. Alternatively the determination of the predetermined relationship may be based on data included in the local latch controller data store as well as remotely accessible stored data.

As represented by step 1310 if the identifying data that is received in the at least one wireless unlatch signal does not have the predetermined relationship to stored data, the latch controller operates as represented by step 1312 to determine that access is denied and to prevent operation of the latch to change to the unlatched condition. If the predetermined relationship is determined, the latch controller then operates to proceed to carry out instructions related to causing the latch to unlatch. Further in some exemplary arrangements the latch controller operates to determine if the at least one received message includes data corresponding to at least one instruction to unlatch the latch. In such arrangements if the message includes data corresponding to such an instruction, the latch controller operates to carry out the stored circuit executable instructions which are operative to cause the latch to change to the unlatched condition.

In the exemplary logic flow the exemplary latch controller then operates as represented in a step 1314 to determine the circuit executable instructions associated with unlatching the particular latch associated with the compartment or other device or item to which the operator of the mobile wireless device will be granted access. In some arrangements instructions or data included in at least one received message may be indicative of the particular latch to be changed to the unlatched condition. As can be appreciated in arrangements where the latch controller is associated with multiple latches, different latch types may have different operating parameters or other requirements for purposes of operating to cause the latch to be unlatched. For example in some arrangements, the circuit executable instructions and stored data in the latch controller may be indicative that a motor in a particular latch is operated until at least one sensor detects that the jaw the latch has moved from the latched position to the unlatched position. The circuit executable instructions associated with the latch may then cause the motor of the latch to cease operation.

In other exemplary arrangements the circuit executable instructions and data associated with a particular latch may indicate that the motor of the latch is required to rotate in a rotational direction which causes the latch to become unlatched for a set period of time, and then stop. In other exemplary arrangements the circuit executable instructions and stored data may indicate that the latch is to be operated for a particular number of turns in a rotational direction which causes the latch to unlatch. In other exemplary arrangements the circuit executable instructions and data corresponding to a latch may be indicative that to be unlatched, the latch motor be operated to rotate in a first rotational direction until an electrical load sensor associated with the motor determines that the sensed electrical load has a predetermined relationship to a stored threshold which corresponds to the motor or a mechanism in operative connection therewith, contacting a stop such as one of the stops at an end of travel such as the stops previously discussed.

Numerous different circuit executable instructions and data may be associated with a particular latch for purposes of causing the particular type of latch to be changed from the latched condition to the unlatched condition. As can be appreciated in some arrangements different types of latching mechanisms may be controlled through operation of the latch controller. These may include latch devices that include other motor types such as pneumatic or hydraulic motors that provide rotational movement. This may also or alternatively include in some arrangements linear actuators that operate in response to electrical, hydraulic or pneumatic energy. In exemplary arrangements the latch controller may include circuit executable instructions and data that enable the proper control and operation of numerous different types of motors and actuators.

Further in exemplary arrangements the circuit executable instructions and data of the latch controller may include data which dictates a particular manner of operation of the particular motor. This may include for example, the rotational direction in which the motor is made to rotate to change the latch to the unlatched condition. For example in cam actuated latches such as the latches as previously discussed, while the motor needs only to operate in one rotational direction to provide the unlatching function, always causing the motor to rotate in one direction may result in premature wear of different mechanisms and contacting surfaces. The circuit executable instructions and data may periodically cause the direction of rotation of the motor to change so that wear is more evenly distributed over different surfaces and components of the mechanism. Alternatively or in addition, operating parameters such as the timing and speed of actuation may be varied. In some exemplary arrangements in determined circumstances, the circuit executable instructions may operate to cause the latch to unlatch rapidly in response to receipt of the at least one wireless unlatch signal. In other arrangements the circuit executable instructions and stored data may cause a time delay or other conditions after receipt of the at least one wireless unlatch signal before the latch controller will cause the latch to change to the unlatched condition. This may be done for example to enable the image capture system to capture data corresponding to numerous different images of the operator who is requesting access to the particular compartment or other item or device which is controllable by the latch. In other arrangements other variations in speed and timing may be carried out to accomplish other functions or to gather other types of data. Numerous different approaches may be used in exemplary arrangements that employ the features discussed herein.

After making the determination on the requirements for the opening of the latch, the exemplary latch controller then operates as represented in a step 1316 to cause the motor of the latch to rotate in the direction necessary to cause the jaw to be enabled to move from the latched position to the unlatched position. During rotation of the motor the latch controller operates to monitor for an appropriate stop condition which will cause the controller to cease motor rotation. This is represented by a step 1318. In exemplary arrangements this step may correspond to monitoring for data corresponding to a motor rotation duration which has a predetermined relationship to one or more motor duration values stored in the at least one data store of the latch controller. For example a stored motor duration value may correspond to a set time stored in the at least one data store, during which the motor is to operate to cause the jaw to be able to move to the unlatched position. Alternatively the motor rotation duration value may correspond to a number of rotations of the motor, which rotations correspond to a linear or angular distance or other value, which a portion of the mechanism moves to enable the jaw of the latch to be movable to the unlatched position. In other arrangements a motor rotation duration value may correspond to a change in sensed electrical load which may be indicative that the motor has caused the mechanism to run against a stop which indicates that a mechanism has reached its maximum extent of travel. As previously discussed, numerous different types of data may correspond to the motor rotation duration which can be compared for a predetermined relationship with stored data by the latch controller.

As represented in a step 1320 the latch controller operates to make a motor run determination as to whether the motor rotation duration in the rotational direction will enable the latch to unlatch. The controller determines if the rotation duration has reached a predetermined relationship with one or more stored duration values. If the predetermined relationship is not determined to be present, the latch controller continues to cause the motor to run to unlatch the latch. Alternatively if it is determined in step 1320 that the rotation duration has a predetermined relationship with the stored relation value, the latch controller is operative to cease rotation of the motor in the rotational direction that causes unlatching of the latch. This is represented by step 1322. Of course it should be understood that this approach is exemplary and in other arrangements other approaches may be used.

In some exemplary arrangements once the motor has operated to cause the latch to be placed in the unlatched position, the latch controller may operate in accordance with its circuit executable instructions to cause the latch to carry out other functions. For example in some exemplary arrangements once the motor ceases rotation after the latch has been changed to the unlatched condition the latch controller may operate to cause electrical signals to be applied to the motor of the latch so that the motor is electrically braked to prevent rotation of the motor output shaft. This may be done in exemplary arrangements by the controller applying an electrical potential to the motor so that the motor shaft resists forces that would otherwise cause the motor shaft to rotate. Electrically braking the motor shaft may be used to help assure that the latch is not inadvertently caused to move to an improper condition when the latch has been opened. Alternatively or in addition the circuit executable instructions of the latch controller may be operative to enable the motor to be freewheeling in certain circumstances. This may include for example when the latch has been unlatched. Such freewheeling capability may be achieved by applying an appropriate electrical potential to the motor so that the rotational forces which may act on the motor shaft enable movement. This approach may be used in some arrangements to facilitate re-latching of the latch or other functions that can result from the application of forces to the latch mechanism. Of course these approaches are exemplary and in other arrangements other approaches may be used.

In the exemplary arrangement subsequent to the latch being changeable to the condition in which the latch is enabled to be unlatched, the latch controller operates as later discussed to store data related to the latch being unlatched. These steps may be carried out by the latch controller either concurrently or subsequent to the steps which follow the latch being changed to the condition in which the latch is enabled to be unlatched. It should be appreciated that numerous different approaches may be taken in different latch controller arrangements to record and report information concerning latch operation.

In the exemplary arrangement once the latch has been changed to the unlatched condition, the exemplary latch controller operates to determine the circuit executable instructions and data for operating the latch so that it can be returned to the latched condition. The operation of the latch controller for resolving the circuit executable instructions and data is represented by a step 1324. As can be appreciated in some exemplary arrangements once the motor has caused the latch to be in the unlatched condition, it is necessary to operate the motor in an opposed rotational direction so that the latch can be returned to the latched condition. Of course in other arrangements such as the cam actuated latch examples previously discussed, it is not necessary for the motor to be operated in a reverse direction in order to enable the latch to return to the latched condition. As represented in a step 1326 the latch controller operates to make a determination as to whether for the particular latch, there are stored circuit executable instructions that require operation of the motor in an opposed rotational direction from that in which the motor has been operated to cause the latch to unlatch, and that will be executed to enable the latch to return to a latched condition.

If it is determined in step 1326 that there are no required instructions to be executed by the latch controller to return the latch to the latched condition, the latch controller logic returns in the logic flow and waits for further unlatch instructions. However in circumstances where the motor must be operated in an opposed direction to enable the latch to again be in the latched condition, the latch controller operates to carry out the instructions and data that will enable the latch to be returned to the latched condition.

In some exemplary arrangements the circuit executable instructions and data associated with the programming of the latch controller may include stored motor return duration value data similar to that associated with the operation of the motor when causing the latch to change to the unlatched condition. Alternatively in some arrangements the stored circuit executable instructions and data may include instructions which cause the motor to operate in a reverse rotational direction immediately or a set time after the motor has operated to cause the latch to move to the unlatched condition. As can be appreciated, the circuit executable instructions and data associated with operation of the particular latch may depend on the particular circumstances in which the latch is utilized.

In the exemplary arrangement once it is been determined in step 1326 that the motor is to be operated in the reverse rotational direction, the latch controller circuitry operates to determine the conditions for reverse operation of the motor. This is represented by step 1328. In some exemplary arrangements the latch controller may operate to resolve the data corresponding to the reverse motor duration values stored in the at least one data store of the latch controller which are indicative of the requirements for operating the motor to return to the condition in which the latch can again be latched. Further in exemplary arrangements the controller may operate to receive signals from one or more sensors which are indicative that the motor can be operated in the reverse direction. This is represented for example by step 1330. In some exemplary arrangements conditions may be sensed which may prevent or which indicate that it would not be appropriate to cause the motor to operate until certain conditions change. This may include for example a situation where an obstruction is detected such that damage may result to the mechanism or to other objects if the motor is operated in the reverse direction before the sensed conditions change. Of course it should be understood that these circuit executable instructions and functions are exemplary and in other arrangements other approaches may be used.

A determination is then made in a step 1332 as to whether the conditions for operation of the motor in the reverse rotational direction have been met. If not the latch controller operates to wait for the conditions to change so that reverse motor operation is appropriate. However if the conditions sensed are appropriate to begin operation of the motor in the reverse rotational direction, the latch controller operates to run the motor in the reverse direction as represented by step 1334. The exemplary latch controller then operates to monitor at least one motor reverse rotation duration value as represented by step 1336. Such motor reverse rotation duration values may correspond to the types of parameters previously discussed. These may include a time window of reverse motor operation, a number of motor turns, sensing of a portion of a mechanism such as the jaw or pawl in a particular position by a sensor, the sensing of an electrical load on the motor which is indicative that the mechanism has run up against the stop, or other motor rotation duration value.

The exemplary latch controller then operates to make a motor reverse run determination as to whether the sensed motor reverse rotation duration value has a predetermined relationship with one or more stored reverse rotation duration values. This determination is represented by step 1338. If in step 1338 the predetermined relationship is not found, the latch controller continues to operate the motor in the reverse direction and continues to monitor the reverse rotation duration values. Once it is determined in step 1338 that the reverse rotation value has the predetermined relationship to the stored data, a motor run determination is made by the latch controller, and the latch controller causes the motor to cease operating in the reverse direction. This is represented by step 1340. Of course it should be understood that this approach is exemplary and in other arrangements other steps, operations, analysis, functions and approaches may be used.

In other exemplary arrangements the exemplary latch controller may operate to cause the motor to run in a direction causing the latch to change to the unlatched condition until the movement of a component of the latch is sensed as having moved in a manner which is indicative that the latch has placed the associated closure member in the unlocked condition. This may include for example determining through operation of a sensor that the jaw and/or pawl has moved to be in the unlatched position. In some exemplary arrangements the latch controller may cause the motor to operate until a sensor senses that the latch is in the unlatched condition. Such a sensor may include for example a proximity sensor, a contact sensor or a photosensor that senses the position of a latch component. In exemplary arrangements upon sensing via the sensor that the latch is in the unlatched condition, the controller may cause the motor to remain stopped in the position in which the latch is in the unlatched condition. In some exemplary arrangements the latch controller may operate in accordance with its circuit executable instructions in responsive to receipt of at least one constant voltage or other activation signal to cause the motor to change the latch from the latched condition to the unlatched condition and while the signal continues, to cause the motor to stop so as to continue holding the latch in the unlatched condition. The motor remains stopped until the activation signal is discontinued or otherwise released. Thereafter responsive to the discontinuation of the activation signal the controller operates in accordance with its circuit executable instructions to cause the motor to operate to return the latch to its initial position in which the latch is enabled to return to the latched condition. Of course it should be understood that this approach is exemplary and in other arrangements other approaches may be used.

In the exemplary arrangement the latch controller operates to resolve certain data related to each latch opening event and to cause such data to be stored in at least one data store. This is done to assure that information regarding the operation of the latch is recorded for later review and analysis if there is an irregular event or condition that arises.

In connection with each occasion of the latch being changed to the unlatched condition by the latch controller, the controller is operative responsive at least in part to the clock 1272, to resolve time data that is associated with the receipt of the at least one wire delivered or wireless signal which has caused the latch to change to a condition in which the latch is enabled to be unlatched. This is represented by step 1342. For purposes hereof the time data may correspond to an exact time when the particular signal which resulted in the unlatching action was received by the latch controller. Alternatively in other arrangements the time data may correspond to a different event which resulted at least in part from the receipt of the signal. This may include for example, a time at which the motor completed operation to unlatched the latch, a time when the closure member was opened or other event data which is related to the receipt of the at least one unlatch signal. Of course these approaches are exemplary and in other arrangements other approaches may be used.

In the exemplary arrangement where the latch is unlatched in response to at least one wireless unlatch signal, the latch controller is operative to resolve data corresponding to the identifying data associated with the mobile wireless device, the operator of the device, or other data that was received in connection with the unlatching event. This is represented by step 1344. As can be appreciated in exemplary arrangements the latch controller may operate to recover all of the identifying data that was received and that resulted in the latch being unlatched. In other arrangements the latch controller may operate to resolve only certain data that is usable to identify the particular device or operator, but which does not include all of the identifying data. This may be done in some arrangements to prevent storage or transmission of information that if wrongfully intercepted might be usable by a criminal to compromise the system or to violate the privacy rights of the operator. Numerous different approaches may be taken in accordance with the programming of the latch controller.

In the exemplary arrangement the at least one data store 1270 includes data corresponding to latch identifying data. The latch identifying data is usable to identify the particular latch which has been unlatched in response to the operation of the latch controller. This data is usable to document the particular latch which has been operated in connection with the particular event which is occurred. The recovery of the latch identifying data is represented by a step 1346.

In the exemplary arrangement the latch controller operates in accordance with its circuit executable instructions to make a determination of the location in which the unlatching event for the latch has occurred. In some arrangements this corresponds to the current location of the latch controller upon receipt of the at least one wireless unlatch signal. This may be done in exemplary arrangements through the use of the GPS system data and locator circuitry 1280 of the latch controller. This is represented by step 1348. A determination of the geolocation in which the opening of the latch occurred may be useful in arrangements where the latch and latch controller are associated with a vehicle or other mobile device which may be located in different geographical locations.

As represented by step 1350 the exemplary latch controller is further operative to recover captured image data associated with the latch unlatching event. This may include for example in some arrangements the latch controller obtaining data corresponding to images from the image capture system and including the image data with a data record concerning the particular event. In other arrangements the latch controller may operate to recover identifying data such as tag data, time specific data or other data which may be usable to recover the image data directly from the image capture system. Numerous different approaches may be utilized for purposes of identifying and correlating data corresponding to images with the particular unlatching event.

The latch controller is then operative to store the data associated with the latch unlatching event in an access record in the at least one data store of the latch controller. In some arrangements the access record may be one or more data bearing records that includes the types of data previously mentioned, as well as other data that is associated with the particular event. In some exemplary arrangements the access record may be part of a log file which holds data corresponding to each access event (as well as other events) for which information is recorded and stored in accordance with the circuit executable instructions of the latch controller. As can be appreciated, in some exemplary arrangements the latch controller may operate to store access record data for a limited time in the local data store of the latch controller, and then may automatically offload the data to a remote system such as a remote server for purposes of creating a more permanent archive. This approach may be utilized to help to assure that adequate memory storage space is maintained in the latch controller and that the storage of data does not slow down controller operation. Of course it should be appreciated that these approaches are exemplary and in other arrangements other approaches may be used.

The exemplary latch controller is further operative to send the access record data to at least one remote server as represented by step 1354. This may be done at a time that is proximate to the access event so that the operation of unlatching the latch is identified and recorded in the remote system close in time to when the event occurs. Alternatively or in addition, the data related to the unlatching event may be accumulated in at least one data store of the latch controller for a period of time, and then sent with record data regarding other events on a periodic basis. Further in some exemplary systems the data regarding unlatching the latch may be accessed on demand remotely from at least one data store in the latch controller, by an authorized remote system. This may enable an operator of the system to obtain the data regarding the operation of the latch whenever it is needed for audit, analysis for archiving purposes. Of course it should be understood that these approaches are exemplary and in other arrangements other approaches, functions, information and capabilities may be provided by a latch controller.

Thus the exemplary arrangements achieve improved operation, eliminate difficulties encountered in the use of prior devices and systems, and attain the useful results described herein.

It should be understood that the features and/or relationships associated with one exemplary arrangement can be combined with features and/or relationships from another exemplary arrangement. That is, various features and/or relationships from various arrangements can be combined in further exemplary arrangements. The new and useful scope of the disclosure presented in this application is not limited only to the exemplary arrangements shown or described herein.

In the foregoing description, certain terms have been used for brevity, clarity and understanding. However, no one necessary limitations are to be implied therefrom because such terms are used for descriptive purposes and are intended to be broadly construed. Moreover the descriptions and illustrations herein are by way of examples and the new and useful concepts and features are not limited to the exact features shown and described.

Having described the features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. Apparatus comprising:

a latch including:

- a housing,
- a jaw, wherein the jaw
  - includes a notch configured to engage a striker,
  - is movably mounted in operative connection with the housing,
  - and is movable between
    - a latched position in which the jaw is operative to hold the striker in engagement with the latch, and
    - an unlatched position in which the striker is disengageable from the latch,
- a pawl, wherein the pawl
  - is rotatably movably mounted in operative connection with the housing,
  - is rotatable about a pawl pivot,
  - includes a first arm portion and a second arm portion, wherein each of the first arm portion and the second arm portion extend radially outward away from the pawl pivot, wherein the first arm portion terminates away from the pawl pivot at a radially outward end, and wherein the first arm portion is angularly disposed from the second arm portion,
wherein the second arm portion includes an actuating end, wherein the actuating end is radially disposed from the pawl pivot and is accessible from outside the housing,
wherein the pawl is rotatably movable between
an engaged position in which the radially outward end of the first arm portion
is in operatively engaged relation with the jaw, and
is operative to hold the jaw in the latched position,
a disengaged position in which the radially outward end of the first arm portion enables the jaw to move from the latched position to the unlatched position,
an electrically operated actuator, wherein the actuator extends in the housing,
includes a motor, wherein the motor
is in operative engagement with the first arm portion radially intermediate of the pawl pivot and the radially outward end, and
is selectively operative to cause the pawl to move from the engaged position to the disengaged position, whereby the jaw is enabled to move from the latched position to the unlatched position,
wherein the actuating end is selectively movable to cause the pawl to move from the engaged position to the disengaged position independent of operation of the motor, whereby the jaw is enabled to move from the latched position to the unlatched position responsive to actuating end movement.

2. The apparatus according to claim 1
and further comprising:
a latch controller, wherein the latch controller includes circuitry, wherein the circuitry includes
at least one data store, wherein the at least one data store includes circuit executable instructions,
a wired connector interface, and
at least one wireless transceiver,
wherein the latch controller is configured to be in operative connection with
the motor,
at least one sensor,
at least one switch, wherein the at least one switch is operable responsive to manual actuation of an input device,
a mobile wireless device,
wherein the at least one sensor is in operative connection with the jaw,
wherein the at least one sensor is operative to detect whether the jaw is in the latched position,
wherein the at least one switch is selectively operative to provide a wire delivered electrical unlatch signal responsive at least in part to actuation of the input device,
wherein the wire delivered electrical unlatch signal is receivable by the wired connector interface,
wherein the mobile wireless device is selectively operative to provide at least one wireless unlatch signal, wherein the at least one wireless unlatch signal is receivable by the at least one wireless transceiver,
wherein the latch controller is operative to cause
a) responsive at least in part to the at least one sensor, a determination that the jaw is in the latched position,
b) responsive at least in part to the determination in (a) and receipt through the wired connector interface of a wire delivered electrical unlatch signal, the motor to rotate in a first rotational direction wherein the jaw is enabled to move from the latched position to the unlatched position,
c) responsive at least in part to the determination in (a) and receipt by the at least one wireless transceiver of the at least one wireless unlatch signal, the motor to rotate in the first rotational direction, wherein the jaw is enabled to move from the latched position to the unlatched position,
d) subsequent to (b) or (c), responsive at least in part to the circuit executable instructions, the motor to cease rotation in the first rotational direction.

3. The apparatus according to claim 2
wherein the latch controller is further operative to cause
subsequent to (d), responsive at least in part to the circuit executable instructions, the motor to be electrically braked to prevent rotation thereof.

4. The apparatus according to claim 2
wherein the at least one wireless transceiver includes
a local magnetic field transceiver, wherein the local magnetic field transceiver is operative to communicate with the mobile wireless device only within a range of less than one foot,
wherein in (c) the at least one wireless unlatch signal is received through the local magnetic field transceiver.

5. The apparatus according to claim 2
wherein the at least one wireless transceiver includes
a local magnetic field transceiver, wherein the local magnetic field transceiver is operative to communicate with the mobile wireless device only within a range of less than one foot, and
an RF transceiver,
wherein in (c) the at least one wireless unlatch signal includes an RF signal received by the RF transceiver and a magnetic field signal received by the local magnetic field transceiver.

6. The apparatus according to claim 2
wherein the at least one wireless transceiver includes
a local magnetic field transceiver including an NFC transceiver, wherein the local magnetic field transceiver is operative to communicate with the mobile wireless device only within a range of less than one foot, and
an RF transceiver including a Bluetooth transceiver,
wherein in (c) the at least one wireless unlatch signal includes an RF signal received by the RF transceiver and a magnetic field signal received by the local magnetic field transceiver.

7. The apparatus according to claim 2
wherein the latch controller is in operative connection with a remote system,
wherein the latch controller is further operative to cause the at least one wireless transceiver to be operable to receive at least one remote authorization message from the remote system,
wherein in (c) the latch controller is operative to cause the motor to rotate in the first rotational direction responsive at least in part to receipt of the at least one remote authorization message.

8. The apparatus according to claim 2
wherein the latch controller is in operative connection with a remote system,
wherein in (c) the at least one wireless unlatch signal includes identifying data corresponding to at least one of the mobile wireless device and an operator of the mobile wireless device,
wherein the at least one controller is further operative to cause
the at least one wireless transceiver to wirelessly send at least some of the identifying data to the remote system.

9. The apparatus according to claim 2
wherein the circuitry further includes a clock,
wherein the latch controller is in operative connection with a remote system,
wherein in (c) the at least one wireless unlatch signal includes identifying data corresponding to one or more of the mobile wireless device or an operator of the mobile wireless device,
wherein the latch controller is further operative to cause
responsive at least in part to the clock, a determination of time data associated with receipt of the at least one wireless signal,
the at least one wireless transceiver to wirelessly send the time data and at least some of the identifying data to the remote system.

10. The apparatus according to claim 2
wherein the at least one data store includes latch identifying data,
wherein the circuitry further includes a clock,
wherein the latch controller is in operative connection with a remote system,
wherein in (c) the at least one wireless unlatch signal includes user identifying data corresponding to one or more of the mobile wireless device or an operator of the mobile wireless device,
wherein the latch controller is further operative to cause
responsive at least in part to the clock, a determination of time data associated with receipt of the at least one wireless signal,
the at least one wireless transceiver to wirelessly send the time data, the latch identifying data and at least some of the user identifying data to the remote system.

11. The apparatus according to claim 2
wherein the at least one data store includes stored identifying data,
wherein in (c) the at least one wireless unlatch signal includes received identifying data corresponding to one or more of the mobile wireless device or an operator of the mobile wireless device,
wherein the latch controller is further operative to further determine that the received identifying data has a predetermined relationship to the stored identifying data,
wherein responsive at least in part to the further determination, the motor is caused to rotate in the first rotational direction.

12. The apparatus according to claim 2
wherein the circuitry is further operative to cause
the at least one wireless transceiver to be operable receive identifying data from a remote system,
storage in the at least one data store, of stored identifying data corresponding to the received identifying data,
wherein in (c) the at least one wireless unlatch signal includes user identifying data corresponding to one or more of the mobile wireless device or an operator of the mobile wireless device,
wherein the latch controller is further operative to further determine that the received user identifying data and the stored identifying data have a predetermined relationship,
wherein responsive at least in part to the further determination the motor is caused to rotate in the first rotational direction.

13. The apparatus according to claim 2
wherein the at least one data store includes stored identifying data,
wherein in (c) the at least one wireless unlatch signal includes received identifying data corresponding to one or more of the mobile wireless device or an operator of the mobile wireless device,
wherein the latch controller is further operative to further determine that the received identifying data has a predetermined relationship to the stored identifying data,
wherein responsive at least in part to the further determination, the motor is caused to rotate in the first rotational direction,
wherein the latch controller is further operative to cause
the at least one wireless transceiver to be operable to receive at least one programming message,
at least some of the stored identifying data to be at least one of deleted or modified responsive at least in part to the at least one programming message.

14. The apparatus according to claim 2
wherein the circuitry further includes a clock,
wherein the at least one data store includes stored user identifying data and stored latch identifying data,
wherein the latch controller is in operative connection with a remote system,
wherein in (c) the at least one wireless unlatch signal includes received user identifying data corresponding to one or more of the mobile wireless device or an operator of the mobile wireless device,
wherein the latch controller is further operative to cause
responsive at least in part to the clock, a determination of time data associated with receipt of the at least one wireless unlatch signal,
a further determination that the received user identifying data has a predetermined relationship with the stored user identifying data, wherein in (c) responsive at least in part to the further determination, the motor is caused to rotate in the first rotational direction,
the at least one wireless transceiver to wirelessly send the time data, data corresponding to at least some of the received user identifying data and the latch identifying data to the remote system.

15. The apparatus according to claim 2
wherein the circuitry further includes
a clock, and
a locator, wherein the locator is operative to enable determination of a current location of the latch controller,
wherein the at least one data store includes stored user identifying data and stored latch identifying data,
wherein the latch controller is in operative connection with a remote system,
wherein in (c) the at least one wireless unlatch signal includes received user identifying data corresponding to one or more of the mobile wireless device or the operator of the mobile wireless device, wherein the latch controller is further operative to cause responsive at least in part to the clock, a determination of time data associated with receipt of the at least one wireless unlatch signal, responsive at least in part to the locator, a determination of location data associated with a current location of the latch controller upon receipt of the at least one wireless unlatch signal, a further determination that the received user identifying data has a predetermined relationship to the stored user identifying data, wherein in (c) responsive at least in part to the further determination, the motor is caused to rotate in the first rotational direction, the at least one wireless transceiver to wirelessly send the time data, the location data, data corresponding to at least some of the received user identifying data and the latch identifying data to the remote system.

16. The apparatus according to claim 2 wherein the latch controller further includes a position indicator, wherein the position indicator is operable to indicate a location of the latch controller, wherein the latch controller is further operative to cause the at least one wireless transceiver to send at least one position indicating message to the mobile wireless device indicative of the location of the latch controller.

17. The apparatus according to claim 2 wherein in (b) the wire delivered electrical unlatch signal comprises an induction generated signal, whereby the wire delivered electrical unlatch signal is delivered responsive to electrical current flow delivered from a source other than the latch controller.

18. The apparatus according to claim 2 wherein the circuitry further includes an image capture interface, wherein the image capture interface is operative to communicate with an image capture system including a camera, wherein the latch controller is further operative to cause responsive at least in part to one or more of receipt of the wire delivered electrical unlatch signal in (b) or receipt of the at least one wireless unlatch signal in (c), the image capture system interface to communicate with the image capture system to cause at least one of capture or storage of image data captured through operation of the camera.

19. The apparatus according to claim 2 wherein the at least one wireless transceiver includes a local magnetic field transceiver having a maximum range of less than one foot, and an RF transceiver, wherein the latch controller is further operative to cause one group of circuit executable instructions stored in the at least one data store to be modified responsive at least in part to RF programming messages received through the RF transceiver, while a further group of circuit executable instructions stored in the at least one data store is not modifiable responsive to RF programming messages received through the RF transceiver, the further group of circuit executable instructions stored in the at least one data store to be modified responsive at least in part to magnetic field programming messages received through the local magnetic field transceiver.

20. The apparatus according to claim 2 wherein the at least one data store includes stored identifying data, wherein the at least one wireless unlatch signal includes mobile wireless device identifying data and at least one unlock instruction, wherein the latch controller is further operative to cause a determination that the mobile wireless device identifying data included in the at least one wireless unlatch signal and the stored identifying data have a predetermined relationship, wherein in (c) the latch controller is operative to cause the motor to rotate in the first rotational direction responsive at least in part to the determination that the identifying data and the stored identifying data have the predetermined relationship and the at least one unlock instruction.

21. Apparatus comprising:

a latch controller, wherein the latch controller includes circuitry, wherein the circuitry includes at least one data store, wherein the at least one data store includes circuit executable instructions and stored identifying data, at least one wireless transceiver, wherein the latch controller is configured to be in operative connection with a latch, at least one sensor, a mobile wireless device, wherein the latch includes a housing, a jaw, wherein the jaw is movably mounted in operative connection with the housing, wherein the jaw is movable between a latched position and an unlatched position, wherein in the latched position the jaw is configured to hold a striker in engagement with the jaw, wherein the striker is configured to be in operative connection with a closure member which is held in a closed position with the jaw in the latched position, and wherein in the unlatched position the striker is disengageable from the jaw, whereby the striker is movable away from the housing and the closure member is released to move from the closed position, a motor, wherein the motor is in operative connection with the jaw, wherein the motor is rotatable in a first rotational direction, and in a second rotational direction opposed of the first rotational direction, wherein rotation of the motor in the first rotational direction is operative to enable the jaw to be movable from the latched position to the unlatched position, wherein the at least one sensor is in operative connection with at least one of the jaw and the closure member, wherein the at least one sensor is operative to detect at least one condition indicative that the jaw is in the latched position, wherein the mobile wireless device is selectively operative to provide at least one wireless unlatch signal, wherein the at least one wireless unlatch signal is receivable by the at least one wireless transceiver, wherein the at least one wireless unlatch signal includes
identifying data, and
at least one unlock instruction,
wherein the latch controller is operative to cause
a) responsive at least in part to the at least one sensor, a determination that the jaw is in the latched position,
b) a determination that the identifying data included in the at least one wireless unlatch signal received through operation of the at least one wireless transceiver and the stored identifying data have a predetermined relationship,
c) responsive at least in part to the determination in (a), the determination in (b) and the at least one unlock instruction included in the at least one wireless unlatch signal, the motor to rotate in the first rotational direction, wherein the jaw is movable from the latched position to the unlatched position,
d) subsequent to (c), responsive at least in part to the circuit executable instructions, the motor to cease rotation in the first rotational direction.

22. The apparatus according to claim 21
wherein the circuitry further includes a wired connector interface,
wherein the latch controller is configured to be in operative connection with at least one switch, wherein the at least one switch is operable responsive to a manual actuation of an input device,
wherein the at least one switch is selectively operative to provide a wire delivered electrical unlatch signal responsive at least in part to actuation of the input device,
wherein the wire delivered electrical unlatch signal is receivable by the wired connector interface,
wherein the latch controller is further operative to cause
e) responsive at least in part to the determination in (a) and receipt through the wired connector interface of the wire delivered electrical unlatch signal, the motor to rotate in the first rotational direction, wherein the jaw is movable from the latched position to the unlatched position,
wherein in (d), the circuit executable instructions are operative to cause the motor to cease rotation in the first rotational direction subsequent to either (e) or (c).

23. The apparatus according to claim 21
wherein the at least one wireless transceiver includes
a local magnetic field transceiver, wherein the local magnetic field transceiver is operative to communicate with the mobile wireless device only within a range of no more than one foot, and
an RF transceiver,
wherein in (c) the at least one wireless unlatch signal includes an RF signal received by the RF transceiver and a magnetic field signal received by the local magnetic field transceiver.

24. The apparatus according to claim 21
wherein the at least one data store includes latch identifying data,
wherein the circuitry further includes a clock,
wherein the latch controller is in operative connection with a remote system,
wherein in (c) the at least one wireless unlatch signal includes user identifying data corresponding to one or more of the mobile wireless device or an operator of the mobile wireless device,
wherein the latch controller is further operative to cause
responsive at least in part to the clock, a determination of time data associated with receipt of the at least one wireless signal,
the at least one wireless transceiver to wirelessly send the time data, the latch identifying data and at least some of the user identifying data to the remote system.

25. The apparatus according to claim 21
wherein the at least one wireless transceiver includes
a local magnetic field transceiver having a maximum range of no more than one foot, and
an RF transceiver,
wherein the latch controller is further operative to cause
one group of circuit executable instructions stored in the at least one data store to be modified responsive at least in part to RF programming messages received through the RF transceiver, while a further group of circuit executable instructions stored in the at least one data store is not modifiable responsive to RF programming messages received through the RF transceiver,
the further group of circuit executable instructions stored in the at least one data store to be modified responsive at least in part to magnetic field programming messages received through the local magnetic field transceiver.

26. Apparatus comprising:
a latch controller, wherein the latch controller includes
at least one circuit, wherein the at least one circuit includes
at least one data store, wherein the at least one data store includes circuit executable instructions and stored identifying data,
at least one wireless transceiver,
wherein the latch controller is adapted to be in operative connection with
a latch,
at least one sensor,
a mobile wireless device,
wherein the latch includes
a housing,
a jaw, wherein the jaw is movably mounted in operative connection with the housing,
wherein the jaw is movable between a latched position and an unlatched position,
wherein in the latched position the jaw is configured to hold a striker in engagement with the jaw, wherein the striker is configured to be in operative connection with a closure member which is held in a closed position with the jaw in the latched position, and
wherein in the unlatched position the striker is disengageable from the jaw, whereby the striker is movable away from the housing and the closure member is released to move from the closed position,
a pawl, wherein the pawl
is rotatably movably mounted in operative connection with the housing,
is rotatable about a pawl pivot,
includes a first arm portion and a second arm portion, wherein each of the first arm portion and the second arm portion extends radially away from the pawl pivot,
wherein the first arm portion is angularly disposed from the second arm portion, wherein the first arm portion terminates radially away from the pawl pivot at an outward end, and wherein the first arm portion is angularly disposed from the second arm portion, wherein the second arm portion includes an actuating end, wherein the actuating end is radially disposed from the pawl pivot and is accessible from outside the housing, wherein the pawl is rotatable between an engaged position in which the outward end of the first arm portion is in operatively engaged relation with the jaw, and is operative to hold the jaw in the latched position, a disengaged position in which the outward end of the first arm portion enables the jaw to move from the latched position to the unlatched position, a motor, wherein the motor is rotatable in a first rotational direction, and in a second rotational direction opposed of the first rotational direction, is in operative engagement with the first arm portion radially intermediate of the pawl pivot and the outward end, and wherein rotation of the motor in the first rotational direction is operative to cause the pawl to move from the engaged position to the disengaged position, whereby the jaw is enabled to move from the latched position to the unlatched position, wherein the actuating end is selectively movable to cause the pawl to move from the engaged position to the disengaged position independent of operation of the motor, whereby the jaw is enabled to move from the latched position to the unlatched position responsive to actuating end movement, wherein the at least one sensor is in operative connection with one or more of the jaw and the closure member, wherein the at least one sensor is operative to detect at least one condition indicative that the jaw is in the latched position, wherein the mobile wireless device is selectively operative to provide at least one wireless unlatch signal, wherein the at least one wireless unlatch signal is receivable by the at least one wireless transceiver, wherein the at least one wireless unlatch signal includes identifying data, and at least one unlock instruction, wherein the latch controller is operative to cause a) responsive at least in part to the at least one sensor, a determination that the jaw is in the latched position, b) a determination that the identifying data included in the at least one wireless unlatch signal received through operation of the at least one wireless transceiver and the stored identifying data have a predetermined relationship, c) responsive at least in part to the determination in (a), the determination in (b) and the at least one unlock instruction included in the at least one wireless unlatch signal, the motor to rotate in the first rotational direction, wherein the jaw is movable from the latched position to the unlatched position, d) subsequent to (c), responsive at least in part to the circuit executable instructions, the motor to cease rotation in the first rotational direction.

27. The apparatus according to claim 26 wherein in the identifying data included in the at least one wireless unlatch signal corresponds to one or more of the mobile wireless device or an operator of the mobile wireless device.

* * * * *